(12) United States Patent
Arne et al.

(10) Patent No.: US 10,398,161 B2
(45) Date of Patent: *Sep. 3, 2019

(54) MASTICABLE INGESTIBLE PRODUCT AND COMMUNICATION SYSTEM THEREFOR

(71) Applicant: Proteus Digital Health, Inc., Redwood City, CA (US)

(72) Inventors: Lawrence Arne, Palo Alto, CA (US); Mark Zdeblick, Portola Valley, CA (US); Aditya Dua, San Jose, CA (US); George Savage, Portola Valley, CA (US); Robert Leichner, Menlo Park, CA (US); Jafar Shenasa, San Jose, CA (US); Patricia Johnson, San Carlos, CA (US); Raymond Schmidt, San Mateo, CA (US); Zahedeh Hatamkhany, San Mateo, CA (US); Veeraperumanallu Muralidharan, Santa Clara, CA (US)

(73) Assignee: PROTEUS DIGITAL HEAL TH, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,425

(22) Filed: Aug. 16, 2017

(65) Prior Publication Data

US 2018/0184698 A1 Jul. 5, 2018

Related U.S. Application Data

(63) Continuation of application No. 15/113,036, filed as application No. PCT/US2015/012251 on Jan. 21, 2015, now Pat. No. 9,756,874.

(Continued)

(51) Int. Cl.
*G06K 19/00* (2006.01)
*A23L 33/10* (2016.01)
(Continued)

(52) U.S. Cl.
CPC .............. *A23L 33/10* (2016.08); *A23L 33/00* (2016.08); *A23L 35/00* (2016.08); *A23P 20/10* (2016.08);
(Continued)

(58) Field of Classification Search
USPC ........................... 235/487, 492; 340/10, 572
See application file for complete search history.

(56) References Cited

U.S. PATENT DOCUMENTS

| 1,548,459 A | 8/1925 | Hammer |
| 2,587,158 A | 2/1952 | Hofberg |

(Continued)

FOREIGN PATENT DOCUMENTS

| CA | 2953847 | 11/2006 |
| CN | 1588649 | 3/2005 |

(Continued)

OTHER PUBLICATIONS

AADE, "AADE 37th Annual Meeting San Antonio Aug. 4-7, 2010" American Association of Diabetes Educators (2010); http://www.diabeteseducator.org/annualmeeting/2010/index.html; 2 pp.

(Continued)

*Primary Examiner* — Matthew Mikels
(74) *Attorney, Agent, or Firm* — K&L Gates LLP

(57) ABSTRACT

An apparatus includes a food product, at least one ingestible device associated with the food product to communicate information and at least one coating material surrounding the at least one ingestible device is disclosed. The ingestible device is associated with an ingestible medication to be ingested in conjunction with the food product. The coating is configured to release the at least one ingestible device upon the occurrence of an event.

20 Claims, 17 Drawing Sheets

Related U.S. Application Data

(60) Provisional application No. 61/929,854, filed on Jan. 21, 2014.

(51) Int. Cl.

| | |
|---|---|
| *G06K 19/07* | (2006.01) |
| *H04B 5/00* | (2006.01) |
| *A23P 20/10* | (2016.01) |
| *A23P 20/00* | (2016.01) |
| *A23L 33/00* | (2016.01) |
| *A23L 35/00* | (2016.01) |
| *G06K 7/10* | (2006.01) |

(52) U.S. Cl.
CPC .......... *A23P 20/19* (2016.08); *G06K 7/10366* (2013.01); *G06K 19/0717* (2013.01); *G06K 19/0723* (2013.01); *H04B 5/0031* (2013.01); *H04B 5/0062* (2013.01); *A23V 2002/00* (2013.01)

(56) References Cited

U.S. PATENT DOCUMENTS

| | | |
|---|---|---|
| 2,973,555 A | 3/1961 | Schwepke |
| 3,048,526 A | 8/1962 | Boswell |
| 3,079,824 A | 3/1963 | Schott |
| 3,096,248 A | 7/1963 | Rudzki |
| 3,176,399 A | 4/1965 | Marino et al. |
| 3,218,638 A | 11/1965 | Honig |
| 3,340,866 A | 9/1967 | Noller |
| 3,345,989 A | 10/1967 | Reynolds |
| 3,353,539 A | 11/1967 | Preston |
| 3,409,721 A | 11/1968 | Applezweig |
| 3,419,736 A | 12/1968 | Walsh |
| 3,589,943 A | 6/1971 | Grubb et al. |
| 3,607,788 A | 9/1971 | Adolph |
| 3,628,669 A | 12/1971 | McKinnis et al. |
| 3,642,008 A | 2/1972 | Bolduc |
| 3,679,480 A | 7/1972 | Brown et al. |
| 3,682,160 A | 8/1972 | Murata |
| 3,719,183 A | 3/1973 | Schwartz |
| 3,727,616 A | 4/1973 | Lenzkes |
| 3,799,802 A | 3/1974 | Schneble, Jr. et al. |
| 3,825,016 A | 7/1974 | Lale et al. |
| 3,828,766 A | 8/1974 | Krasnow |
| 3,837,339 A | 9/1974 | Aisenberg et al. |
| 3,849,041 A | 11/1974 | Knapp |
| 3,893,111 A | 7/1975 | Cotter |
| 3,944,064 A | 3/1976 | Bashaw et al. |
| 3,967,202 A | 6/1976 | Batz |
| 3,989,050 A | 11/1976 | Buchalter |
| 4,017,856 A | 4/1977 | Wiegand |
| 4,055,178 A | 10/1977 | Harrigan |
| 4,062,750 A | 12/1977 | Butler |
| 4,067,014 A | 1/1978 | Wheeler et al. |
| 4,077,397 A | 3/1978 | Ellis |
| 4,077,398 A | 3/1978 | Ellis |
| 4,082,087 A | 4/1978 | Howson |
| 4,090,752 A | 5/1978 | Long |
| 4,105,023 A | 8/1978 | Merchese et al. |
| 4,106,348 A | 8/1978 | Auphan |
| 4,121,573 A | 10/1978 | Crovella et al. |
| 4,129,125 A | 12/1978 | Lester |
| 4,133,730 A | 1/1979 | DuBois et al. |
| 4,139,589 A | 2/1979 | Beringer et al. |
| 4,141,349 A | 2/1979 | Ory et al. |
| 4,143,770 A | 3/1979 | Grimmell et al. |
| 4,149,168 A | 4/1979 | Hose |
| 4,166,453 A | 9/1979 | McClelland |
| 4,185,172 A | 1/1980 | Melindo et al. |
| 4,239,046 A | 12/1980 | Ong |
| 4,251,795 A | 2/1981 | Shibasaki et al. |
| 4,269,189 A | 5/1981 | Abraham |
| 4,281,664 A | 8/1981 | Duggan |
| 4,331,654 A | 5/1982 | Morris |
| 4,333,150 A | 6/1982 | Matty et al. |
| 4,345,588 A | 8/1982 | Widder et al. |
| 4,418,697 A | 12/1983 | Tama |
| 4,425,117 A | 1/1984 | Hugemann |
| 4,439,196 A | 3/1984 | Higuchi |
| 4,494,950 A | 1/1985 | Fischell |
| 4,513,385 A | 4/1985 | Muri |
| 4,526,474 A | 7/1985 | Simon |
| 4,547,391 A | 10/1985 | Jenkins |
| 4,559,950 A | 12/1985 | Vaughan |
| 4,564,363 A | 1/1986 | Bagnall et al. |
| 4,578,061 A | 3/1986 | Lemelson |
| 4,618,533 A | 10/1986 | Steuck |
| 4,635,641 A | 1/1987 | Hoffman |
| 4,654,165 A | 3/1987 | Eisenber |
| 4,663,250 A | 5/1987 | Ong et al. |
| 4,669,479 A | 6/1987 | Dunseath |
| 4,681,111 A | 7/1987 | Silvian |
| 4,687,660 A | 8/1987 | Baker et al. |
| 4,725,997 A | 2/1988 | Urquhart et al. |
| 4,749,575 A | 6/1988 | Rotman et al. |
| 4,763,659 A | 8/1988 | Dunseath |
| 4,767,627 A | 8/1988 | Caldwell et al. |
| 4,775,536 A | 10/1988 | Patell |
| 4,784,162 A | 11/1988 | Ricks |
| 4,793,825 A | 12/1988 | Benjamin et al. |
| 4,809,705 A | 3/1989 | Ascher |
| 4,814,181 A | 3/1989 | Jordan et al. |
| 4,835,373 A | 5/1989 | Adams et al. |
| 4,844,076 A | 7/1989 | Lesho |
| 4,847,090 A | 7/1989 | Della Posta et al. |
| 4,858,617 A | 8/1989 | Sanders |
| 4,871,974 A | 10/1989 | Davis et al. |
| 4,876,093 A | 10/1989 | Theeuwes et al. |
| 4,891,223 A | 1/1990 | Ambegaonakar et al. |
| 4,896,261 A | 1/1990 | Nolan |
| 4,900,552 A | 2/1990 | Sanvordeker et al. |
| 4,975,230 A | 12/1990 | Pinkhasov |
| 4,987,897 A | 1/1991 | Funke |
| 5,000,957 A | 3/1991 | Eckenhoff et al. |
| 5,016,634 A | 5/1991 | Vock et al. |
| 5,018,335 A | 5/1991 | Yamamoto et al. |
| 5,079,006 A | 1/1992 | Urquhart |
| 5,110,441 A | 5/1992 | Kinlen et al. |
| 5,113,859 A | 5/1992 | Funke |
| 5,160,885 A | 11/1992 | Hannam et al. |
| 5,167,626 A | 12/1992 | Casper |
| 5,176,626 A | 1/1993 | Soehendra |
| 5,179,578 A | 1/1993 | Ishizu |
| 5,187,723 A | 2/1993 | Mueller |
| 5,213,738 A | 5/1993 | Hampton et al. |
| 5,218,343 A | 6/1993 | Stobbe et al. |
| 5,232,383 A | 8/1993 | Barnick |
| 5,245,332 A | 9/1993 | Katzenstein et al. |
| 5,261,402 A | 11/1993 | DiSabito |
| 5,263,481 A | 11/1993 | Axelgaard et al. |
| 5,273,066 A | 12/1993 | Graham et al. |
| 5,276,710 A | 1/1994 | Iwasaki |
| 5,279,607 A | 1/1994 | Schentag et al. |
| 5,281,287 A | 1/1994 | Lloyd |
| 5,283,136 A | 2/1994 | Peled et al. |
| 5,288,564 A | 2/1994 | Klein |
| 5,305,745 A | 4/1994 | Zacouto |
| 5,310,301 A | 5/1994 | Aono |
| 5,318,557 A | 6/1994 | Gross |
| 5,331,953 A | 7/1994 | Andersson et al. |
| 5,394,882 A | 3/1995 | Mawhinney |
| 5,395,366 A | 3/1995 | D'Andrea et al. |
| 5,411,535 A | 5/1995 | Fujii et al. |
| 5,412,372 A | 5/1995 | Parkhurst et al. |
| 5,428,961 A | 7/1995 | Sakakibara |
| 5,436,091 A | 7/1995 | Shackle et al. |
| 5,443,461 A | 8/1995 | Atkinson et al. |
| 5,443,843 A | 8/1995 | Curatolo et al. |
| 5,458,141 A | 10/1995 | Neil et al. |
| 5,458,994 A | 10/1995 | Nesselbeck et al. |
| 5,468,222 A | 11/1995 | Altchuler |
| 5,485,841 A | 1/1996 | Watkin et al. |

(56) References Cited

U.S. PATENT DOCUMENTS

| | | |
|---|---|---|
| 5,506,248 A | 4/1996 | Nikfar et al. |
| 5,511,548 A | 4/1996 | Riazzi et al. |
| 5,538,007 A | 7/1996 | Gorman |
| 5,551,020 A | 8/1996 | Flax et al. |
| 5,551,953 A | 9/1996 | Lattin et al. |
| 5,567,210 A | 10/1996 | Bates et al. |
| 5,596,302 A | 1/1997 | Mastrocola et al. |
| D377,983 S | 2/1997 | Sabri et al. |
| 5,600,548 A | 2/1997 | Nguyen et al. |
| 5,603,363 A | 2/1997 | Nelson |
| 5,623,520 A | 4/1997 | Kaiser |
| 5,634,466 A | 6/1997 | Gruner |
| 5,634,468 A | 6/1997 | Platt |
| 5,638,406 A | 6/1997 | Sogabe |
| 5,645,063 A | 7/1997 | Straka et al. |
| 5,659,247 A | 8/1997 | Clements |
| 5,703,463 A | 12/1997 | Smith |
| 5,705,189 A | 1/1998 | Lehmann et al. |
| 5,720,771 A | 2/1998 | Snell |
| 5,724,432 A | 3/1998 | Bouvet et al. |
| 5,738,708 A | 4/1998 | Peachey et al. |
| 5,740,811 A | 4/1998 | Hedberg |
| 5,757,326 A | 5/1998 | Koyama et al. |
| 5,772,575 A | 6/1998 | Lesinski et al. |
| 5,792,048 A | 8/1998 | Schaefer |
| 5,802,467 A | 9/1998 | Salazar |
| 5,833,716 A | 11/1998 | Bar-Or |
| 5,836,474 A | 11/1998 | Wessberg |
| 5,842,324 A | 12/1998 | Grosskopf et al. |
| 5,845,265 A | 12/1998 | Woolston |
| 5,862,803 A | 1/1999 | Besson |
| 5,862,808 A | 1/1999 | Albarello |
| 5,868,136 A | 2/1999 | Fox |
| 5,914,132 A | 6/1999 | Kelm et al. |
| 5,914,701 A | 6/1999 | Gersheneld et al. |
| 5,917,346 A | 6/1999 | Gord |
| 5,921,925 A | 7/1999 | Cartmell et al. |
| 5,925,030 A | 7/1999 | Gross et al. |
| 5,925,066 A | 7/1999 | Kroll et al. |
| 5,957,854 A | 9/1999 | Besson et al. |
| 5,963,132 A | 10/1999 | Yoakum et al. |
| 5,965,629 A | 10/1999 | Jung et al. |
| 5,974,124 A | 10/1999 | Schlueter, Jr. et al. |
| 5,981,166 A | 11/1999 | Mandecki |
| 5,999,846 A | 12/1999 | Pardey et al. |
| 6,009,350 A | 12/1999 | Renken |
| 6,018,229 A | 1/2000 | Mitchell et al. |
| 6,023,631 A | 2/2000 | Cartmell et al. |
| 6,033,370 A | 3/2000 | Reinbold et al. |
| 6,038,464 A | 3/2000 | Axelgaard et al. |
| 6,042,710 A | 3/2000 | Dubrow |
| 6,047,203 A | 4/2000 | Sackner |
| 6,068,465 A | 5/2000 | Wilson |
| 6,068,589 A | 5/2000 | Neukermans |
| 6,076,016 A | 6/2000 | Feierbach |
| 6,081,734 A | 6/2000 | Batz |
| 6,083,248 A | 7/2000 | Thompson |
| 6,090,489 A | 7/2000 | Hayakawa et al. |
| 6,091,975 A | 7/2000 | Daddona et al. |
| 6,095,985 A | 8/2000 | Raymond et al. |
| 6,099,482 A | 8/2000 | Brune et al. |
| 6,115,636 A | 9/2000 | Ryan |
| 6,117,077 A | 9/2000 | Del Mar et al. |
| 6,122,351 A | 9/2000 | Schlueter, Jr. et al. |
| 6,141,592 A | 10/2000 | Pauly |
| 6,149,940 A | 11/2000 | Maggi et al. |
| 6,151,353 A | 11/2000 | Harrison et al. |
| 6,200,265 B1 | 3/2001 | Walsh et al. |
| 6,200,625 B1 | 3/2001 | Beckett |
| 6,204,764 B1 | 3/2001 | Maloney |
| 6,206,702 B1 | 3/2001 | Hayden et al. |
| 6,217,744 B1 | 4/2001 | Crosby |
| 6,231,593 B1 | 5/2001 | Meserol |
| 6,238,338 B1 | 5/2001 | DeLuca et al. |
| 6,245,057 B1 | 6/2001 | Sieben et al. |
| 6,269,058 B1 | 7/2001 | Yamanoi et al. |
| 6,275,476 B1 | 8/2001 | Wood |
| 6,285,897 B1 | 9/2001 | Kilcoyne et al. |
| 6,287,252 B1 | 9/2001 | Lugo |
| 6,288,629 B1 | 9/2001 | Cofino et al. |
| 6,289,238 B1 | 9/2001 | Besson et al. |
| 6,301,298 B1 | 10/2001 | Kuntz et al. |
| 6,315,719 B1 | 11/2001 | Rode et al. |
| 6,317,714 B1 | 11/2001 | Del Castillo |
| 6,342,774 B1 | 1/2002 | Kreisinger et al. |
| 6,344,824 B1 | 2/2002 | Takasugi et al. |
| 6,358,202 B1 | 3/2002 | Arent |
| 6,364,834 B1 | 4/2002 | Reuss |
| 6,366,206 B1 | 4/2002 | Ishikawa et al. |
| 6,368,190 B1 | 4/2002 | Easter et al. |
| 6,371,927 B1 | 4/2002 | Brune |
| 6,374,670 B1 | 4/2002 | Spelman |
| 6,380,858 B1 | 4/2002 | Yarin et al. |
| 6,390,088 B1 | 5/2002 | Noehl et al. |
| 6,394,953 B1 | 5/2002 | Devlin et al. |
| 6,394,997 B1 | 5/2002 | Lemelson |
| 6,409,674 B1 | 6/2002 | Brockway et al. |
| 6,411,567 B1 | 6/2002 | Niemiec et al. |
| 6,426,863 B1 | 7/2002 | Munshi |
| 6,432,292 B1 | 8/2002 | Pinto et al. |
| 6,440,069 B1 | 8/2002 | Raymond et al. |
| 6,441,747 B1 | 8/2002 | Khair |
| 6,453,199 B1 | 9/2002 | Kobozev |
| 6,477,424 B1 | 11/2002 | Thompson et al. |
| 6,482,156 B2 | 11/2002 | Lliff |
| 6,494,829 B1 | 12/2002 | New et al. |
| 6,496,705 B1 | 12/2002 | Ng et al. |
| 6,505,077 B1 | 1/2003 | Kast et al. |
| 6,525,996 B1 | 2/2003 | Miyazawa |
| 6,526,315 B1 | 2/2003 | Inagawa |
| 6,531,026 B1 | 3/2003 | Takeichi et al. |
| 6,540,699 B1 | 4/2003 | Smith |
| 6,544,174 B2 | 4/2003 | West |
| 6,547,994 B1 | 4/2003 | Monkhouse et al. |
| 6,564,079 B1 | 5/2003 | Cory |
| 6,567,685 B2 | 5/2003 | Takamori et al. |
| 6,572,636 B1 | 6/2003 | Hagen et al. |
| 6,574,425 B1 | 6/2003 | Weiss et al. |
| 6,577,893 B1 | 6/2003 | Besson et al. |
| 6,579,231 B1 | 6/2003 | Phipps |
| 6,595,929 B2 | 7/2003 | Stivoric |
| 6,599,284 B2 | 7/2003 | Faour et al. |
| 6,602,518 B2 | 8/2003 | Seielstad et al. |
| 6,605,038 B1 | 8/2003 | Teller et al. |
| 6,605,046 B1 | 8/2003 | Del Mar |
| 6,609,018 B2 | 8/2003 | Cory |
| 6,612,984 B1 | 9/2003 | Kerr |
| 6,632,175 B1 | 10/2003 | Marshall |
| 6,632,216 B2 | 10/2003 | Houzego et al. |
| 6,635,279 B2 | 10/2003 | Kolter et al. |
| 6,638,231 B2 | 10/2003 | Govari et al. |
| 6,643,541 B2 | 11/2003 | Mok et al. |
| 6,650,718 B1 | 11/2003 | Fujimura et al. |
| 6,654,638 B1 | 11/2003 | Sweeney |
| 6,663,846 B1 | 12/2003 | McCombs |
| 6,673,474 B2 | 1/2004 | Yamamoto |
| 6,679,830 B2 | 1/2004 | Kolarovic et al. |
| 6,680,923 B1 | 1/2004 | Leon |
| 6,683,493 B1 | 1/2004 | Fujimora et al. |
| 6,689,117 B2 | 2/2004 | Sweeney et al. |
| 6,694,161 B2 | 2/2004 | Mehrotra |
| 6,704,602 B2 | 3/2004 | Berg et al. |
| 6,720,923 B1 | 4/2004 | Hayward et al. |
| 6,738,671 B2 | 5/2004 | Christophersom et al. |
| 6,740,033 B1 | 5/2004 | Olejniczak et al. |
| 6,745,082 B2 | 6/2004 | Axelgaard et al. |
| 6,755,783 B2 | 6/2004 | Cosentino |
| 6,757,523 B2 | 6/2004 | Fry |
| 6,759,968 B2 | 7/2004 | Zierolf |
| 6,767,200 B2 | 7/2004 | Sowden et al. |
| 6,771,174 B2 | 8/2004 | Broas |
| 6,773,429 B2 | 8/2004 | Sheppard et al. |
| 6,800,060 B2 | 10/2004 | Marshall |
| 6,801,137 B2 | 10/2004 | Eggers et al. |

(56) References Cited

U.S. PATENT DOCUMENTS

| | | |
|---|---|---|
| 6,804,558 B2 | 10/2004 | Haller et al. |
| 6,807,438 B1 | 10/2004 | Brun Del Re et al. |
| 6,814,706 B2 | 11/2004 | Barton et al. |
| 6,816,794 B2 | 11/2004 | Alvi |
| 6,822,554 B2 | 11/2004 | Vrijens et al. |
| 6,824,512 B2 | 11/2004 | Warkentin et al. |
| 6,836,862 B1 | 12/2004 | Erekson et al. |
| 6,839,659 B2 | 1/2005 | Tarassenko et al. |
| 6,840,904 B2 | 1/2005 | Goldberg |
| 6,842,636 B2 | 1/2005 | Perrault |
| 6,845,272 B1 | 1/2005 | Thomsen |
| 6,856,832 B1 | 2/2005 | Matsumura et al. |
| 6,864,780 B2 | 3/2005 | Doi |
| 6,879,810 B2 | 4/2005 | Bouet |
| 6,882,881 B1 | 4/2005 | Lesser et al. |
| 6,888,337 B2 | 5/2005 | Sawyers |
| 6,889,165 B2 | 5/2005 | Lind et al. |
| 6,897,788 B2 | 5/2005 | Khair et al. |
| 6,909,878 B2 | 6/2005 | Haller |
| 6,922,592 B2 | 7/2005 | Thompson et al. |
| 6,928,370 B2 | 8/2005 | Anuzis et al. |
| 6,929,636 B1 | 8/2005 | Von Alten |
| 6,937,150 B2 | 8/2005 | Medema |
| 6,939,292 B2 | 9/2005 | Mizuno |
| 6,942,616 B2 | 9/2005 | Kerr |
| 6,942,770 B2 | 9/2005 | Cai et al. |
| 6,946,156 B2 | 9/2005 | Bunick |
| 6,951,536 B2 | 10/2005 | Yokoi |
| 6,956,917 B2 | 10/2005 | Lenosky |
| 6,957,107 B2 | 10/2005 | Rogers et al. |
| 6,958,603 B2 | 10/2005 | Kondo |
| 6,959,929 B2 | 11/2005 | Pugnet et al. |
| 6,960,617 B2 | 11/2005 | Omidian et al. |
| 6,961,601 B2 | 11/2005 | Mathews et al. |
| 6,968,153 B1 | 11/2005 | Heinonen |
| 6,977,511 B2 | 12/2005 | Patel et al. |
| 6,982,094 B2 | 1/2006 | Sowden |
| 6,987,965 B2 | 1/2006 | Ng et al. |
| 6,990,082 B1 | 1/2006 | Zehavi et al. |
| 7,002,476 B2 | 2/2006 | Rapchak |
| 7,004,395 B2 | 2/2006 | Koenck |
| 7,009,634 B2 | 3/2006 | Iddan et al. |
| 7,009,946 B1 | 3/2006 | Kardach |
| 7,013,162 B2 | 3/2006 | Gorsuch |
| 7,016,648 B2 | 3/2006 | Haller |
| 7,020,508 B2 | 3/2006 | Stivoric |
| 7,023,940 B2 | 4/2006 | Nakamura et al. |
| 7,024,248 B2 | 4/2006 | Penner et al. |
| 7,031,745 B2 | 4/2006 | Shen |
| 7,031,857 B2 | 4/2006 | Tarassenko et al. |
| 7,039,453 B2 | 5/2006 | Mullick |
| 7,044,911 B2 | 5/2006 | Drinan et al. |
| 7,046,649 B2 | 5/2006 | Awater et al. |
| 7,050,419 B2 | 5/2006 | Azenkot et al. |
| 7,061,236 B2 | 6/2006 | Britton |
| 7,062,308 B1 | 6/2006 | Jackson |
| 7,069,062 B2 | 6/2006 | Minotani et al. |
| 7,076,437 B1 | 7/2006 | Levy |
| 7,081,693 B2 | 7/2006 | Hamel et al. |
| 7,083,578 B2 | 8/2006 | Lewkowicz |
| 7,091,726 B2 | 8/2006 | Sano et al. |
| 7,116,252 B2 | 10/2006 | Teraguchi |
| 7,118,531 B2 | 10/2006 | Krill |
| 7,122,143 B2 | 10/2006 | Sowden et al. |
| 7,125,382 B2 | 10/2006 | Zhou et al. |
| 7,127,300 B2 | 10/2006 | Mazar et al. |
| 7,139,332 B2 | 11/2006 | Yu et al. |
| 7,146,228 B2 | 12/2006 | Nielsen |
| 7,146,449 B2 | 12/2006 | Do et al. |
| 7,149,581 B2 | 12/2006 | Goedeke et al. |
| 7,154,071 B2 | 12/2006 | Sattler et al. |
| 7,154,916 B2 | 12/2006 | Soloff |
| 7,155,232 B2 | 12/2006 | Godfrey et al. |
| 7,160,258 B2 | 1/2007 | Imran |
| 7,161,484 B2 | 1/2007 | Tsoukalis |
| 7,164,942 B2 | 1/2007 | Avrahami |
| 7,171,166 B2 | 1/2007 | Ng et al. |
| 7,171,177 B2 | 1/2007 | Park et al. |
| 7,171,259 B2 | 1/2007 | Rytky |
| 7,176,784 B2 | 2/2007 | Gilbert et al. |
| 7,187,960 B2 | 3/2007 | Abreu |
| 7,188,199 B2 | 3/2007 | Leung et al. |
| 7,188,767 B2 | 3/2007 | Penuela |
| 7,194,038 B1 | 3/2007 | Inkinen |
| 7,196,495 B1 | 3/2007 | Burcham |
| 7,206,630 B1 | 4/2007 | Tarler |
| 7,209,790 B2 | 4/2007 | Thompson et al. |
| 7,215,660 B2 | 5/2007 | Perlman |
| 7,215,991 B2 | 5/2007 | Besson |
| 7,218,967 B2 | 5/2007 | Bergelson |
| 7,231,451 B2 | 6/2007 | Law |
| 7,243,118 B2 | 7/2007 | Lou |
| 7,246,521 B2 | 7/2007 | Kim |
| 7,249,212 B2 | 7/2007 | Do |
| 7,252,792 B2 | 8/2007 | Perrault |
| 7,253,716 B2 | 8/2007 | Lovoi et al. |
| 7,261,690 B2 | 8/2007 | Teller |
| 7,270,633 B1 | 9/2007 | Goscha |
| 7,273,454 B2 | 9/2007 | Raymond et al. |
| 7,283,867 B2 | 10/2007 | Strother et al. |
| 7,285,090 B2 | 10/2007 | Stivoric et al. |
| 7,289,855 B2 | 10/2007 | Nghiem |
| 7,291,014 B2 | 11/2007 | Chung et al. |
| 7,291,497 B2 | 11/2007 | Holmes |
| 7,292,139 B2 | 11/2007 | Mazar et al. |
| 7,294,105 B1 | 11/2007 | Islam |
| 7,295,877 B2 | 11/2007 | Govari |
| 7,311,665 B2 | 12/2007 | Hawthorne |
| 7,313,163 B2 | 12/2007 | Liu |
| 7,317,378 B2 | 1/2008 | Jarvis et al. |
| 7,318,808 B2 | 1/2008 | Tarassenko et al. |
| 7,336,732 B1 | 2/2008 | Wiss |
| 7,336,929 B2 | 2/2008 | Yasuda |
| 7,342,895 B2 | 3/2008 | Serpa |
| 7,346,380 B2 | 3/2008 | Axelgaard et al. |
| 7,349,722 B2 | 3/2008 | Witkowski et al. |
| 7,352,998 B2 | 4/2008 | Palin |
| 7,353,258 B2 | 4/2008 | Washburn |
| 7,357,891 B2 | 4/2008 | Yang et al. |
| 7,359,674 B2 | 4/2008 | Markki |
| 7,366,558 B2 | 4/2008 | Virtanen et al. |
| 7,366,675 B1 | 4/2008 | Walker et al. |
| 7,368,190 B2 | 5/2008 | Heller et al. |
| 7,368,191 B2 | 5/2008 | Andelman et al. |
| 7,373,196 B2 | 5/2008 | Ryu et al. |
| 7,375,739 B2 | 5/2008 | Robbins |
| 7,376,435 B2 | 5/2008 | McGowan |
| 7,382,247 B2 | 6/2008 | Welch et al. |
| 7,382,263 B2 | 6/2008 | Danowski et al. |
| 7,387,607 B2 | 6/2008 | Holt |
| 7,388,903 B2 | 6/2008 | Godfrey et al. |
| 7,389,088 B2 | 6/2008 | Kim |
| 7,392,015 B1 | 6/2008 | Farlow |
| 7,395,105 B2 | 7/2008 | Schmidt et al. |
| 7,395,106 B2 | 7/2008 | Ryu et al. |
| 7,396,330 B2 | 7/2008 | Banet |
| 7,404,968 B2 | 7/2008 | Abrams et al. |
| 7,413,544 B2 | 8/2008 | Kerr |
| 7,414,534 B1 | 8/2008 | Kroll et al. |
| 7,414,543 B2 | 8/2008 | Rye et al. |
| 7,415,242 B1 | 8/2008 | Ngan |
| 7,419,468 B2 | 9/2008 | Shimizu et al. |
| 7,424,268 B2 | 9/2008 | Diener |
| 7,424,319 B2 | 9/2008 | Muehlsteff |
| 7,427,266 B2 | 9/2008 | Ayer et al. |
| 7,433,731 B2 | 10/2008 | Matsumura et al. |
| 7,442,164 B2 | 10/2008 | Berrang et al. |
| 7,443,290 B2 | 10/2008 | Takiguchi |
| 7,449,262 B2 | 11/2008 | Christie et al. |
| 7,458,887 B2 | 12/2008 | Kurosawa |
| 7,462,150 B1 | 12/2008 | Bharmi |
| 7,469,838 B2 | 12/2008 | Brooks et al. |
| 7,471,665 B2 | 12/2008 | Perlman |
| 7,471,992 B2 | 12/2008 | Schmidt et al. |

(56) References Cited

U.S. PATENT DOCUMENTS

| | | |
|---|---|---|
| 7,476,104 B2 | 1/2009 | Marmaropoulos et al. |
| 7,485,093 B2 | 2/2009 | Glukhovsky |
| 7,485,095 B2 | 2/2009 | Shusterman |
| 7,492,128 B2 | 2/2009 | Shen |
| 7,499,674 B2 | 3/2009 | Salokannel |
| 7,502,643 B2 | 3/2009 | Farringdon et al. |
| 7,505,795 B1 | 3/2009 | Lim et al. |
| 7,508,248 B2 | 3/2009 | Yoshida |
| 7,510,121 B2 | 3/2009 | Koenck |
| 7,512,448 B2 | 3/2009 | Malick |
| 7,512,860 B2 | 3/2009 | Miyazaki et al. |
| 7,515,043 B2 | 4/2009 | Welch |
| 7,519,416 B2 | 4/2009 | Sula et al. |
| 7,523,756 B2 | 4/2009 | Minai |
| 7,525,426 B2 | 4/2009 | Edelstein |
| 7,527,807 B2 | 5/2009 | Choi et al. |
| 7,537,590 B2 | 5/2009 | Santini, Jr. et al. |
| 7,539,533 B2 | 5/2009 | Tran |
| 7,542,878 B2 | 6/2009 | Nanikashvili |
| 7,547,278 B2 | 6/2009 | Miyazaki et al. |
| 7,551,590 B2 | 6/2009 | Haller |
| 7,554,452 B2 | 6/2009 | Cole |
| 7,558,620 B2 | 7/2009 | Ishibashi |
| 7,558,622 B2 | 7/2009 | Tran |
| 7,558,965 B2 | 7/2009 | Wheeler et al. |
| 7,575,005 B2 | 8/2009 | Mumford |
| 7,599,003 B2 | 10/2009 | Suzuki et al. |
| 7,614,743 B2 | 11/2009 | Geiger |
| 7,616,111 B2 | 11/2009 | Covannon |
| 7,616,710 B2 | 11/2009 | Kim et al. |
| 7,617,001 B2 | 11/2009 | Penner et al. |
| 7,626,387 B2 | 12/2009 | Adachi |
| 7,639,473 B2 | 12/2009 | Hsu et al. |
| 7,640,802 B2 | 1/2010 | King et al. |
| 7,645,262 B2 | 1/2010 | Greenberg et al. |
| 7,647,112 B2 | 1/2010 | Tracey |
| 7,647,185 B2 | 1/2010 | Tarassenko et al. |
| 7,653,031 B2 | 1/2010 | Godfrey et al. |
| 7,668,437 B1 | 2/2010 | Yamada et al. |
| 7,683,761 B2 | 2/2010 | Burghard et al. |
| 7,672,703 B2 | 3/2010 | Yeo et al. |
| 7,672,714 B2 | 3/2010 | Kuo |
| 7,673,679 B2 | 3/2010 | Harrison et al. |
| 7,678,043 B2 | 3/2010 | Gilad |
| 7,686,839 B2 | 3/2010 | Parker |
| 7,688,204 B2 | 3/2010 | Yamanaka et al. |
| 7,689,437 B1 | 3/2010 | Teller et al. |
| 7,689,833 B2 | 3/2010 | Lange |
| 7,697,994 B2 | 4/2010 | VanDanacker et al. |
| 7,712,288 B2 | 5/2010 | Ramasubramanian et al. |
| 7,720,036 B2 | 5/2010 | Sadri |
| 7,729,776 B2 | 6/2010 | Von Arx et al. |
| 7,733,224 B2 | 6/2010 | Tran |
| 7,736,318 B2 | 6/2010 | Costentino |
| 7,747,454 B2 | 6/2010 | Bartfeld et al. |
| 7,750,790 B2 | 7/2010 | Yang et al. |
| 7,756,587 B2 | 7/2010 | Penner et al. |
| 7,760,104 B2 | 7/2010 | Asp |
| 7,764,996 B2 | 7/2010 | Zhang et al. |
| 7,779,614 B1 | 8/2010 | McGonagle et al. |
| 7,782,991 B2 | 8/2010 | Sobchak et al. |
| 7,796,043 B2 | 9/2010 | Euliano et al. |
| 7,797,033 B2 | 9/2010 | D'Andrea et al. |
| 7,806,852 B1 | 10/2010 | Jursen |
| 7,809,399 B2 | 10/2010 | Lu |
| 7,811,231 B2 | 10/2010 | Jin et al. |
| 7,844,341 B2 | 11/2010 | Von Arx et al. |
| 7,857,766 B2 | 12/2010 | Lasater et al. |
| 7,860,731 B2 | 12/2010 | Jackson et al. |
| 7,871,734 B2 | 1/2011 | Hertz et al. |
| 7,874,993 B2 | 1/2011 | Bardy |
| 7,881,799 B2 | 2/2011 | Greenberg et al. |
| 7,885,700 B2 | 2/2011 | Clark et al. |
| 7,899,526 B2 | 3/2011 | Benditt et al. |
| 7,904,133 B2 | 3/2011 | Gehman et al. |
| 7,940,933 B2 | 5/2011 | Corndorf |
| D639,437 S | 6/2011 | Bishay et al. |
| 7,975,587 B2 | 7/2011 | Schneider |
| 7,978,064 B2 | 7/2011 | Zdeblick et al. |
| 7,983,189 B2 | 7/2011 | Bugenhagen |
| 8,025,149 B2 | 9/2011 | Sterry et al. |
| 8,036,731 B2 | 10/2011 | Kimchy et al. |
| 8,036,748 B2 | 10/2011 | Zdeblick et al. |
| 8,054,047 B2 | 11/2011 | Chen et al. |
| 8,054,140 B2 | 11/2011 | Fleming et al. |
| 8,055,334 B2 | 11/2011 | Savage et al. |
| 8,060,249 B2 | 11/2011 | Bear et al. |
| 8,073,707 B2 | 12/2011 | Teller et al. |
| 8,082,919 B2 | 12/2011 | Brunnberg et al. |
| 8,083,128 B2 | 12/2011 | Dembo et al. |
| 8,094,807 B2 | 1/2012 | Ishibashi et al. |
| 8,114,021 B2 | 2/2012 | Robertson et al. |
| 8,115,618 B2 | 2/2012 | Robertson et al. |
| 8,119,045 B2 | 2/2012 | Schmidt et al. |
| 8,123,576 B2 | 2/2012 | Kim |
| 8,131,376 B1 | 3/2012 | Faraji et al. |
| 8,135,596 B2 | 3/2012 | Jung et al. |
| 8,140,143 B2 | 3/2012 | Picard et al. |
| 8,142,513 B2 | 3/2012 | Shalon et al. |
| 8,160,672 B2 | 4/2012 | Kim et al. |
| 8,170,515 B2 | 5/2012 | Le Reverend et al. |
| 8,177,611 B2 | 5/2012 | Kang |
| 8,180,425 B2 | 5/2012 | Selvitelli et al. |
| 8,184,854 B2 | 5/2012 | Bartsch |
| 8,185,191 B1 | 5/2012 | Shapiro et al. |
| 8,185,646 B2 | 5/2012 | Headley |
| 8,190,230 B2 | 5/2012 | Rytky |
| 8,193,821 B2 | 6/2012 | Mueller |
| 8,200,320 B2 | 6/2012 | Kovacs |
| 8,207,731 B2 | 6/2012 | Moskalenko |
| 8,209,018 B2 | 6/2012 | Osorio et al. |
| 8,214,007 B2 | 7/2012 | Baker et al. |
| 8,224,596 B2 | 7/2012 | Agrawal et al. |
| 8,224,667 B1 | 7/2012 | Miller et al. |
| 8,238,998 B2 | 8/2012 | Park |
| 8,249,686 B2 | 8/2012 | Libbus et al. |
| 8,253,586 B1 | 8/2012 | Matak |
| 8,254,853 B2 | 8/2012 | Rofougaran |
| 8,258,962 B2 | 9/2012 | Robertson et al. |
| 8,262,394 B2 | 9/2012 | Walker et al. |
| 8,271,106 B2 | 9/2012 | Wehba et al. |
| 8,271,146 B2 | 9/2012 | Heber et al. |
| 8,285,356 B2 | 10/2012 | Bly et al. |
| 8,290,574 B2 | 10/2012 | Felid et al. |
| 8,298,574 B2 | 10/2012 | Tsabari et al. |
| 8,301,232 B2 | 10/2012 | Albert et al. |
| 8,308,640 B2 | 11/2012 | Baldus et al. |
| 8,314,619 B2 | 11/2012 | Takiguchi |
| 8,315,687 B2 | 11/2012 | Cross et al. |
| 8,321,672 B2 | 11/2012 | Asano |
| 8,332,009 B2 | 12/2012 | McLaughlin et al. |
| 8,343,068 B2 | 1/2013 | Najafi et al. |
| 8,360,976 B2 | 1/2013 | Imran |
| 8,369,936 B2 | 2/2013 | Farringdon et al. |
| 8,374,698 B2 | 2/2013 | Ok et al. |
| 8,386,009 B2 | 2/2013 | Lindberg et al. |
| 8,389,003 B2 | 3/2013 | Mintchev et al. |
| 8,404,275 B2 | 3/2013 | Habboushe |
| 8,425,492 B2 | 4/2013 | Herbert et al. |
| 8,440,274 B2 | 5/2013 | Wang |
| 8,443,214 B2 | 5/2013 | Lee et al. |
| 8,454,528 B2 | 6/2013 | Yuen et al. |
| 8,454,561 B2 | 6/2013 | Uber, III et al. |
| 8,471,960 B2 | 6/2013 | Lin et al. |
| 8,514,086 B2 | 8/2013 | Harper et al. |
| 8,514,979 B2 | 8/2013 | Laporte |
| 8,515,559 B2 | 8/2013 | Roberts et al. |
| 8,532,776 B2 | 9/2013 | Greenberg et al. |
| 8,538,544 B2 | 9/2013 | Sivard |
| 8,540,632 B2 | 9/2013 | Robertson et al. |
| 8,540,633 B2 | 9/2013 | Hafezi et al. |
| 8,540,664 B2 | 9/2013 | Robertson et al. |
| 8,542,123 B2 | 9/2013 | Robertson |
| 8,545,402 B2 | 10/2013 | Hafezi et al. |

(56) References Cited

U.S. PATENT DOCUMENTS

| | | |
|---|---|---|
| 8,545,436 B2 | 10/2013 | Robertson et al. |
| 8,547,248 B2 | 10/2013 | Zdeblick et al. |
| 8,548,033 B2 | 10/2013 | Nemeth et al. |
| 8,558,563 B2 | 10/2013 | Zdeblick |
| 8,564,432 B2 | 10/2013 | Covannon et al. |
| 8,564,627 B2 | 10/2013 | Suzuki et al. |
| 8,583,227 B2 | 11/2013 | Savage et al. |
| 8,597,186 B2 | 12/2013 | Hafezi et al. |
| 8,604,974 B2 | 12/2013 | Ganeshan |
| 8,615,290 B2 | 12/2013 | Lin et al. |
| 8,620,402 B2 | 12/2013 | Parker, III et al. |
| 8,634,838 B2 | 1/2014 | Hellwig et al. |
| 8,647,358 B2 | 2/2014 | Brister et al. |
| 8,660,645 B2 | 2/2014 | Stevenson et al. |
| 8,668,280 B2 | 3/2014 | Heller et al. |
| 8,668,643 B2 | 3/2014 | Kinast |
| 8,674,825 B2 | 3/2014 | Robertson et al. |
| 8,685,451 B2 | 4/2014 | Toneguzzo et al. |
| 8,697,057 B2 | 4/2014 | Van Epps et al. |
| 8,698,006 B2 | 4/2014 | Bealka et al. |
| 8,718,193 B2 | 5/2014 | Arne et al. |
| 8,721,540 B2 | 5/2014 | Hafezi et al. |
| 8,722,085 B2 | 5/2014 | McKinney et al. |
| 8,725,243 B2 | 5/2014 | Dilorenzo et al. |
| 8,730,031 B2 | 5/2014 | Thompson et al. |
| 8,754,799 B2 | 6/2014 | Coln et al. |
| 8,758,237 B2 | 6/2014 | Sherman et al. |
| 8,762,733 B2 | 6/2014 | Derchak et al. |
| 8,771,183 B2 | 7/2014 | Sloan |
| 8,773,258 B2 | 7/2014 | Vosch et al. |
| 8,776,198 B2 | 7/2014 | Tsitkova et al. |
| 8,784,308 B2 | 7/2014 | Duck et al. |
| 8,802,183 B2 | 8/2014 | Frank et al. |
| 8,810,260 B1 | 8/2014 | Zhou |
| 8,810,409 B2 | 8/2014 | Robertson et al. |
| 8,816,847 B2 | 8/2014 | Zdeblick et al. |
| 8,823,510 B2 | 9/2014 | Downey et al. |
| 8,836,513 B2 | 9/2014 | Hafezi et al. |
| 8,838,217 B2 | 9/2014 | Myr |
| 8,847,766 B2 | 9/2014 | Zdeblick et al. |
| 8,858,432 B2 | 10/2014 | Robertson |
| 8,868,453 B2 | 10/2014 | Zdeblick |
| 8,886,281 B2 | 11/2014 | Pernu et al. |
| 8,892,194 B2 | 11/2014 | Balji et al. |
| 8,908,943 B2 | 12/2014 | Berry et al. |
| 8,912,908 B2 | 12/2014 | Berkman et al. |
| 8,920,345 B2 | 12/2014 | Greenberg |
| 8,923,956 B2 | 12/2014 | Clark et al. |
| 8,926,509 B2 | 1/2015 | Magar et al. |
| 8,932,221 B2 | 1/2015 | Colliou et al. |
| 8,945,005 B2 | 2/2015 | Hafezi et al. |
| 8,945,328 B2 | 2/2015 | Longinotti et al. |
| 8,951,234 B2 | 2/2015 | Hafezi et al. |
| 8,956,287 B2 | 2/2015 | Zdeblick et al. |
| 8,956,288 B2 | 2/2015 | Hafezi et al. |
| 8,961,412 B2 | 2/2015 | Hafezi et al. |
| 8,966,973 B1 | 3/2015 | Milone |
| 8,989,837 B2 | 3/2015 | Weinstein et al. |
| 9,014,779 B2 | 4/2015 | Zdeblick et al. |
| 9,031,658 B2 | 5/2015 | Chiao et al. |
| 9,047,746 B1 | 6/2015 | Euliano et al. |
| 9,060,708 B2 | 6/2015 | Robertson et al. |
| 9,083,589 B2 | 7/2015 | Arne et al. |
| 9,088,168 B2 | 7/2015 | Mach et al. |
| 9,107,806 B2 | 8/2015 | Hafezi et al. |
| 9,119,554 B2 | 9/2015 | Robertson et al. |
| 9,119,918 B2 | 9/2015 | Robertson et al. |
| 9,125,868 B2 | 9/2015 | McKinney et al. |
| 9,149,423 B2 | 10/2015 | Duck et al. |
| 9,149,577 B2 | 10/2015 | Robertson et al. |
| 9,158,890 B2 | 10/2015 | Meredith et al. |
| 9,161,707 B2 | 10/2015 | Hafezi et al. |
| 9,189,941 B2 | 11/2015 | Eschelman et al. |
| 9,198,608 B2 | 12/2015 | Hafezi et al. |
| 9,211,069 B2 | 12/2015 | Larson et al. |
| 9,226,663 B2 | 1/2016 | Fei |
| 9,226,679 B2 | 1/2016 | Balda |
| 9,235,683 B2 | 1/2016 | Robertson et al. |
| 9,258,035 B2 | 2/2016 | Robertson et al. |
| 9,268,909 B2 | 2/2016 | Jani et al. |
| 9,270,025 B2 | 2/2016 | Robertson et al. |
| 9,270,503 B2 | 2/2016 | Kushner et al. |
| 9,271,897 B2 | 3/2016 | Costello et al. |
| 9,277,864 B2 | 3/2016 | Yang et al. |
| 9,278,177 B2 | 3/2016 | Edwards et al. |
| 9,320,455 B2 | 4/2016 | Hafezi et al. |
| 9,415,010 B2 | 8/2016 | Hafezi et al. |
| 9,433,371 B2 | 9/2016 | Hafezi et al. |
| 9,439,566 B2 | 9/2016 | Arne et al. |
| 9,439,582 B2 | 9/2016 | Berkman et al. |
| 9,439,599 B2 | 9/2016 | Thompson et al. |
| 9,444,503 B2 | 9/2016 | Arne et al. |
| 9,517,012 B2 | 12/2016 | Lane et al. |
| 9,577,864 B2 | 2/2017 | Kushner et al. |
| 9,597,010 B2 | 3/2017 | Thompson et al. |
| 9,597,487 B2 | 3/2017 | Robertson et al. |
| 9,599,679 B2 | 3/2017 | Taylor et al. |
| 9,603,550 B2 | 3/2017 | Behzadi |
| 9,649,066 B2 | 5/2017 | Zdeblick et al. |
| 9,659,423 B2 | 5/2017 | Robertson et al. |
| 9,681,842 B2 | 6/2017 | Zdeblick et al. |
| 9,741,975 B2 | 8/2017 | Laulicht et al. |
| 9,756,874 B2 * | 9/2017 | Arne ............ A23P 20/105 |
| 9,787,511 B2 | 10/2017 | Fleming et al. |
| 9,796,576 B2 | 10/2017 | Thompson |
| 9,820,658 B2 | 11/2017 | Tran |
| 9,883,819 B2 | 2/2018 | Jensen et al. |
| 9,941,931 B2 | 4/2018 | Zdeblick |
| 9,946,297 B2 | 4/2018 | Nazzaro et al. |
| 9,962,107 B2 | 5/2018 | Frank et al. |
| 9,968,284 B2 | 5/2018 | Vidalis et al. |
| 1,009,738 A1 | 10/2018 | Fleming et al. |
| 2001/0027331 A1 | 10/2001 | Thompson |
| 2001/0031071 A1 | 10/2001 | Nichols et al. |
| 2001/0039503 A1 | 11/2001 | Chan et al. |
| 2001/0044588 A1 | 11/2001 | Mault |
| 2001/0051766 A1 | 12/2001 | Gazdinski |
| 2001/0056262 A1 | 12/2001 | Cabiri et al. |
| 2002/0002326 A1 | 1/2002 | Causey et al. |
| 2002/0019586 A1 | 2/2002 | Teller et al. |
| 2002/0026111 A1 | 2/2002 | Ackerman |
| 2002/0032384 A1 | 3/2002 | Raymond et al. |
| 2002/0032385 A1 | 3/2002 | Raymond et al. |
| 2002/0040278 A1 | 4/2002 | Anuzis et al. |
| 2002/0067270 A1 | 6/2002 | Yarin et al. |
| 2002/0077620 A1 | 6/2002 | Sweeney et al. |
| 2002/0128934 A1 | 9/2002 | Shaer |
| 2002/0132226 A1 | 9/2002 | Nair |
| 2002/0136744 A1 | 9/2002 | McGlynn et al. |
| 2002/0138009 A1 | 9/2002 | Brockway et al. |
| 2002/0169696 A1 | 11/2002 | Zara |
| 2002/0179921 A1 | 12/2002 | Cohn |
| 2002/0184415 A1 | 12/2002 | Naghavi et al. |
| 2002/0192159 A1 | 12/2002 | Reitberg |
| 2002/0193669 A1 | 12/2002 | Glukhovsky |
| 2002/0193846 A1 | 12/2002 | Pool et al. |
| 2002/0198470 A1 | 12/2002 | Imran et al. |
| 2003/0017826 A1 | 1/2003 | Fishman et al. |
| 2003/0023150 A1 | 1/2003 | Yokoi et al. |
| 2003/0028226 A1 | 2/2003 | Thompson |
| 2003/0037063 A1 | 2/2003 | Schwartz |
| 2003/0062551 A1 | 4/2003 | Chen et al. |
| 2003/0063522 A1 | 4/2003 | Sagar |
| 2003/0065536 A1 | 4/2003 | Hansen |
| 2003/0076179 A1 | 4/2003 | Branch et al. |
| 2003/0083559 A1 | 5/2003 | Thompson |
| 2003/0091121 A1 | 5/2003 | Kenmochi |
| 2003/0091625 A1 | 5/2003 | Hariharan et al. |
| 2003/0126593 A1 | 7/2003 | Mault |
| 2003/0130714 A1 | 7/2003 | Nielsen et al. |
| 2003/0135128 A1 | 7/2003 | Suffin et al. |
| 2003/0135392 A1 | 7/2003 | Vrijens et al. |
| 2003/0152622 A1 | 8/2003 | Louie-Helm et al. |
| 2003/0158466 A1 | 8/2003 | Lynn et al. |

(56) References Cited

U.S. PATENT DOCUMENTS

| | | |
|---|---|---|
| 2003/0158756 A1 | 8/2003 | Abramson |
| 2003/0162556 A1 | 8/2003 | Libes |
| 2003/0164401 A1 | 9/2003 | Andreasson et al. |
| 2003/0167000 A1 | 9/2003 | Mullick et al. |
| 2003/0171791 A1 | 9/2003 | KenKnight |
| 2003/0171898 A1 | 9/2003 | Tarassenko et al. |
| 2003/0181788 A1 | 9/2003 | Yokoi et al. |
| 2003/0181815 A1 | 9/2003 | Ebner et al. |
| 2003/0185286 A1 | 10/2003 | Yuen |
| 2003/0187337 A1 | 10/2003 | Tarassenko et al. |
| 2003/0187338 A1 | 10/2003 | Say et al. |
| 2003/0195403 A1 | 10/2003 | Berner et al. |
| 2003/0198619 A1 | 10/2003 | Dong et al. |
| 2003/0208113 A1 | 11/2003 | Mault et al. |
| 2003/0213495 A1 | 11/2003 | Fujita et al. |
| 2003/0214579 A1 | 11/2003 | Iddan |
| 2003/0216622 A1 | 11/2003 | Meron et al. |
| 2003/0216625 A1 | 11/2003 | Phipps |
| 2003/0216666 A1 | 11/2003 | Ericson et al. |
| 2003/0216729 A1 | 11/2003 | Marchitto |
| 2003/0216793 A1 | 11/2003 | Karlsson et al. |
| 2003/0219484 A1 | 11/2003 | Sowden et al. |
| 2003/0229382 A1 | 12/2003 | Sun et al. |
| 2003/0232895 A1 | 12/2003 | Omidian et al. |
| 2004/0008123 A1 | 1/2004 | Carrender et al. |
| 2004/0018476 A1 | 1/2004 | LaDue |
| 2004/0019172 A1 | 1/2004 | Yang et al. |
| 2004/0034295 A1 | 2/2004 | Salganicoff |
| 2004/0049245 A1 | 3/2004 | Gass |
| 2004/0073095 A1 | 4/2004 | Causey et al. |
| 2004/0073454 A1 | 4/2004 | Urquhart et al. |
| 2004/0077995 A1 | 4/2004 | Ferek-Petric |
| 2004/0082982 A1 | 4/2004 | Gord et al. |
| 2004/0087839 A1 | 5/2004 | Raymond et al. |
| 2004/0092801 A1 | 5/2004 | Drakulic |
| 2004/0106859 A1 | 6/2004 | Say et al. |
| 2004/0111011 A1 | 6/2004 | Uchiyama et al. |
| 2004/0115507 A1 | 6/2004 | Potter et al. |
| 2004/0115517 A1 | 6/2004 | Fukada et al. |
| 2004/0121015 A1 | 6/2004 | Chidlaw et al. |
| 2004/0122296 A1 | 6/2004 | Hatlestad |
| 2004/0122297 A1 | 6/2004 | Stahmann et al. |
| 2004/0138558 A1 | 7/2004 | Dunki-Jacobs et al. |
| 2004/0147326 A1 | 7/2004 | Stiles |
| 2004/0148140 A1 | 7/2004 | Tarassenko et al. |
| 2004/0153007 A1 | 8/2004 | Harris |
| 2004/0167226 A1 | 8/2004 | Serafini |
| 2004/0167465 A1 | 8/2004 | Mihai et al. |
| 2004/0167801 A1 | 8/2004 | Say et al. |
| 2004/0171914 A1 | 9/2004 | Avni |
| 2004/0193020 A1 | 9/2004 | Chiba |
| 2004/0193029 A1 | 9/2004 | Gluhovsky |
| 2004/0193446 A1 | 9/2004 | Mayer et al. |
| 2004/0199222 A1 | 10/2004 | Sun et al. |
| 2004/0215084 A1 | 10/2004 | Shimizu et al. |
| 2004/0218683 A1 | 11/2004 | Batra |
| 2004/0220643 A1 | 11/2004 | Schmidt |
| 2004/0224644 A1 | 11/2004 | Wu |
| 2004/0225199 A1 | 11/2004 | Evanyk |
| 2004/0253304 A1 | 12/2004 | Gross et al. |
| 2004/0258571 A1 | 12/2004 | Lee et al. |
| 2004/0259899 A1 | 12/2004 | Sanghvi et al. |
| 2004/0260154 A1 | 12/2004 | Sidelnik |
| 2004/0267240 A1 | 12/2004 | Gross et al. |
| 2005/0003074 A1 | 1/2005 | Brown et al. |
| 2005/0010338 A1 | 1/2005 | Kraeling et al. |
| 2005/0017841 A1 | 1/2005 | Doi |
| 2005/0020887 A1 | 1/2005 | Goldberg |
| 2005/0021103 A1 | 1/2005 | DiLorenzo |
| 2005/0021370 A1 | 1/2005 | Riff |
| 2005/0021372 A1 | 1/2005 | Mikkelsen |
| 2005/0024198 A1 | 2/2005 | Ward |
| 2005/0027175 A1 | 2/2005 | Yang |
| 2005/0027205 A1 | 2/2005 | Tarassenko et al. |
| 2005/0038321 A1 | 2/2005 | Fujita et al. |
| 2005/0038680 A1 | 2/2005 | McMahon |
| 2005/0041752 A1 | 2/2005 | Rosen |
| 2005/0043583 A1 | 2/2005 | Killmann et al. |
| 2005/0043634 A1 | 2/2005 | Yokoi et al. |
| 2005/0043894 A1 | 2/2005 | Fernandez |
| 2005/0054897 A1 | 3/2005 | Hashimoto et al. |
| 2005/0055014 A1 | 3/2005 | Coppeta et al. |
| 2005/0062644 A1 | 3/2005 | Leci |
| 2005/0065407 A1 | 3/2005 | Nakamura et al. |
| 2005/0070778 A1 | 3/2005 | Lackey |
| 2005/0075145 A1 | 4/2005 | Dvorak et al. |
| 2005/0090753 A1 | 4/2005 | Goor et al. |
| 2005/0092108 A1 | 5/2005 | Andermo |
| 2005/0096514 A1 | 5/2005 | Starkebaum |
| 2005/0096562 A1 | 5/2005 | Delalic et al. |
| 2005/0101843 A1 | 5/2005 | Quinn |
| 2005/0101872 A1 | 5/2005 | Sattler |
| 2005/0115561 A1 | 6/2005 | Stahmann et al. |
| 2005/0116820 A1 | 6/2005 | Goldreich |
| 2005/0117389 A1 | 6/2005 | Worledge |
| 2005/0121322 A1 | 6/2005 | Say et al. |
| 2005/0131281 A1 | 6/2005 | Ayer et al. |
| 2005/0137480 A1 | 6/2005 | Alt et al. |
| 2005/0143623 A1 | 6/2005 | Kojima |
| 2005/0146594 A1 | 7/2005 | Nakatani et al. |
| 2005/0148883 A1 | 7/2005 | Boesen |
| 2005/0151625 A1 | 7/2005 | Lai |
| 2005/0154277 A1 | 7/2005 | Tang et al. |
| 2005/0154428 A1 | 7/2005 | Bruinsma |
| 2005/0156709 A1 | 7/2005 | Gilbert et al. |
| 2005/0159789 A1 | 7/2005 | Brockway |
| 2005/0165323 A1 | 7/2005 | Montgomery |
| 2005/0177069 A1 | 8/2005 | Takizawa |
| 2005/0182389 A1 | 8/2005 | LaPorte |
| 2005/0187789 A1 | 8/2005 | Hatlestad et al. |
| 2005/0192489 A1 | 9/2005 | Marshall |
| 2005/0197680 A1 | 9/2005 | DelMain et al. |
| 2005/0208251 A1 | 9/2005 | Aisenbrey |
| 2005/0228268 A1 | 10/2005 | Cole |
| 2005/0234307 A1 | 10/2005 | Heinonen |
| 2005/0240305 A1 | 10/2005 | Bogash et al. |
| 2005/0245794 A1 | 11/2005 | Dinsmoor |
| 2005/0245839 A1 | 11/2005 | Stivoric et al. |
| 2005/0259768 A1 | 11/2005 | Yang et al. |
| 2005/0261559 A1 | 11/2005 | Mumford |
| 2005/0267550 A1 | 12/2005 | Hess et al. |
| 2005/0267556 A1 | 12/2005 | Shuros et al. |
| 2005/0267756 A1 | 12/2005 | Schultz et al. |
| 2005/0277912 A1 | 12/2005 | John |
| 2005/0277999 A1 | 12/2005 | Strother et al. |
| 2005/0279054 A1 | 12/2005 | Mauze et al. |
| 2005/0280539 A1 | 12/2005 | Pettus |
| 2005/0285732 A1 | 12/2005 | Sengupta et al. |
| 2005/0285746 A1 | 12/2005 | Sengupta |
| 2005/0288594 A1 | 12/2005 | Lewkowicz et al. |
| 2006/0001496 A1 | 1/2006 | Abrosimov et al. |
| 2006/0028727 A1 | 2/2006 | Moon et al. |
| 2006/0036134 A1 | 2/2006 | Tarassenko et al. |
| 2006/0058602 A1 | 3/2006 | Kwiatkowski et al. |
| 2006/0061472 A1 | 3/2006 | Lovoi et al. |
| 2006/0065713 A1 | 3/2006 | Kingery |
| 2006/0068006 A1 | 3/2006 | Begleiter |
| 2006/0074283 A1 | 4/2006 | Henderson |
| 2006/0074319 A1 | 4/2006 | Barnes et al. |
| 2006/0078765 A1 | 4/2006 | Yang et al. |
| 2006/0089858 A1 | 4/2006 | Ling |
| 2006/0095091 A1 | 5/2006 | Drew |
| 2006/0095093 A1 | 5/2006 | Bettesh et al. |
| 2006/0100533 A1 | 5/2006 | Han |
| 2006/0109058 A1 | 5/2006 | Keating |
| 2006/0110962 A1 | 5/2006 | Powell |
| 2006/0122474 A1 | 6/2006 | Teller et al. |
| 2006/0122494 A1 | 6/2006 | Bouchoucha |
| 2006/0122667 A1 | 6/2006 | Chavan et al. |
| 2006/0129060 A1 | 6/2006 | Lee et al. |
| 2006/0136266 A1 | 6/2006 | Tarassenko et al. |
| 2006/0136744 A1 | 6/2006 | Lange |
| 2006/0142648 A1 | 6/2006 | Banet |
| 2006/0145876 A1 | 7/2006 | Kimura |

(56) References Cited

U.S. PATENT DOCUMENTS

| | | |
|---|---|---|
| 2006/0148254 A1 | 7/2006 | McLean |
| 2006/0149339 A1 | 7/2006 | Burnes |
| 2006/0155174 A1 | 7/2006 | Glukhovsky et al. |
| 2006/0155183 A1 | 7/2006 | Kroecker |
| 2006/0158820 A1 | 7/2006 | Takiguchi |
| 2006/0161225 A1 | 7/2006 | Sormann et al. |
| 2006/0179949 A1 | 8/2006 | Kim |
| 2006/0183992 A1 | 8/2006 | Kawashima |
| 2006/0183993 A1 | 8/2006 | Horn |
| 2006/0184092 A1 | 8/2006 | Atanasoska et al. |
| 2006/0204738 A1 | 9/2006 | Dubrow et al. |
| 2006/0204764 A1 | 9/2006 | Hirao et al. |
| 2006/0210626 A1 | 9/2006 | Spaeder |
| 2006/0216603 A1 | 9/2006 | Choi |
| 2006/0218011 A1 | 9/2006 | Walker |
| 2006/0229053 A1 | 10/2006 | Sivard |
| 2006/0235489 A1 | 10/2006 | Drew |
| 2006/0243288 A1 | 11/2006 | Kim et al. |
| 2006/0247505 A1 | 11/2006 | Siddiqui |
| 2006/0253004 A1 | 11/2006 | Frisch et al. |
| 2006/0253005 A1 | 11/2006 | Drinan |
| 2006/0255064 A1 | 11/2006 | Donaldson |
| 2006/0265246 A1 | 11/2006 | Hoag |
| 2006/0267774 A1 | 11/2006 | Feinberg et al. |
| 2006/0270346 A1 | 11/2006 | Ibrahim |
| 2006/0273882 A1 | 12/2006 | Posamentier |
| 2006/0276702 A1 | 12/2006 | McGinnis |
| 2006/0277097 A1 | 12/2006 | Shafron et al. |
| 2006/0280227 A1 | 12/2006 | Pinkney |
| 2006/0282001 A1 | 12/2006 | Noel |
| 2006/0285607 A1 | 12/2006 | Strodtbeck et al. |
| 2006/0287693 A1 | 12/2006 | Kraft et al. |
| 2006/0289640 A1 | 12/2006 | Mercure |
| 2006/0293607 A1 | 12/2006 | Alt |
| 2007/0000776 A1 | 1/2007 | Karube et al. |
| 2007/0002038 A1 | 1/2007 | Suzuki |
| 2007/0006636 A1 | 1/2007 | King et al. |
| 2007/0008113 A1 | 1/2007 | Spoonhower et al. |
| 2007/0016089 A1 | 1/2007 | Fischell et al. |
| 2007/0027386 A1 | 2/2007 | Such |
| 2007/0027388 A1 | 2/2007 | Chou |
| 2007/0029195 A1 | 2/2007 | Li et al. |
| 2007/0038054 A1 | 2/2007 | Zhou |
| 2007/0049339 A1 | 3/2007 | Barak et al. |
| 2007/0055098 A1 | 3/2007 | Shimizu et al. |
| 2007/0060797 A1 | 3/2007 | Ball |
| 2007/0060800 A1 | 3/2007 | Drinan et al. |
| 2007/0066929 A1 | 3/2007 | Ferren et al. |
| 2007/0072156 A1 | 3/2007 | Kaufman et al. |
| 2007/0073353 A1 | 3/2007 | Rooney et al. |
| 2007/0088194 A1 | 4/2007 | Tahar |
| 2007/0096765 A1 | 5/2007 | Kagan |
| 2007/0106346 A1 | 5/2007 | Bergelson |
| 2007/0123772 A1 | 5/2007 | Euliano |
| 2007/0129622 A1 | 6/2007 | Bourget |
| 2007/0130287 A1 | 6/2007 | Kumar |
| 2007/0135691 A1 | 6/2007 | Zingelewicz et al. |
| 2007/0135803 A1 | 6/2007 | Belson |
| 2007/0142721 A1 | 6/2007 | Berner et al. |
| 2007/0156016 A1 | 7/2007 | Betesh |
| 2007/0160789 A1 | 7/2007 | Merical |
| 2007/0162089 A1 | 7/2007 | Mosesov |
| 2007/0162090 A1 | 7/2007 | Penner |
| 2007/0164752 A1 | 7/2007 | Kato |
| 2007/0167495 A1 | 7/2007 | Brown et al. |
| 2007/0167848 A1 | 7/2007 | Kuo et al. |
| 2007/0172424 A1 | 7/2007 | Roser |
| 2007/0173701 A1 | 7/2007 | Al-Ali |
| 2007/0179347 A1 | 8/2007 | Tarassenko et al. |
| 2007/0179371 A1 | 8/2007 | Peyser et al. |
| 2007/0180047 A1 | 8/2007 | Dong et al. |
| 2007/0185393 A1 | 8/2007 | Zhou |
| 2007/0191002 A1 | 8/2007 | Ge |
| 2007/0196456 A1 | 8/2007 | Stevens |
| 2007/0207793 A1 | 9/2007 | Myer |
| 2007/0207858 A1 | 9/2007 | Breving |
| 2007/0208233 A1 | 9/2007 | Kovacs |
| 2007/0213659 A1 | 9/2007 | Trovato et al. |
| 2007/0237719 A1 | 10/2007 | Jones |
| 2007/0244370 A1 | 10/2007 | Kuo et al. |
| 2007/0244810 A1 | 10/2007 | Rudolph |
| 2007/0249946 A1 | 10/2007 | Kumar et al. |
| 2007/0255198 A1 | 11/2007 | Leong et al. |
| 2007/0255330 A1 | 11/2007 | Lee |
| 2007/0270672 A1 | 11/2007 | Hayter |
| 2007/0279217 A1 | 12/2007 | Venkatraman |
| 2007/0282174 A1 | 12/2007 | Sabatino |
| 2007/0282177 A1 | 12/2007 | Pilz |
| 2007/0291715 A1 | 12/2007 | Laroia et al. |
| 2007/0299480 A1 | 12/2007 | Hill |
| 2008/0000804 A1 | 1/2008 | Carey et al. |
| 2008/0004503 A1 | 1/2008 | Nisani et al. |
| 2008/0014866 A1 | 1/2008 | Lipowshi |
| 2008/0015421 A1 | 1/2008 | Penner |
| 2008/0015494 A1 | 1/2008 | Santini et al. |
| 2008/0015893 A1 | 1/2008 | Miller et al. |
| 2008/0020037 A1 | 1/2008 | Robertson et al. |
| 2008/0021519 A1 | 1/2008 | DeGeest |
| 2008/0021521 A1 | 1/2008 | Shah |
| 2008/0027679 A1 | 1/2008 | Shklarski |
| 2008/0033273 A1 | 2/2008 | Zhou |
| 2008/0033301 A1 | 2/2008 | Dellavecchia et al. |
| 2008/0038588 A1 | 2/2008 | Lee |
| 2008/0039700 A1 | 2/2008 | Drinan et al. |
| 2008/0045843 A1 | 2/2008 | Tsuji et al. |
| 2008/0046038 A1 | 2/2008 | Hill |
| 2008/0051647 A1 | 2/2008 | Wu et al. |
| 2008/0051667 A1 | 2/2008 | Goldreich |
| 2008/0051767 A1 | 2/2008 | Rossing et al. |
| 2008/0058614 A1 | 3/2008 | Banet |
| 2008/0062856 A1 | 3/2008 | Feher |
| 2008/0065168 A1 | 3/2008 | Bitton et al. |
| 2008/0074307 A1 | 3/2008 | Boric-Lubecke |
| 2008/0077015 A1 | 3/2008 | Boric-Lubecke |
| 2008/0077028 A1 | 3/2008 | Schaldach et al. |
| 2008/0077188 A1 | 3/2008 | Denker et al. |
| 2008/0077430 A1 | 3/2008 | Singer et al. |
| 2008/0091089 A1 | 4/2008 | Guillory et al. |
| 2008/0091114 A1 | 4/2008 | Min |
| 2008/0097549 A1 | 4/2008 | Colbaugh |
| 2008/0097917 A1 | 4/2008 | Dicks |
| 2008/0099366 A1 | 5/2008 | Niemic et al. |
| 2008/0103440 A1 | 5/2008 | Ferren et al. |
| 2008/0112885 A1 | 5/2008 | Okunev et al. |
| 2008/0114224 A1 | 5/2008 | Bandy et al. |
| 2008/0119705 A1 | 5/2008 | Patel |
| 2008/0119716 A1 | 5/2008 | Boric-Lubecke |
| 2008/0121825 A1 | 5/2008 | Trovato et al. |
| 2008/0137566 A1 | 6/2008 | Marholev |
| 2008/0139907 A1 | 6/2008 | Rao et al. |
| 2008/0140403 A1 | 6/2008 | Hughes et al. |
| 2008/0146871 A1 | 6/2008 | Arneson et al. |
| 2008/0146889 A1 | 6/2008 | Young |
| 2008/0146892 A1 | 6/2008 | LeBoeuf |
| 2008/0154104 A1 | 6/2008 | Lamego |
| 2008/0166992 A1 | 7/2008 | Ricordi |
| 2008/0175898 A1 | 7/2008 | Jones et al. |
| 2008/0183245 A1 | 7/2008 | Van Oort |
| 2008/0188763 A1 | 8/2008 | John et al. |
| 2008/0188837 A1 | 8/2008 | Belsky et al. |
| 2008/0194912 A1 | 8/2008 | Trovato et al. |
| 2008/0208009 A1 | 8/2008 | Shklarski |
| 2008/0214901 A1 | 9/2008 | Gehman |
| 2008/0214903 A1 | 9/2008 | Orbach |
| 2008/0214985 A1 | 9/2008 | Yanaki |
| 2008/0223936 A1 | 9/2008 | Mickle et al. |
| 2008/0243020 A1 | 10/2008 | Chou |
| 2008/0249360 A1 | 10/2008 | Li |
| 2008/0262320 A1 | 10/2008 | Schaefer et al. |
| 2008/0262336 A1 | 10/2008 | Ryu |
| 2008/0269664 A1 | 10/2008 | Trovato et al. |
| 2008/0275312 A1 | 11/2008 | Mosesov |
| 2008/0281636 A1 | 11/2008 | Jung et al. |
| 2008/0284599 A1 | 11/2008 | Zdeblick et al. |

(56) References Cited

U.S. PATENT DOCUMENTS

| | | |
|---|---|---|
| 2008/0288026 A1 | 11/2008 | Cross et al. |
| 2008/0288027 A1 | 11/2008 | Kroll |
| 2008/0294020 A1 | 11/2008 | Sapounas |
| 2008/0299197 A1 | 12/2008 | Toneguzzo et al. |
| 2008/0300572 A1 | 12/2008 | Rankers |
| 2008/0303638 A1 | 12/2008 | Nguyen |
| 2008/0303665 A1 | 12/2008 | Naik et al. |
| 2008/0306357 A1 | 12/2008 | Korman |
| 2008/0306359 A1 | 12/2008 | Zdeblick et al. |
| 2008/0306360 A1 | 12/2008 | Robertson et al. |
| 2008/0306362 A1 | 12/2008 | Davis |
| 2008/0311852 A1 | 12/2008 | Hansen |
| 2008/0312522 A1 | 12/2008 | Rowlandson |
| 2008/0316020 A1 | 12/2008 | Robertson |
| 2009/0006133 A1 | 1/2009 | Weinert |
| 2009/0009330 A1 | 1/2009 | Sakama et al. |
| 2009/0009332 A1* | 1/2009 | Nunez ............... A01K 11/007 340/572.1 |
| 2009/0024045 A1 | 1/2009 | Prakash |
| 2009/0024112 A1 | 1/2009 | Edwards et al. |
| 2009/0030293 A1 | 1/2009 | Cooper et al. |
| 2009/0030297 A1 | 1/2009 | Miller |
| 2009/0034209 A1 | 2/2009 | Joo |
| 2009/0043171 A1 | 2/2009 | Rule |
| 2009/0047357 A1 | 2/2009 | Tomohira et al. |
| 2009/0048498 A1 | 2/2009 | Riskey |
| 2009/0062634 A1 | 3/2009 | Say et al. |
| 2009/0062670 A1 | 3/2009 | Sterling |
| 2009/0062730 A1 | 3/2009 | Woo |
| 2009/0069642 A1 | 3/2009 | Gao |
| 2009/0069655 A1 | 3/2009 | Say et al. |
| 2009/0069656 A1 | 3/2009 | Say et al. |
| 2009/0069657 A1 | 3/2009 | Say et al. |
| 2009/0069658 A1 | 3/2009 | Say et al. |
| 2009/0069724 A1 | 3/2009 | Otto et al. |
| 2009/0076340 A1 | 3/2009 | Libbus et al. |
| 2009/0076343 A1 | 3/2009 | James |
| 2009/0076350 A1 | 3/2009 | Bly et al. |
| 2009/0076397 A1 | 3/2009 | Libbus et al. |
| 2009/0082645 A1 | 3/2009 | Hafezi et al. |
| 2009/0087483 A1 | 4/2009 | Sison |
| 2009/0088618 A1 | 4/2009 | Ameson |
| 2009/0099435 A1 | 4/2009 | Say et al. |
| 2009/0105561 A1 | 4/2009 | Boydon et al. |
| 2009/0110148 A1 | 4/2009 | Zhang |
| 2009/0112626 A1 | 4/2009 | Talbot |
| 2009/0124871 A1 | 5/2009 | Arshak |
| 2009/0124965 A1 | 5/2009 | Greenberg et al. |
| 2009/0131774 A1 | 5/2009 | Sweitzer |
| 2009/0134181 A1 | 5/2009 | Wachman et al. |
| 2009/0135886 A1 | 5/2009 | Robertson et al. |
| 2009/0142853 A1 | 6/2009 | Warrington et al. |
| 2009/0149708 A1 | 6/2009 | Hyde et al. |
| 2009/0149839 A1 | 6/2009 | Hyde et al. |
| 2009/0153397 A1 | 6/2009 | Li et al. |
| 2009/0157113 A1 | 6/2009 | Marcotte |
| 2009/0157358 A1 | 6/2009 | Kim |
| 2009/0161602 A1 | 6/2009 | Matsumoto |
| 2009/0163789 A1 | 6/2009 | Say et al. |
| 2009/0171180 A1 | 7/2009 | Pering |
| 2009/0171420 A1 | 7/2009 | Brown et al. |
| 2009/0173628 A1 | 7/2009 | Say et al. |
| 2009/0177055 A1 | 7/2009 | Say et al. |
| 2009/0177056 A1 | 7/2009 | Say et al. |
| 2009/0177057 A1 | 7/2009 | Say et al. |
| 2009/0177058 A1 | 7/2009 | Say et al. |
| 2009/0177059 A1 | 7/2009 | Say et al. |
| 2009/0177060 A1 | 7/2009 | Say et al. |
| 2009/0177061 A1 | 7/2009 | Say et al. |
| 2009/0177062 A1 | 7/2009 | Say et al. |
| 2009/0177063 A1 | 7/2009 | Say et al. |
| 2009/0177064 A1 | 7/2009 | Say et al. |
| 2009/0177065 A1 | 7/2009 | Say et al. |
| 2009/0177066 A1 | 7/2009 | Say et al. |
| 2009/0182206 A1 | 7/2009 | Najafi |
| 2009/0182207 A1 | 7/2009 | Riskey et al. |
| 2009/0182212 A1 | 7/2009 | Say et al. |
| 2009/0182213 A1 | 7/2009 | Say et al. |
| 2009/0182214 A1 | 7/2009 | Say et al. |
| 2009/0182215 A1 | 7/2009 | Say et al. |
| 2009/0182388 A1 | 7/2009 | Von Arx |
| 2009/0187088 A1 | 7/2009 | Say et al. |
| 2009/0187089 A1 | 7/2009 | Say et al. |
| 2009/0187090 A1 | 7/2009 | Say et al. |
| 2009/0187091 A1 | 7/2009 | Say et al. |
| 2009/0187092 A1 | 7/2009 | Say et al. |
| 2009/0187093 A1 | 7/2009 | Say et al. |
| 2009/0187094 A1 | 7/2009 | Say et al. |
| 2009/0187095 A1 | 7/2009 | Say et al. |
| 2009/0187381 A1 | 7/2009 | King et al. |
| 2009/0192351 A1 | 7/2009 | Nishino |
| 2009/0192368 A1 | 7/2009 | Say et al. |
| 2009/0192369 A1 | 7/2009 | Say et al. |
| 2009/0192370 A1 | 7/2009 | Say et al. |
| 2009/0192371 A1 | 7/2009 | Say et al. |
| 2009/0192372 A1 | 7/2009 | Say et al. |
| 2009/0192373 A1 | 7/2009 | Say et al. |
| 2009/0192374 A1 | 7/2009 | Say et al. |
| 2009/0192375 A1 | 7/2009 | Say et al. |
| 2009/0192376 A1 | 7/2009 | Say et al. |
| 2009/0192377 A1 | 7/2009 | Say et al. |
| 2009/0192378 A1 | 7/2009 | Say et al. |
| 2009/0192379 A1 | 7/2009 | Say et al. |
| 2009/0194747 A1 | 8/2009 | Zou et al. |
| 2009/0197068 A1 | 8/2009 | Yamaguchi et al. |
| 2009/0198115 A1 | 8/2009 | Say et al. |
| 2009/0198116 A1 | 8/2009 | Say et al. |
| 2009/0198175 A1 | 8/2009 | Say et al. |
| 2009/0203964 A1 | 8/2009 | Shimizu et al. |
| 2009/0203971 A1 | 8/2009 | Sciarappa |
| 2009/0203972 A1 | 8/2009 | Heneghan |
| 2009/0203978 A1 | 8/2009 | Say et al. |
| 2009/0204265 A1 | 8/2009 | Hackett |
| 2009/0210164 A1 | 8/2009 | Say et al. |
| 2009/0216101 A1 | 8/2009 | Say et al. |
| 2009/0216102 A1 | 8/2009 | Say et al. |
| 2009/0227204 A1 | 9/2009 | Robertson et al. |
| 2009/0227876 A1 | 9/2009 | Tran |
| 2009/0227940 A1 | 9/2009 | Say et al. |
| 2009/0227941 A1 | 9/2009 | Say et al. |
| 2009/0227988 A1 | 9/2009 | Wood et al. |
| 2009/0228214 A1 | 9/2009 | Say et al. |
| 2009/0231125 A1 | 9/2009 | Baldus |
| 2009/0234200 A1 | 9/2009 | Husheer |
| 2009/0243833 A1 | 10/2009 | Huang |
| 2009/0247836 A1 | 10/2009 | Cole et al. |
| 2009/0253960 A1 | 10/2009 | Takenaka et al. |
| 2009/0256702 A1 | 10/2009 | Robertson |
| 2009/0260212 A1 | 10/2009 | Schmett et al. |
| 2009/0264714 A1 | 10/2009 | Chou |
| 2009/0264964 A1 | 10/2009 | Abrahamson |
| 2009/0265186 A1 | 10/2009 | Tarassenko et al. |
| 2009/0273467 A1 | 11/2009 | Elixmann |
| 2009/0277815 A1 | 11/2009 | Kohl et al. |
| 2009/0281539 A1 | 11/2009 | Selig |
| 2009/0287109 A1 | 11/2009 | Ferren et al. |
| 2009/0292194 A1 | 11/2009 | Libbus et al. |
| 2009/0295548 A1 | 12/2009 | Ronkka |
| 2009/0296677 A1 | 12/2009 | Mahany |
| 2009/0301925 A1 | 12/2009 | Alloro et al. |
| 2009/0303920 A1 | 12/2009 | Mahany |
| 2009/0306633 A1 | 12/2009 | Trovato et al. |
| 2009/0312619 A1 | 12/2009 | Say et al. |
| 2009/0318303 A1 | 12/2009 | Delamarche et al. |
| 2009/0318761 A1 | 12/2009 | Rabinovitz |
| 2009/0318779 A1 | 12/2009 | Tran |
| 2009/0318783 A1 | 12/2009 | Rohde |
| 2009/0318793 A1 | 12/2009 | Datta |
| 2010/0001841 A1 | 1/2010 | Cardullo |
| 2010/0006585 A1 | 1/2010 | Flowers et al. |
| 2010/0010330 A1 | 1/2010 | Rankers |
| 2010/0015584 A1 | 1/2010 | Singer et al. |
| 2010/0033324 A1 | 2/2010 | Shimizu et al. |
| 2010/0036269 A1 | 2/2010 | Ferren et al. |

(56) References Cited

U.S. PATENT DOCUMENTS

| | | |
|---|---|---|
| 2010/0049004 A1 | 2/2010 | Edman et al. |
| 2010/0049006 A1 | 2/2010 | Magar |
| 2010/0049012 A1 | 2/2010 | Dijksman et al. |
| 2010/0049069 A1 | 2/2010 | Tarassenko et al. |
| 2010/0049263 A1 | 2/2010 | Reeve |
| 2010/0056878 A1 | 3/2010 | Partin |
| 2010/0056891 A1 | 3/2010 | Say et al. |
| 2010/0056939 A1 | 3/2010 | Tarassenko et al. |
| 2010/0057041 A1 | 3/2010 | Hayter |
| 2010/0062709 A1 | 3/2010 | Kato |
| 2010/0063438 A1 | 3/2010 | Bengtsson |
| 2010/0063841 A1 | 3/2010 | D'Ambrosia et al. |
| 2010/0069002 A1 | 3/2010 | Rong |
| 2010/0069717 A1 | 3/2010 | Hafezi et al. |
| 2010/0082367 A1 | 4/2010 | Hains et al. |
| 2010/0099967 A1 | 4/2010 | Say et al. |
| 2010/0099968 A1 | 4/2010 | Say et al. |
| 2010/0099969 A1 | 4/2010 | Say et al. |
| 2010/0100077 A1 | 4/2010 | Rush |
| 2010/0100078 A1 | 4/2010 | Say et al. |
| 2010/0100237 A1 | 4/2010 | Ratnakar |
| 2010/0106001 A1 | 4/2010 | Say et al. |
| 2010/0118853 A1 | 5/2010 | Godfrey |
| 2010/0131434 A1 | 5/2010 | Magent et al. |
| 2010/0139672 A1 | 6/2010 | Kroll et al. |
| 2010/0160742 A1 | 6/2010 | Seidl et al. |
| 2010/0168659 A1 | 7/2010 | Say et al. |
| 2010/0179398 A1 | 7/2010 | Say et al. |
| 2010/0183199 A1 | 7/2010 | Smith et al. |
| 2010/0191073 A1 | 7/2010 | Tarassenko et al. |
| 2010/0203394 A1 | 8/2010 | Bae et al. |
| 2010/0210299 A1 | 8/2010 | Gorbachov |
| 2010/0217100 A1 | 8/2010 | LeBoeuf et al. |
| 2010/0222652 A1 | 9/2010 | Cho |
| 2010/0228113 A1 | 9/2010 | Solosko |
| 2010/0233026 A1 | 9/2010 | Ismagliov et al. |
| 2010/0234706 A1 | 9/2010 | Gilland |
| 2010/0234715 A1 | 9/2010 | Shin |
| 2010/0234914 A1 | 9/2010 | Shen |
| 2010/0245091 A1 | 9/2010 | Singh |
| 2010/0249541 A1 | 9/2010 | Geva et al. |
| 2010/0249881 A1 | 9/2010 | Corndorf |
| 2010/0256461 A1 | 10/2010 | Mohamedali |
| 2010/0259543 A1 | 10/2010 | Tarassenko et al. |
| 2010/0268048 A1 | 10/2010 | Say et al. |
| 2010/0268049 A1 | 10/2010 | Say et al. |
| 2010/0268050 A1 | 10/2010 | Say et al. |
| 2010/0268288 A1 | 10/2010 | Hunter et al. |
| 2010/0274111 A1 | 10/2010 | Say et al. |
| 2010/0280345 A1 | 11/2010 | Say et al. |
| 2010/0280346 A1 | 11/2010 | Say et al. |
| 2010/0295694 A1 | 11/2010 | Kauffman et al. |
| 2010/0297640 A1 | 11/2010 | Kumar et al. |
| 2010/0298650 A1 | 11/2010 | Moon et al. |
| 2010/0298668 A1 | 11/2010 | Hafezi et al. |
| 2010/0298730 A1 | 11/2010 | Tarassenko et al. |
| 2010/0299155 A1 | 11/2010 | Findlay et al. |
| 2010/0311482 A1 | 12/2010 | Lange |
| 2010/0312188 A1 | 12/2010 | Robertson et al. |
| 2010/0312577 A1 | 12/2010 | Goodnow et al. |
| 2010/0312580 A1 | 12/2010 | Tarassenko et al. |
| 2010/0332443 A1 | 12/2010 | Gartenberg |
| 2011/0004079 A1 | 1/2011 | Al Ali et al. |
| 2011/0009715 A1 | 1/2011 | O'Reilly et al. |
| 2011/0021983 A1 | 1/2011 | Jurson |
| 2011/0029622 A1 | 2/2011 | Walker et al. |
| 2011/0050431 A1 | 3/2011 | Hood et al. |
| 2011/0054265 A1 | 3/2011 | Hafezi et al. |
| 2011/0065983 A1 | 3/2011 | Hafezi et al. |
| 2011/0077660 A1 | 3/2011 | Janik et al. |
| 2011/0081860 A1 | 4/2011 | Brown et al. |
| 2011/0105864 A1 | 5/2011 | Robertson et al. |
| 2011/0112686 A1 | 5/2011 | Nolan et al. |
| 2011/0124983 A1 | 5/2011 | Kroll et al. |
| 2011/0134906 A1 | 6/2011 | Garudadri et al. |
| 2011/0144470 A1 | 6/2011 | Mazar et al. |
| 2011/0160549 A1 | 6/2011 | Saroka et al. |
| 2011/0166937 A1 | 7/2011 | Bangera et al. |
| 2011/0196454 A1 | 8/2011 | Strand et al. |
| 2011/0208013 A1 | 8/2011 | Phan et al. |
| 2011/0212782 A1 | 9/2011 | Thompson et al. |
| 2011/0224912 A1 | 9/2011 | Bhavaraju et al. |
| 2011/0230732 A1 | 9/2011 | Edman et al. |
| 2011/0237924 A1 | 9/2011 | McGusty et al. |
| 2011/0270112 A1 | 11/2011 | Manera et al. |
| 2011/0270135 A1 | 11/2011 | Dooley et al. |
| 2011/0279963 A1 | 11/2011 | Kumar et al. |
| 2012/0004520 A1 | 1/2012 | Whitworth et al. |
| 2012/0011699 A1 | 1/2012 | Hafezi et al. |
| 2012/0016231 A1 | 1/2012 | Westmoreland |
| 2012/0024889 A1 | 2/2012 | Robertson et al. |
| 2012/0029307 A1 | 2/2012 | Paquet et al. |
| 2012/0029309 A1 | 2/2012 | Paquet et al. |
| 2012/0032778 A1 | 2/2012 | Nakano et al. |
| 2012/0032816 A1 | 2/2012 | Cho et al. |
| 2012/0062371 A1 | 3/2012 | Radivojevic et al. |
| 2012/0071743 A1 | 3/2012 | Todorov et al. |
| 2012/0083715 A1 | 4/2012 | Yuen et al. |
| 2012/0086550 A1 | 4/2012 | LeBlanc |
| 2012/0089000 A1 | 4/2012 | Bishay et al. |
| 2012/0101396 A1 | 4/2012 | Solosko et al. |
| 2012/0109112 A1 | 5/2012 | Strand et al. |
| 2012/0116184 A1 | 5/2012 | Shieh |
| 2012/0179004 A1 | 7/2012 | Roesicke et al. |
| 2012/0197144 A1 | 8/2012 | Christ et al. |
| 2012/0214140 A1 | 8/2012 | Brynelson et al. |
| 2012/0245043 A1 | 9/2012 | England |
| 2012/0265544 A1 | 10/2012 | Hwang et al. |
| 2012/0276451 A1 | 11/2012 | Lestriez et al. |
| 2012/0299723 A1 | 11/2012 | Hafezi et al. |
| 2012/0310070 A1 | 12/2012 | Kumar et al. |
| 2012/0316413 A1 | 12/2012 | Liu et al. |
| 2013/0002423 A1 | 1/2013 | Robertson et al. |
| 2013/0030259 A1 | 1/2013 | Thomsen et al. |
| 2013/0057385 A1 | 3/2013 | Murakami et al. |
| 2013/0060115 A1 | 3/2013 | Gehman et al. |
| 2013/0073312 A1 | 3/2013 | Thompson et al. |
| 2013/0129869 A1 | 5/2013 | Hafezi et al. |
| 2013/0129872 A1 | 5/2013 | Kruger |
| 2013/0171596 A1 | 7/2013 | French |
| 2013/0172690 A1 | 7/2013 | Arne et al. |
| 2013/0185228 A1 | 7/2013 | Dresner |
| 2013/0196012 A1 | 8/2013 | Dill |
| 2013/0199662 A1 | 8/2013 | Gebbink |
| 2013/0209877 A1 | 8/2013 | Kren et al. |
| 2013/0223028 A1 | 8/2013 | Arne et al. |
| 2013/0231188 A1 | 9/2013 | Berberich et al. |
| 2013/0238647 A1 | 9/2013 | Thompson |
| 2013/0275296 A1 | 10/2013 | Tietzen et al. |
| 2013/0328416 A1 | 12/2013 | Whitworth et al. |
| 2013/0338452 A1 | 12/2013 | Robertson et al. |
| 2014/0004492 A1 | 1/2014 | O'Reilly et al. |
| 2014/0039445 A1 | 2/2014 | Austin et al. |
| 2014/0051965 A1 | 2/2014 | Zdeblick et al. |
| 2014/0066726 A1 | 3/2014 | Costello |
| 2014/0066734 A1 | 3/2014 | Zdeblick |
| 2014/0179221 A1 | 6/2014 | Whitworth et al. |
| 2014/0180202 A1 | 6/2014 | Zdeblick et al. |
| 2014/0203950 A1 | 7/2014 | Zdeblick et al. |
| 2014/0280125 A1 | 9/2014 | Bhardwaj et al. |
| 2014/0300490 A1 | 10/2014 | Kotz et al. |
| 2014/0308930 A1 | 10/2014 | Tran |
| 2014/0315170 A1 | 10/2014 | Ionescu et al. |
| 2014/0349256 A1 | 11/2014 | Connor |
| 2014/0374276 A1 | 12/2014 | Guthrie et al. |
| 2015/0017486 A1 | 1/2015 | Lai |
| 2015/0051465 A1 | 2/2015 | Robertson et al. |
| 2015/0080678 A1 | 3/2015 | Frank et al. |
| 2015/0080679 A1 | 3/2015 | Frank et al. |
| 2015/0080680 A1 | 3/2015 | Zdeblick et al. |
| 2015/0080681 A1 | 3/2015 | Hafezi et al. |
| 2015/0112243 A1 | 4/2015 | Hafezi et al. |
| 2015/0127737 A1 | 5/2015 | Thompson et al. |
| 2015/0127738 A1 | 5/2015 | Thompson et al. |

(56) References Cited

U.S. PATENT DOCUMENTS

| | | |
|---|---|---|
| 2015/0149375 A1 | 5/2015 | Thompson et al. |
| 2015/0150480 A1 | 6/2015 | Zdeblick et al. |
| 2015/0164746 A1 | 6/2015 | Costello et al. |
| 2015/0165313 A1 | 6/2015 | Thompson et al. |
| 2015/0182170 A1 | 7/2015 | Zdeblick et al. |
| 2015/0182463 A1 | 7/2015 | Hafezi et al. |
| 2015/0193593 A1 | 7/2015 | Zdeblick et al. |
| 2015/0230728 A1 | 8/2015 | Hafezi et al. |
| 2015/0230729 A1 | 8/2015 | Zdeblick et al. |
| 2015/0248833 A1 | 9/2015 | Arne et al. |
| 2015/0352343 A1 | 12/2015 | Hafezi et al. |
| 2015/0361234 A1 | 12/2015 | Hafezi et al. |
| 2016/0033667 A1 | 2/2016 | Schmidt et al. |
| 2016/0106339 A1 | 4/2016 | Behzadi et al. |
| 2016/0155316 A1 | 6/2016 | Hafezi et al. |
| 2016/0324442 A1 | 11/2016 | Zdeblick et al. |
| 2016/0345906 A1 | 12/2016 | Johnson et al. |
| 2016/0380708 A1 | 12/2016 | Dua et al. |
| 2017/0000179 A1 | 1/2017 | Cheng et al. |
| 2017/0014046 A1 | 1/2017 | Hafezi et al. |
| 2017/0020182 A1 | 1/2017 | Schmidt et al. |
| 2017/0215761 A1 | 8/2017 | Zdeblick |
| 2017/0216569 A1 | 8/2017 | Hafezi et al. |
| 2017/0265813 A1 | 9/2017 | Zdeblick et al. |
| 2017/0270779 A1 | 9/2017 | Zdeblick et al. |
| 2017/0274194 A1 | 9/2017 | Robertson et al. |
| 2017/0290513 A1 | 10/2017 | O'Reilly et al. |
| 2017/0296799 A1 | 10/2017 | Hafezi et al. |
| 2017/0303818 A1 | 10/2017 | Behzadi et al. |
| 2018/0026680 A1 | 1/2018 | Shirvani et al. |
| 2018/0096547 A1 | 4/2018 | Robertson et al. |
| 2018/0110441 A1 | 4/2018 | Frank et al. |
| 2018/0214048 A1 | 8/2018 | Zdeblick et al. |
| 2018/0229996 A1 | 8/2018 | Thompson |
| 2018/0279910 A1 | 10/2018 | Jensen et al. |

FOREIGN PATENT DOCUMENTS

| | | |
|---|---|---|
| CN | 1650844 | 8/2005 |
| CN | 2748032 | 12/2005 |
| CN | 1991868 | 7/2007 |
| CN | 101005470 | 7/2007 |
| CN | 101032396 | 9/2007 |
| CN | 201076456 | 6/2008 |
| CN | 101524267 | 9/2009 |
| CN | 101795202 | 8/2010 |
| DE | 10313005 | 10/2004 |
| EP | 0344939 | 12/1989 |
| EP | 0526166 | 2/1993 |
| EP | 0981152 | 2/2000 |
| EP | 1199670 | 4/2002 |
| EP | 1246356 | 10/2002 |
| EP | 1342447 | 9/2003 |
| EP | 1530224 | 5/2005 |
| EP | 1534054 | 5/2005 |
| EP | 1702553 | 9/2006 |
| EP | 1098591 | 1/2007 |
| EP | 1789128 | 5/2007 |
| EP | 1244308 | 12/2007 |
| EP | 2063535 | 5/2009 |
| EP | 2143369 | 1/2010 |
| GB | 775071 | 5/1957 |
| GB | 827762 | 2/1960 |
| GB | 2432862 | 6/2007 |
| IL | 172917 | 6/2010 |
| JP | S6117949 | 1/1986 |
| JP | 61072712 | 4/1986 |
| JP | S62112529 | 5/1987 |
| JP | S63280393 | 11/1988 |
| JP | H01285247 | 11/1989 |
| JP | 05228128 | 9/1993 |
| JP | H0884779 | 4/1996 |
| JP | 09330159 | 12/1997 |
| JP | 1014898 | 1/1998 |
| JP | H11195415 | 7/1999 |
| JP | 2000506410 | 5/2000 |
| JP | 2001070267 | 3/2001 |
| JP | 2001078974 | 3/2001 |
| JP | 2001198096 | 7/2001 |
| JP | 2002224053 | 8/2002 |
| JP | 2002263185 | 9/2002 |
| JP | 2002282218 | 10/2002 |
| JP | 2002282219 | 10/2002 |
| JP | 2002291684 | 10/2002 |
| JP | 2003050867 | 2/2003 |
| JP | 2003210395 | 7/2003 |
| JP | 3454525 | 10/2003 |
| JP | 2003325440 | 11/2003 |
| JP | 2004007187 | 1/2004 |
| JP | 2004507188 | 3/2004 |
| JP | 2004134384 | 4/2004 |
| JP | 2004274452 | 9/2004 |
| JP | 2004313242 | 11/2004 |
| JP | 2004318534 | 11/2004 |
| JP | 2004364016 | 12/2004 |
| JP | 2005031840 | 2/2005 |
| JP | 2005073886 | 3/2005 |
| JP | 2005087552 | 4/2005 |
| JP | 2005102959 | 4/2005 |
| JP | 2005124708 | 5/2005 |
| JP | 2005514966 | 5/2005 |
| JP | 2005137683 | 6/2005 |
| JP | 2005148021 | 6/2005 |
| JP | 2005152037 | 6/2005 |
| JP | 2005287691 | 10/2005 |
| JP | 2005304880 | 11/2005 |
| JP | 2005532841 | 11/2005 |
| JP | 2005532849 | 11/2005 |
| JP | 2005343515 | 12/2005 |
| JP | 20055332328 | 12/2005 |
| JP | 2006006377 | 1/2006 |
| JP | 2006508752 | 3/2006 |
| JP | 2006509574 | 3/2006 |
| JP | 2006136405 | 6/2006 |
| JP | 2006177699 | 7/2006 |
| JP | 2006187611 | 7/2006 |
| JP | 2006278091 | 10/2006 |
| JP | 2006346000 | 12/2006 |
| JP | 3876573 | 1/2007 |
| JP | 2007151809 | 6/2007 |
| JP | 2007159631 | 6/2007 |
| JP | 2007167448 | 7/2007 |
| JP | 2007200739 | 8/2007 |
| JP | 2007313340 | 12/2007 |
| JP | 2007330677 | 12/2007 |
| JP | 2008011865 | 1/2008 |
| JP | 2008501415 | 1/2008 |
| JP | 2008086390 | 4/2008 |
| JP | 2008176434 | 7/2008 |
| JP | 2008191110 | 8/2008 |
| JP | 2008191955 | 8/2008 |
| JP | 2008212488 | 9/2008 |
| JP | 2008289724 | 12/2008 |
| JP | 2009034345 | 2/2009 |
| JP | 2009050541 | 3/2009 |
| JP | 2009061236 | 3/2009 |
| JP | 2009065726 | 3/2009 |
| JP | 2009514870 | 4/2009 |
| JP | 2009528909 | 8/2009 |
| JP | 2010049490 | 3/2010 |
| JP | 2011015817 | 1/2011 |
| JP | 2011086027 | 4/2011 |
| JP | 2011519583 | 7/2011 |
| JP | 2012200309 | 10/2012 |
| JP | 2012212362 | 11/2012 |
| KR | 20020015907 | 3/2002 |
| KR | 20020061744 | 7/2002 |
| KR | 200600977523 | 7/2006 |
| KR | 927471 | 11/2009 |
| KR | 100927471 | 11/2009 |
| KR | 20110137001 | 12/2011 |
| KR | 10-2012-099995 | 9/2012 |
| TW | 200301864 | 7/2003 |
| TW | 553735 | 9/2003 |

(56) References Cited

FOREIGN PATENT DOCUMENTS

| | | |
|---|---|---|
| TW | 200406192 | 5/2004 |
| TW | 200724094 | 7/2007 |
| TW | 200812556 | 3/2008 |
| TW | 200916136 | 4/2009 |
| TW | 201120673 | 6/2011 |
| WO | WO1988002237 | 4/1988 |
| WO | WO1992021307 | 12/1992 |
| WO | WO1993008734 | 5/1993 |
| WO | WO1993019667 | 10/1993 |
| WO | WO1994001165 | 1/1994 |
| WO | WO9516393 | 6/1995 |
| WO | WO1997014112 | 4/1997 |
| WO | WO1997039963 | 10/1997 |
| WO | WO1998043537 | 10/1998 |
| WO | WO1999037290 | 7/1999 |
| WO | WO1999059465 | 11/1999 |
| WO | WO2000032474 | 6/2000 |
| WO | WO2000033246 | 6/2000 |
| WO | WO2001000085 | 1/2001 |
| WO | WO2001047466 | 7/2001 |
| WO | WO2001049364 | 7/2001 |
| WO | WO2001058236 | 8/2001 |
| WO | WO2001074011 | 10/2001 |
| WO | WO2001080731 | 11/2001 |
| WO | WO2002000920 | 1/2002 |
| WO | WO200235997 | 5/2002 |
| WO | WO2002045489 | 6/2002 |
| WO | WO2002058330 | 7/2002 |
| WO | WO2002062276 | 8/2002 |
| WO | WO2002087681 | 11/2002 |
| WO | WO2002095351 | 11/2002 |
| WO | WO2003005877 | 1/2003 |
| WO | WO2003050643 | 6/2003 |
| WO | WO2003068061 | 8/2003 |
| WO | WO2004014225 | 2/2004 |
| WO | WO2004019172 | 3/2004 |
| WO | WO2004039256 | 5/2004 |
| WO | WO2004059551 | 7/2004 |
| WO | WO2004066833 | 8/2004 |
| WO | WO2004066834 | 8/2004 |
| WO | WO2004066903 | 8/2004 |
| WO | WO2004068748 | 8/2004 |
| WO | WO2004068881 | 8/2004 |
| WO | WO2004075032 | 9/2004 |
| WO | WO2004075751 | 9/2004 |
| WO | WO2004109316 | 12/2004 |
| WO | WO2004110555 | 12/2004 |
| WO | WO2005011237 | 2/2005 |
| WO | WO2005013503 | 2/2005 |
| WO | WO2005020023 | 3/2005 |
| WO | WO2005024687 | 3/2005 |
| WO | WO2005041438 | 5/2005 |
| WO | WO2005041767 | 5/2005 |
| WO | WO2005046575 | 5/2005 |
| WO | WO2005047837 | 5/2005 |
| WO | WO2005051166 | 6/2005 |
| WO | WO2005053517 | 6/2005 |
| WO | WO2005055448 | 6/2005 |
| WO | WO2005069887 | 8/2005 |
| WO | WO2005082436 | 9/2005 |
| WO | WO2005083621 | 9/2005 |
| WO | WO2005084533 | 9/2005 |
| WO | WO2005110238 | 11/2005 |
| WO | WO2005117697 | 12/2005 |
| WO | WO2005123569 | 12/2005 |
| WO | WO2006009404 | 1/2006 |
| WO | WO2006016370 | 2/2006 |
| WO | WO2006021932 | 3/2006 |
| WO | WO2006027586 | 3/2006 |
| WO | WO2006028347 | 3/2006 |
| WO | WO2006035351 | 4/2006 |
| WO | WO2006037802 | 4/2006 |
| WO | WO2006046648 | 5/2006 |
| WO | WO2006055892 | 5/2006 |
| WO | WO2006055956 | 5/2006 |
| WO | WO2006059338 | 6/2006 |
| WO | WO2006066566 | 6/2006 |
| WO | WO2006075016 | 7/2006 |
| WO | WO2006094513 | 9/2006 |
| WO | WO2006100620 | 9/2006 |
| WO | WO2006104843 | 10/2006 |
| WO | WO2006109072 | 10/2006 |
| WO | WO2006116718 | 11/2006 |
| WO | WO2006119345 | 11/2006 |
| WO | WO2006123346 | 11/2006 |
| WO | WO2006127355 | 11/2006 |
| WO | WO2007001724 | 1/2007 |
| WO | WO2007001742 | 1/2007 |
| WO | WO2007013952 | 2/2007 |
| WO | WO2007014084 | 2/2007 |
| WO | WO2007014527 | 2/2007 |
| WO | WO2007021496 | 2/2007 |
| WO | WO2007027660 | 3/2007 |
| WO | WO2007028035 | 3/2007 |
| WO | WO2007036687 | 4/2007 |
| WO | WO2007036741 | 4/2007 |
| WO | WO2007036746 | 4/2007 |
| WO | WO2007040878 | 4/2007 |
| WO | WO2007067054 | 6/2007 |
| WO | WO2007071180 | 6/2007 |
| WO | WO2007096810 | 8/2007 |
| WO | WO2007101141 | 9/2007 |
| WO | WO2007115087 | 10/2007 |
| WO | WO2007120946 | 10/2007 |
| WO | WO2007123923 | 11/2007 |
| WO | WO2007127316 | 11/2007 |
| WO | WO2007127455 | 11/2007 |
| WO | WO2007127879 | 11/2007 |
| WO | WO2007127945 | 11/2007 |
| WO | WO2007128165 | 11/2007 |
| WO | WO2007130491 | 11/2007 |
| WO | WO2007133526 | 11/2007 |
| WO | WO2007143535 | 12/2007 |
| WO | WO2007149546 | 12/2007 |
| WO | WO2008002239 | 1/2008 |
| WO | WO2008008281 | 1/2008 |
| WO | WO2008012700 | 1/2008 |
| WO | WO2008030482 | 3/2008 |
| WO | WO2008039030 | 4/2008 |
| WO | WO2008052136 | 5/2008 |
| WO | WO2008061138 | 5/2008 |
| WO | WO2008063626 | 5/2008 |
| WO | WO2008066617 | 6/2008 |
| WO | WO2008068695 | 6/2008 |
| WO | WO2008076464 | 6/2008 |
| WO | WO2008085131 | 7/2008 |
| WO | WO2008089232 | 7/2008 |
| WO | WO2008091683 | 7/2008 |
| WO | WO2008095183 | 8/2008 |
| WO | WO2008097652 | 8/2008 |
| WO | WO2008101107 | 8/2008 |
| WO | WO2008112577 | 9/2008 |
| WO | WO2008112578 | 9/2008 |
| WO | WO2008120156 | 10/2008 |
| WO | WO2008133394 | 11/2008 |
| WO | WO2008134185 | 11/2008 |
| WO | WO2008150633 | 12/2008 |
| WO | WO2009000447 | 12/2008 |
| WO | WO2009001108 | 12/2008 |
| WO | WO2009005759 | 1/2009 |
| WO | WO2009006615 | 1/2009 |
| WO | WO2009022343 | 2/2009 |
| WO | WO2009029453 | 3/2009 |
| WO | WO2009031149 | 3/2009 |
| WO | WO2009032381 | 3/2009 |
| WO | WO2009035773 | 3/2009 |
| WO | WO2009036334 | 3/2009 |
| WO | WO2009051829 | 4/2009 |
| WO | WO2009051830 | 4/2009 |
| WO | WO2009063377 | 5/2009 |
| WO | WO2009081348 | 7/2009 |
| WO | WO2009111664 | 9/2009 |
| WO | WO2009146082 | 12/2009 |
| WO | WO2010003175 | 1/2010 |

(56) References Cited

FOREIGN PATENT DOCUMENTS

| | | |
|---|---|---|
| WO | WO2010009100 | 1/2010 |
| WO | WO2010011833 | 1/2010 |
| WO | WO2010019778 | 2/2010 |
| WO | WO2010057049 | 5/2010 |
| WO | WO2010075115 | 7/2010 |
| WO | WO2010080765 | 7/2010 |
| WO | WO2010080843 | 7/2010 |
| WO | WO2010105053 | 9/2010 |
| WO | WO2010107563 | 9/2010 |
| WO | WO2010107980 | 9/2010 |
| WO | WO2010115194 | 10/2010 |
| WO | WO2010129288 | 11/2010 |
| WO | WO2010132331 | 11/2010 |
| WO | WO2010135516 | 11/2010 |
| WO | WO2011024560 | 3/2011 |
| WO | WO2011068963 | 6/2011 |
| WO | WO2011133799 | 10/2011 |
| WO | WO2011159336 | 12/2011 |
| WO | WO2011159337 | 12/2011 |
| WO | WO2011159338 | 12/2011 |
| WO | WO2011159339 | 12/2011 |
| WO | WO2012104657 | 8/2012 |
| WO | WO2012112561 | 8/2012 |
| WO | WO2012158190 | 11/2012 |
| WO | WO2013012869 | 1/2013 |
| WO | WO2015042411 | 3/2015 |
| WO | WO2015044722 | 4/2015 |
| WO | WO2015112603 | 7/2015 |
| WO | WO2015112604 | 7/2015 |
| WO | WO2015119911 | 8/2015 |

OTHER PUBLICATIONS

Aronson, J., "Meyer's Side Effects of Cardiovascular Drugs," Elsevier, Mar. 2, 2009, Medical, 840 pages. (Not Attached).
Arshak et al., A Review and Adaptation of Methods of Object Tracking to Telemetry Capsules IC-Med (2007) vol. 1, No. 1, Issue 1, 12 pp.
"ASGE Technology Status Evaluation Report: wireless capsule endoscopy" American Soc. For Gastrointestinal Endoscopy (2006) vol. 63, No. 4; 7 pp.
Au-Yeung, K., et al., "A Networked System for Self-Management of Drug Therapy and Wellness", Wireless Health '10, Oct. 5-7, 2010, San Diego, 9 pages.
Aydin et al., "Design and implementation considerations for an advanced wireless interface in miniaturized integrated sensor Microsystems" Sch. of Eng. & Electron., Edinburgh Univ., UK; (2003); abstract.
Barrie, Heidelberg pH capsule gastric analysis. Texbook of Natural Medicine, (1992), Pizzorno, Murray & Barrie.
Baskiyar, S. "A Real-time Fault Tolerant Intra-body Network" Dept. of Comp. Sci & Soft Eng; Auburn University; Proceedings of the 27th Annual IEEE Conference; 0742-1303/02 (2002) IEEE; 6 pp.
Bergogne C., et al., "A new frequency estimator applied to burst transmission", IEEE International Conference on Acoustics, Speech and Signal Processing, Apr. 21, 1997, vol. 1, pp. 267-270.
Bohidar et al., "Dielectric Behavior of Gelatin Solutions and Gels" Colloid Polym Sci (1998) 276:81-86.
Brock, "Smart Medicine: The Application of Auto-ID Technology to Healthcare" Auto-ID Labs (2002) http://www.autoidlabs.org/uploads/media/MIT-AUTOID-WH-010.pdf.
Carlson et al., "Evaluation of a non-invasive respiratory monitoring system for sleeping subjects" Physiological Measurement (1999) 20(1): 53.
Chan, Adrian D.C., et al.,; "Wavelet Distance Measure for Person Identification Using Electrocardiograms," IEEE Transactions on Instrumentation and Measurement, IEEE Service Center, Piscataway, NJ, US, vol. 57, No. 2, Feb. 1, 2008, pp. 248-253.
Consolvo, Sunny et al., "Design Requirement for Technologies that Encourage Physical Activity," CHI 2006 Proceedings, Designing for Tangible Interactions, Apr. 22, 2006, Montreal, Quebec, Canada, pp. 457-466.

Coury, L. "Conductance Measurement Part 1: Theory"; Current Separations, 18:3 (1999) p. 91-96.
Delvaux et al., "Capsule endoscopy: Technique and indications" Clinical Gastoenterology (2008) vol. 22, Issue 5, pp. 813-837.
Description of ePatch Technology Platform for ECG and EMG, located it http://www.madebydelta.com/imported/images/DELTA_Web/documents/Me/ePatch_ECG_EMG.pdf, Dated Sep. 2, 2010.
Dhar et al., "Electroless nickel plated contacts on porous silicon" Appl. Phys. Lett. 68 (10) pp. 1392-1393 (1996).
Eldek A., "Design of double dipole antenna with enhanced usable bandwidth for wideband phased array applications" Progress in Electromagnetics Research PIER 59, 1-15 (2006).
Evanczuk, S., "PIC MCU software library uses human body for secure communications link" EDN Network; edn.com; Feb. 26, 2013 Retrieved from internet Jun. 19, 2013 at http://www.edn.com/electronics-products/other/4407842/PIC-MCU-software-library-uses-human-body-for-secure-communications-link; 5 pp.
Fawaz et al., "Enhanced Telemetry System using CP-QPSK Band-Pass Modulation Technique Suitable for Smart Pill Medical Application" IFIP IEEE Dubai Conference (2008); http://www.asic.fh-offenburg.de/downloads/ePille/IFIP_IEEE_Dubai_Conference.pdf.
Ferguson et al., "Dielectric Constant Studies III Aqueous Gelatin Solutions" J. Chem. Phys. 2, 94 (1934) p. 94-98.
Ferguson et al., "Wireless communication with implanted medical devices using the conductive properties of the body," Expert Rev Med Devices, Jul. 2011, 8(4): 427-433.
Furse C. M., "Dipole Antennas" J. Webster (ed). Wiley Encyclopedia of Electrical and Electronics Engineering (1999) p. 575-581.
Gaglani S. "Put Your Phone, Or Skin, on Vibrate" MedGadget; Mar. 2012 http://medgadget.com/2012/03/put-your-phone-or-skin-on-vibrate.html 8pp.
Gilson, D.R. "Molecular dynamics simulation of dipole interactions", Department of Physics, Hull University, Dec. 2002, p. 1-43.
Given Imaging, "Agile Patency Brochure" (2006) http://www.inclino.no/documents/AgilePatencyBrochure_Global_GMB-0118-01.pdf; 4pp.
Gonzalez-Guillaumin et al., "Ingestible capsule for impedance and pH monitoring in the esophagus" IEEE Trans Biomed Eng. (2007) 54(12: 2231-6; abstract.
Greene, "Edible RFID microchip monitor can tell if you take your medicine" Bloomberg Businessweek (2010) 2 pp.; http://www.businessweek.com/idg/2010-03-31/edible-rfid-microchip-monitor-can-tell-if-you-take-your-medicine.html.
Greene, "Medicaid Efforts to Incentivize Healthy Behaviours", Center for Health Care Strategies, Inc., Resource Paper, Jul. 2007 (20 pages).
Halthion Medical Technologies "Providing Ambulatory Medical Devices Which Monitor, Measure and Record" webpage. Online website: http://www.halthion.com/; downloaded May 30, 2012.
Herbig, S.M., "Asymmetric-membrane tablet coatings for osmotic drug delivery", Journal of Controlled Release 35 (1995) 127-136.
Heydari et al., "Analysis of the PLL jitter due to power/ground and substrate noise"; IEEE Transactions on Circuits and Systems (2004) 51(12): 2404-16.
Hoeksma, J. "New 'smart pill' to track adherence" E-Health-Insider; http://www.e-health-insider.com/news/5910/new_'smart_pill'_monitors_medicines; May 17, 2010 (2010); 1pp.
Hoover et al., "Rx for health: Engineers design pill that signals it has been swallowed" University of Florida News (2010) 2pp.; http://news.ufl.edu/2010/03/31/antenna-pill-2/.
Hotz "The Really Smart Phone" The Wall Street Journal, What They Know (2011); 6 pp.; http://online.wsj.com/article/SB10001424052748704547604576263261679848814.html?mod=djemTECH_t.
Intromedic, MicroCam Innovative Capsule Endoscope Pamphlet. (2006) 8 pp (http://www.intromedic.com/en/product/productinfo.asp).
ISFET—Ion Sensitive Field-Effect Transistor; MICROSENS S.A. pdf document. Office Action dated Jun. 13, 2011 for U.S. Appl. No. 12/238,345; 4pp.
Jimbo et al., "Gastric-fluid-utilized micro battery for micro medical devices" The Sixth International Workshop on Micro and Nano-technology for Power Geneartion and Energy Conservation Applications, (2006) pp. 97-100.

(56) References Cited

OTHER PUBLICATIONS

Jung, S. "Dissolvable 'Transient Electronics' Will Be Good For Your Body and the Environment" MedGadget; Oct. 1, 2012; Online website: http://medgadget.com/2012/10/dissolvable-transient-electronics-will-be-good-for-your-body-and-the-environment.html; downloaded Oct. 24, 2012; 4 pp.
Juvenile Diabetes Research Foundation International (JDRF), "Artificial Pancreas Project" (2010); http://www.artificialpancreasproject.com/; 3 pp.
Kamada K., "Electrophoretic deposition assisted by soluble anode" Materials Letters 57 (2003) 2348-2351.
Kang et al., "Nonwoven Fabric Active Electrodes for Biopotential Measurement During Normal Daily Activity," IEEE Trans Biomed Eng. Jan. 2008; vol. 55, No. 1, pp. 188-195.
Kendle, Earl R. and Morris, Larry A., "Preliminary Studies in the Development of a Gastric Battery for Fish" (1964). Nebraska Game and Parks Commission White Papers, Conference Presentations, & Manuscripts. Paper 22. p. 1-6.
Kim et al., "A Semi-Interpenetrating Network System for a Polymer Membrane"; Eur. Polym. J. vol. 33 No. 7; pp. 1009-1014 (1997).
Lee, K. B.; "Two-step activation of paper batteries for high power generation: design and fabrication of biofluid- and wateractivated paper batteries"; J. Micromech. Microeng. 16 (2006) 2312-2317.
Lee, K. B.; "Urine-activated paper batteries for Biosystems"; J. Micromech. Microeng. 15 (2005) S21 O-S214.
Li, P-Y, et al. "An electrochemical intraocular drug delivery device", Sensors and Actuators A 143 (2008) p. 41-48.
Lifescan, "OneTouch UltraLink™" http://www.lifescan.com/products/meters/ultralink (2010) 2 pp.
Lin et al., "Do Physiological Data Relate to Traditional Usability Indexes?" Proceedings of OZCHI 2005, Canberra, Australia (2005) 10 pp.
MacKay et al., "Radio Telemetering from within the Body" Inside Information is Revealed by Tiny Transmitters that can be Swallowed or Implanted in Man or Animal Science (1991) 1196-1202; 134; American Association for the Advancement of Science, Washington D.C.
MacKay et al., "Endoradiosonde" Nature, (1957) 1239-1240, 179 Nature Publishing Group.
Mandryk et al., "A physiological approach for continuously modeling user emotion in interactive play environments" Proceedings of Measuring Behavior (2008) (Maastrichtm The Netherlandsm Aug. 26-29) 2 pp.
Mandryk et al., "Objectively Evaluating Entertainment Technology" Simon Fraser University; CHI (2004) ACM 1-58113-703-6/04/0004; 2 pp.
McDermott-Wells, P., "What is Bluetooth?", IEEE Potentials, IEEE, New York, NY, vol. 23, No. 5, Dec. 1, 2004, pp. 33-35.
McKenzie et al., "Validation of a new telemetric core temperature monitor" J. Therm. Biol. (2004) 29(7-8):605-11.
Medtronic, "CareLink Therapy Management Software for Diabetes" (2010); https://carelink.minimed.com/patient/entry.jsp?bhcp=1; 1 pp.
Medtronic, "Carelink™ USB" (2008) http://www.medtronicdiabetes.com/pdf/carelink_usb_factsheet.pdf 2pp.
Medtronic "The New MiniMed Paradigm® REAL-Time Revel™ System" (2010) http://www.medtronicdiabetes.com/products/index.html; 2 pp.
Medtronic, "Mini Med Paradigm® Revel™ Insulin Pump" (2010) http://www.medtronicdiabetes.com/products/insulinpumps/index.html; 2 pp.
Medtronic, Mini Med Paradigm™ Veo™ System: Factsheet (2010). http://www.medtronic-diabetes.com.au/downloads/Paradigm%20Veo%20Factsheet.pdf; 4 pp.
Melanson, "Walkers swallow RFID pills for science" Engadget (2008); http://www.engadget.com/2008/07/29/walkers-swallow-rfid-pills-for-science/.
Minimitter Co. Inc. "Actiheart" Traditional 510(k) Summary. Sep. 27, 2005.
Minimitter Co. Inc. Noninvasive technology to help your studies succeed. Mini Mitter.com Mar. 31, 2009.
Mini Mitter Co, Inc. 510(k) Premarket Notification Mini-Logger for Diagnostic Spirometer. Sep. 21, 1999.
Mini Mitter Co, Inc. 510(k) Premarket Notification for VitalSense. Apr. 22, 2004.
Minimitter Co. Inc. VitalSense Integrated Physiological Monitoring System. Product Description. (2005).
Minimitter Co. Inc. VitalSense Wireless Vital Signs Monitoring. Temperatures.com Mar. 31, 2009.
Mojaverian et al., "Estimation of gastric residence time of the Heidelberg capsule in humans: effect of varying food composition" Gastroenterology (1985) 89:(2): 392-7.
"New 'smart pill' to track adherence" E-Health-Insider (2010) http://www.e-health-insider.com/news/5910/new_'smart_pill'_monitors_medicines.
O'Brien et al., "The Production and Characterization of Chemically Reactive Porous Coatings of Zirconium Via Unbalanced Magnetron Sputtering" Surface and Coatings Technology (1996) 86-87; 200-206.
Owano, N., "Study proposes smart sutures with sensors for wounds" phys.org. Aug. 2012. http://phys.org/news/2012-08-smart-sutures-sensors-wounds.html.
"PALO Bluetooth Baseband" PALO Bluetooth Resource Center; Retrieved from internet Dec. 12, 2012 at URL:http://palowireless.com/bluearticles/baseband.asp; first cited in Office Action dated Jan. 17, 2013 for EP08853901.0 (2013); 6pp.
Park, "Medtronic to Buy MiniMed for $3.7 Billion" (2001) HomeCare; http://homecaremag.com/mag/medical_medtronic_buy_minimed/; 2 pp.
Philips Respironics Products, Noninvasive Technology to Help Your Studies Succeed. 510 (k) Permanent Notification for Vital Sense. Apr. 22, 2004; http/minimitter.com/products.cfm.
Platt, D., "Modulation and Deviation" AE6EO, Foothills Amateur Radio Society; Oct. 26, 2007; 61 pp.
Radio Antennae, http://www.erikdeman.de/html/sail018h.htm; (2008) 5 pages.
"RFID "pill" monitors marchers" RFID News (2008) http://www.rfidnews.org/2008/07/23/rfid-pill-monitors-marchers/.
Rolison et al., "Electrically conductive oxide aerogels: new materials in electrochemistry" J. Mater. Chem. (2001) 1, 963-980.
Roulstone, et al., "Studies on Polymer Latex Films: I. A study of latex film morphology" Polymer International 24 (1991) pp. 87-94.
Sammoura, F. et al., "Water-activated disposable and long shelf life microbatteries", Sensors and Actuators A 111 (2004) 79-86.
Sanduleanu et al., "Octave tunable, highly linear, RC-ring oscillator with differential fine-coarse tuning, quadrature outputs and amplitude control for fiber optic transceivers" (2002) IEEE MTT-S International Microwave Symposium Digest 545-8.
Santini, J.T. et al, "Microchips as controlled drug delivery-devices", Agnew. Chem. Int. Ed. (2000), vol. 39, p. 2396-2407.
"SensiVida minimally invasive clinical systems" Investor Presentation Oct. 2009 28pp; http://www.sensividamedtech.com/SensiVidaGeneralOctober09.pdf.
Sharma, et al., "The Future is Wireless: Advances in Wireless Diagnostic and Therapeutic Technologies in Gastoenterology," Gastroenterology, Elesevier, Philadelphia, PA, vol. 137, No. 2, Aug. 1, 2009, pp. 434-439.
Shawgo, R.S. et al. "BioMEMS from drug delivery", Current Opinion in Solid State and Material Science 6 (2002), p. 329-334.
Shin et al., "A Simple Route to Metal Nanodots and Nanoporous Metal Films"; Nano Letters, vol. 2, No. 9 (2002) pp. 933-936.
Shrivas et al., "A New Platform for Bioelectronics-Electronic Pill", Cummins College, (2010).; http://www.cumminscollege.org/downloads/electronics_and_telecommunication/Newsletters/Current%20Newsletters.pdf; First cited in third party client search conducted by Patent Eagle Search May 18, 2010 (2010).
"Smartlife awarded patent for knitted transducer" Innovation in Textiles News: http://www.innovationintextiles.com/articles/208.php; 2pp. (2009).
"The SmartPill Wireless Motility Capsule" Smartpill, The Measure of GI Health; (2010) http://www.smartpillcorp.com/index.cfm?pagepath=Products/The_SmartPill_Capsule&id=17814.

(56) References Cited

OTHER PUBLICATIONS

Solanas et al., "RFID Technology for the Health Care Sector" Recent Patents on Electrical Engineering (2008) 1, 22-31.

Soper, S.A. et al. "Bio-Mems Technologies and Applications", Chapter 12, "MEMS for Drug Delivery", p. 325-346 (2007).

Swedberg, "University Team Sees Ingestible RFID Tag as a Boon to Clinical Trials" RFID Journal (2010) Apr. 27; http://www.rfidjournal.com/article/view/7560/1.

Tajalli et al., "Improving the power-delay performance in subthreshold source-coupled logic circuits" Integrated Circuit and System Design. Power and Timing Modeling, Optimization and Simulation, Springer Berlin Heidelberg (2008) 21-30.

Target Innovations, Tablet Metal Detector, https ://web. arch ive. org/web/20 130215063351/http://www.metaldetectorindia.com/tablet -metal-detector. html, Feb. 15, 2013.

TargetPharmaceutical Metal Detector, Feb. 15, 2013 downloaded from Target Innovations, Tablet Metal Detector, Feb. 15, 2013.

Tatbul et al., "Confidence-based data management for personal area sensor networks" ACM International Conference Proceeding Series (2004) 72.

Tierney, M.J. et al "Electroreleasing Composite Membranes for Delivery of Insulin and other Biomacromolecules", J. Electrochem. Soc., vol. 137, No. 6, Jun. 1990, p. 2005-2006.

Trutag, Technologies, Inc., Spectral Microtags for Authentication and Anti-Counterfeiting; "Product Authentication and Brand Protection Solutions"; http://www.trutags.com/; downloaded Feb. 12, 2013 (2013); 1 pp.

Van der Biest, O., et al., "Electrophoretic deposition of materials," Annu. Rev. Mater. Sci. 1999, 29: pp. 327-352.

VonStetten, F. et al., "Biofuel cells as power generation for implantable devices", Pore. Eurosensors XX, (2006), pp. 222-225.

Walkey, "MOSFET Structure and Processing"; 97.398* Physical Electronics Lecture 20, 24 pages, Office Action dated Jun. 13, 2011 for U.S. Appl. No. 12/238,345.

Wang, X. et al "Resistance to Tracking and Erosion of Silicone Rubber Material under Various Types of Precipitation", Jpn. J. Appl. Phys. vol. 38 (1999) pp. 5170-5175.

Watson, et al., "Determination of the relationship between the pH and conductivity of gastric juice" Physiol Meas. 17 (1996) pp. 21-27.

Winter, J. et al. "The material properties of gelatin gels"; USA Ballistic Research Laboratories, Mar. 1975, p. 1-157.

Wongmanerod et al., "Determination of pore size distribution and surface area of thin porous silicon layers by spectroscopic ellipsometry" Applied Surface Science 172 (2001) 117-125.

Xiaoming et al., "A telemedicine system for wireless home healthcare based on bluetooth and the internet" Telemedicine Journal and e-health (2004) 10(S2): S110-6.

Yang et al., "Fast-switching frequency synthesizer with a discriminator-aided phase detector" IEEE Journal of Solid-State Circuits (2000) 35(10): 1445-52.

Yao et al., "Low Power Digital Communication in Implantable Devices Using Volume Conduction of Biological Tissues" Proceedings of the 28th IEEE, EMBS Annual International Conference, Aug. 30-Sep. 3, 2006.

Youtube video Pharmaceutical Metal Detector/Tablet Metal Detector/ Capsule Metal Detector/ Dry Fruits; https://www.youtube.com/watch?v=l0126txam_s, May 12, 2012.

Zhang, Y-T. et al., "Wireless Biomedical Sensing," Wiley Encyclopedia of Biomedical Engineering, 2006, pp. 1-9.

Zimmerman, "Personal Area Networks: Near-field intrabody communication" IBM Systems Journal (1996) 35 (3-4):609-17.

Zworykin, "A Radio Pill" Nature, (1957) 898, 179 Nature Publishing Group.

* cited by examiner

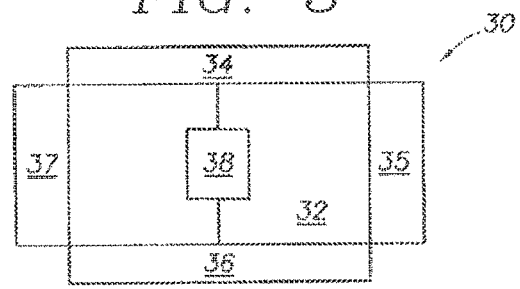
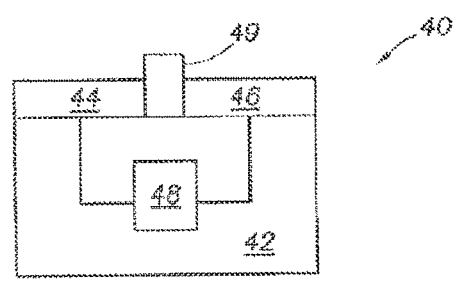
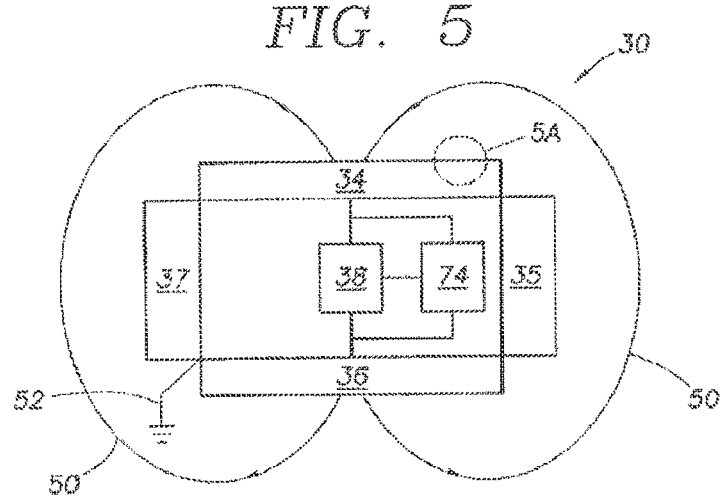
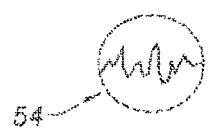

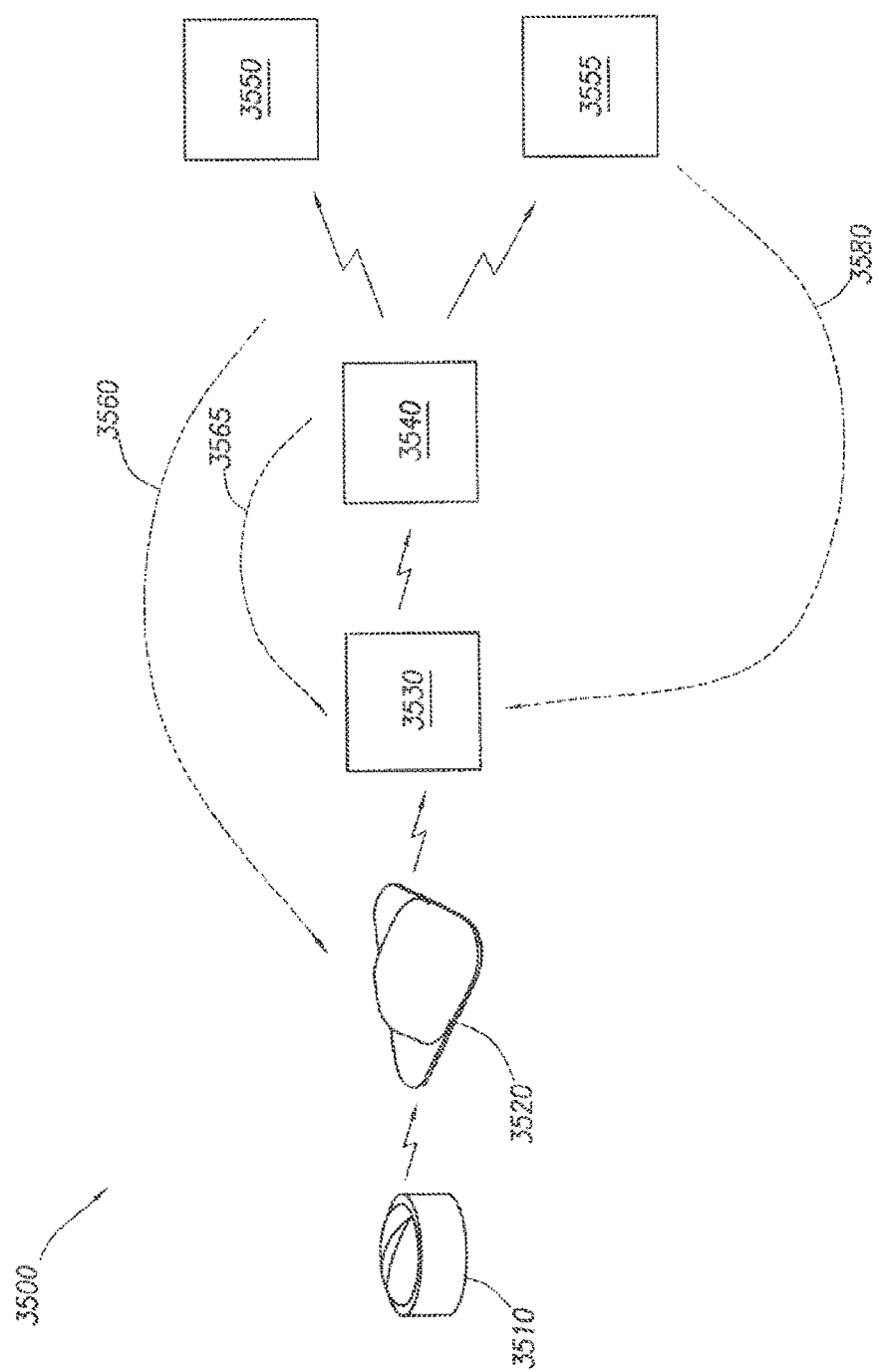

MASTICABLE INGESTIBLE PRODUCT AND COMMUNICATION SYSTEM THEREFOR

CROSS-REFERENCE TO RELATED APPLICATIONS

This application is a continuation application claiming priority under 35 U.S.C. § 120 to U.S. patent application Ser. No. 15/113,036, entitled MASTICABLE INGESTIBLE PRODUCT AND COMMUNICATION SYSTEM THEREFOR, filed Jul. 20, 2016, which is a U.S. National Stage Entry under 35 U.S.C. § 371 of International Patent Application No. PCT/US2015/012251, entitled MASTICABLE INGESTIBLE PRODUCT AND COMMUNICATION SYSTEM THEREFOR, filed Jan. 21, 2015, which claims benefit under 35 U.S.C. § 119 (e) to U.S. Provisional Application No. 61/929,854, filed Jan. 21, 2014, entitled MASTICABLE INGESTIBLE PRODUCT AND COMMUNICATION SYSTEM THEREFOR, the entire disclosures of which are hereby incorporated by reference herein.

This application is also related to the following U.S. applications filed on Jul. 11, 2011, the disclosures of which are incorporate herein by reference: U.S. application Ser. No. 13/180,516, filed Jul. 11, 2011 and entitled COMMUNICATION SYSTEM WITH REMOTE ACTIVATION; U.S. application Ser. No. 13/180,525 filed on Jul. 11, 2011 and entitled COMMUNICATION SYSTEM WITH ENHANCED PARTIAL POWER AND METHOD OF MANUFACTURING SAME; U.S. application Ser. No. 13/180,498, filed Jul. 11, 2011 and entitled COMMUNICATION SYSTEM WITH MULTIPLE TYPES OF POWER; U.S. application Ser. No. 13/180,538, filed Jul. 11, 2011 and entitled COMMUNICATION SYSTEM USING POLYPHARMACY CO-PACKAGED MEDICATION DOSING UNIT; U.S. application Ser. No. 13/180,539, filed Jul. 11, 2011 and entitled COMMUNICATION SYSTEM USING AN IMPLANTABLE DEVICE; U.S. Application Publication No. 2012/0062379A1, filed Jul. 11, 2011, published Mar. 15, 2012, and entitled COMMUNICATION SYSTEM INCORPORATED IN AN INGESTIBLE PRODUCT, the disclosures of which are herein incorporated by reference.

FIELD

The present invention is related to masticable ingestible products and communication systems for detection of an event. More specifically, the present disclosure includes a system that includes a device for association with ingestible ingredients or products that can be combined with food products and pharmaceuticals agents and can survive the mastication process.

INTRODUCTION

Ingestible devices that include electronic circuitry have been proposed for use in a variety of different medical applications, including both diagnostic and therapeutic applications. These devices typically require an internal power supply for operation. Examples of such ingestible devices are ingestible electronic capsules which collect data as they pass through the body, and transmit the data to an external receiver system. An example of this type of electronic capsule is an in-vivo video camera. The swallowable capsule includes a camera system and an optical system for imaging an area of interest onto the camera system. The transmitter transmits the video output of the camera system and the reception system receives the transmitted video output. Other examples include an ingestible imaging device, which has an internal and self-contained power source, which obtains images from within body lumens or cavities. The electronic circuit components of the device are enclosed by an inert indigestible housing (e.g. glass housing) that passes through the body internally. Other examples include an ingestible data recorder capsule medical device. The electronic circuits of the disclosed device (e.g. sensor, recorder, battery etc.) are housed in a capsule made of inert materials.

In other examples, fragile radio frequency identification (RFID) tags are used in drug ingestion monitoring applications. In order for the RFID tags to be operational, each requires an internal power supply. The RFID tags are antenna structures that are configured to transmit a radio-frequency signal through the body.

The problem these existing devices pose is that the power source is internal to device and such power sources are costly to produce and potentially harmful to the surrounding environment if the power source leaks or is damaged. Additionally, having antennas extending from the device is a concern as related to the antennas getting damaged or causing a problem when the device is used in-vivo. Therefore, what is needed is suitable system with circuitry that eliminates the need for an internal power source and antennas.

SUMMARY

The present disclosure includes a system for producing a unique signature that indicates the occurrence of an event. The system includes circuitry and components that can be placed within certain environments that include a conducting fluid. One example of such an environment is inside a container that houses the conducting fluid, such as a sealed bag with a solution, which includes an IV bag. Another example is within the body of a living organism, such as an animal or a human. The systems are ingestible and/or digestible or partially digestible. The system includes dissimilar materials positioned on the framework such that when a conducting fluid comes into contact with the dissimilar materials, a voltage potential difference is created. The voltage potential difference, and hence the voltage, is used to power up control logic that is positioned within the framework. Ions or current flows from the first dissimilar material to the second dissimilar material via the control logic and then through the conducting fluid to complete a circuit. The control logic controls the conductance between the two dissimilar materials and, hence, controls or modulates the conductance.

As the ingestible circuitry is made up of ingestible, and even digestible, components, the ingestible circuitry results in little, if any, unwanted side effects, even when employed in chronic situations. Examples of the range of components that may be included are: logic and/or memory elements; effectors; a signal transmission element; and a passive element, such as a resistor or inductor. The one or more components on the surface of the support may be laid out in any convenient configuration. Where two or more components are present on the surface of the solid support, interconnects may be provided. All of the components and the support of the ingestible circuitry are ingestible, and in certain instances digestible or partially digestible.

In accordance with the various aspects of the present invention, the system of the present invention can be located inside specific food products. The system may be co-ingested with food, using on-board sensing to measure food release into the stomach. Various aspects may include an instrumented container to detect when the system of the present invention has been dropped into the container and whether the user or person ingested the ingestible circuitry. The ingestible circuitry may be coated with one or more coatings to protect the ingestible circuitry during the mastication process.

BRIEF DESCRIPTION OF THE FIGURES

FIG. 3 is a block diagram representation of one aspect of the event indicator system with dissimilar metals positioned on opposite ends.

FIG. 4 is a block diagram representation of another aspect of the event indicator system with dissimilar metals positioned on the same end and separated by a non-conducting material.

FIG. 5 shows ionic transfer or the current path through a conducting fluid when the event indicator system of FIG. 3 is in contact with conducting liquid and in an active state.

FIG. 5A shows an exploded view of the surface of dissimilar materials of FIG. 5.

FIG. 12 provides a diagram of how a system that includes a signal receiver and an ingestible event marker may be employed, according to one aspect.

DETAILED DESCRIPTION

The present disclosure includes multiple aspects for indicating the occurrence of an event. As described in more detail below, a system of the present invention is used with a conducting fluid to indicate the event marked by contact between the conducting fluid and the system. For example, the system of the present disclosure may be used with pharmaceutical product and the event that is indicated is when the product is taken or ingested. The term "ingested" or "ingest" or "ingesting" is understood to mean any introduction of the system internal to the body. For example, ingesting includes simply placing the system in the mouth all the way to the descending colon. Thus, the term ingesting refers to any instant in time when the system is introduced to an environment that contains a conducting fluid. Another example would be a situation when a non-conducting fluid is mixed with a conducting fluid. In such a situation the system would be present in the non-conduction fluid and when the two fluids are mixed, the system comes into contact with the conducting fluid and the system is activated. Yet another example would be the situation when the presence of certain conducting fluids needed to be detected. In such instances, the presence of the system, which would be activated, within the conducting fluid could be detected and, hence, the presence of the respective fluid would be detected.

Referring again to the instance where the system is used with the product that is ingested by the living organism, when the product that includes the system is taken or ingested, the device comes into contact with the conducting liquid of the body. When the system of the present invention comes into contact with the body fluid, a voltage potential is created and the system is activated. A portion of the power source is provided by the device, while another portion of the power source is provided by the conducting fluid, which is discussed in detail below.

Figure 1:
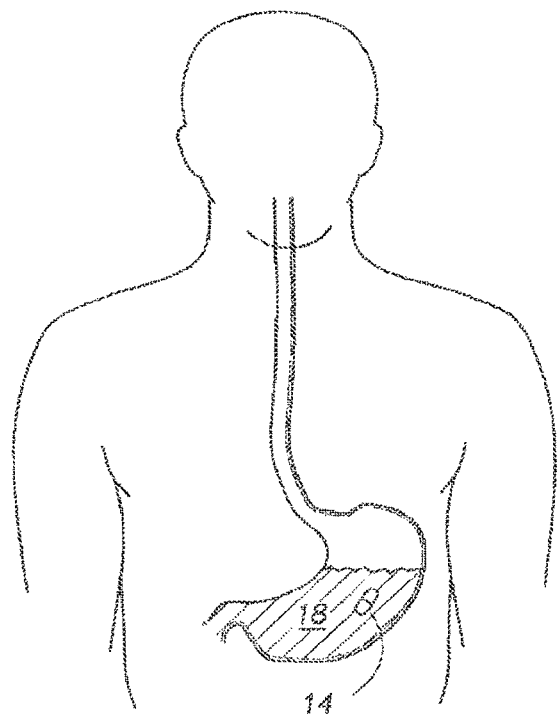
FIG. 1 shows an event indicator system in communication with an implanted device in according to the teaching of the present invention.

Referring now to FIG. 1, an ingestible capsule 14 that includes a system of the present invention is shown inside the body. The capsule 14 is configured as an orally ingestible pharmaceutical formulation in the form of a pill or capsule. Upon ingestion, the capsule 14 moves to the stomach. Upon reaching the stomach, the capsule 14 is in contact with stomach fluid 18 and undergoes a chemical reaction with the various materials in the stomach fluid 18, such as hydrochloric acid and other digestive agents. The system of the present invention is discussed in reference to a pharmaceutical environment. However, the scope of the present invention is not limited thereby. The present invention can be used in any environment where a conducting fluid is present or becomes present through mixing of two or more components that result in a conducting liquid.

Figure 2A:
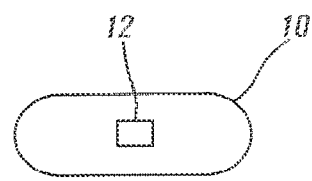
FIG. 2A shows the pharmaceutical product of FIG. 1 with the event indicator system on the exterior of the pharmaceutical product.

Referring now to FIG. 2A, a pharmaceutical product 10, similar to the capsule 14 of FIG. 1, is shown with a system 12, such as an ingestible event marker or an ionic emission module. The scope of the present invention is not limited by the shape or type of the product 10. For example, it will be clear to one skilled in the art that the product 10 can be a capsule, a time-release oral dosage, a tablet, a gel cap, a sub-lingual tablet, or any oral dosage product that can be combined with the system 12.

Additionally, the system 12 of the present invention may be ingested without a pharmaceutical product via a carrier capsule that includes only the system with no other active agent. In accordance with another aspect of the present invention, the system 12 may be used as part of a food product or an ingredient in a food product. For example, the system 12 is coated with a protective material as discussed in detail below. The system 12 is then included is the food product similar to any ingredient. Thus, ingestion of that food product may be tracked automatically, which is often useful in setting where knowing the exact food take and time of ingestion is needed, for example when a person has a special diet or is receiving care at a hospital as a patient or in-patient.

In accordance with another example of the present invention, the system 12 may be combined with an ingredient commonly used in making food. For example, the system 12 may be secured to salt in a manner similar to the way the system 12 is secured to a pharmaceutical product, as discussed below. Then as the ingredient with the system 12 is mixed into the food, the food will include the system which will become activated upon ingestion.

In accordance with various aspects of the present invention, when the system 12 is combined with food and ingested there are various approaches to activation of the system 12. In accordance with one aspect of the present invention, the system 12 may be coated with a material that breaks and releases the system 12 as the food is being masticated, e.g. chewed or squashed. In accordance with another aspect of the present invention, the coating material may be reactive to saliva and when in contact with saliva will dissolve or disintegrate and release the system 12. Conducting fluids associated with saliva may activate the system 12. In accordance with yet another aspect of the present invention, the coating material may be reactive to stomach acids and dissolve or disintegrate upon contact with the stomach fluids to release the system 12. In accordance with another aspect of the present invention, the coating material may be made of material that resists breaking or dissolving when masticated or exposed to saliva, such as the beads found in drinks. In accordance with another aspect of the present invention, the coating material may be intentionally destroyed or broken apart when distributed or mixed in with a food, such as when bread is mixed and prepared for a food (e.g. pizza dough).

Continuing with FIG. 2A, in the shown aspect, the product 10 has the system 12 secured to the exterior using known methods of securing micro-devices to the exterior of pharmaceutical products or an ingestible ingredient, for example food or ingredients of food. Example of methods for securing the micro-device to the product is disclosed in U.S. Provisional Application No. 61/142,849 filed on Jan. 1, 2009 and entitled HIGH-THROUGHPUT PRODUCTION OF INGESTIBLE EVENT MARKERS as well as U.S. Provisional Application No. 61/177,611 filed on May 12, 2009 and entitled INGESTIBLE EVENT MARKERS COMPRISING AN IDENTIFIER AND AN INGESTIBLE COMPONENT, the entire disclosure of each is incorporated herein by reference. Once ingested, the system 12 comes into contact with body liquids and the system 12 is activated. The system 12 uses the voltage potential difference to power up and thereafter modulates conductance to create a unique and identifiable current signature. Upon activation, the system 12 controls the conductance and, hence, current flow to produce the current signature.

There are various reasons for delaying the activation of the system 12. In order to delay the activation of the system 12, the system 12 may be coated with a shielding material or protective layer. The layer is dissolved over a period of time, thereby allowing the system 12 to be activated when the product 10 has reached a target location.

Figure 2B:
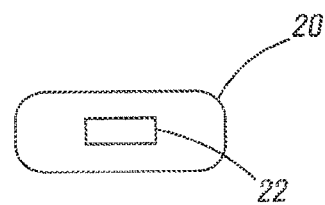
FIG. 2B shows the pharmaceutical product of FIG. 1 with the event indicator system positioned inside the pharmaceutical product.

Referring now to FIG. 2B, a pharmaceutical product or an ingestible product/ingredient 20, similar to the capsule 14 of FIG. 1, is shown with a system 22, such as an ingestible event marker or an identifiable emission module. The scope of the present invention is not limited by the environment to which the system 22 is introduced. For example, the system 22 can be enclosed in a capsule that is taken in addition to/independently from the pharmaceutical product or ingestible ingredient. The capsule may be simply a carrier for the system 22 and may not contain any product. Furthermore, the scope of the present invention is not limited by the shape or type of product 20. For example, it will be clear to one skilled in the art that the product 20 can be a food product or ingredient, a capsule, a time-release oral dosage, a tablet, a gel capsule, a sub-lingual tablet, or any oral dosage product. In the referenced aspect, the product 20 has the system 22 positioned inside or secured to the interior of the product 20. In one aspect, the system 22 is secured to the interior wall of the product 20. When the system 22 is positioned inside a gel capsule, then the content of the gel capsule is a non-conducting gel-liquid. On the other hand, if the content of the gel capsule is a conducting gel-liquid, then in an alternative aspect, the system 22 is coated with a protective cover to prevent unwanted activation by the gel capsule content. If the content of the capsule is a dry powder or microspheres, then the system 22 is positioned or placed within the capsule. If the product 20 is a tablet or hard pill, then the system 22 is held in place inside the tablet. Once ingested, the product 20 containing the system 22 is dissolved. The system 22 comes into contact with body liquids and the system 22 is activated. Depending on the product 20, the system 22 may be positioned in either a near-central or near-perimeter position depending on the desired activation delay between the time of initial ingestion and activation of the system 22. For example, a central position for the system 22 means that it will take longer for the system 22 to be in contact with the conducting liquid and, hence, it will take longer for the system 22 to be activated. Therefore, it will take longer for the occurrence of the event to be detected.

Referring now to FIG. 3, in one aspect, the systems 12 and 22 of FIGS. 2A and 2B, respectively, are shown in more detail as system 30. The system 30 can be used in association with any pharmaceutical product, as mentioned above, to determine when a patient takes the pharmaceutical product. As indicated above, the scope of the present invention is not limited by the environment and the product that is used with the system 30. For example, the system 30 may be placed within a capsule and the capsule is placed within the conducting liquid. The capsule would then dissolve over a period of time and release the system 30 into the conducting liquid. Thus, in one aspect, the capsule would contain the system 30 and no product. Such a capsule may then be used in any environment where a conducting liquid is present and with any product. For example, the capsule may be dropped into a container filled with jet fuel, salt water, tomato sauce, motor oil, or any similar product. Additionally, the capsule containing the system 30 may be ingested at the same time that any pharmaceutical product is ingested in order to record the occurrence of the event, such as when the product was taken.

In the specific example of the system 30 combined with the pharmaceutical product, as the product or pill is ingested, the system 30 is activated. The system 30 controls conductance to produce a unique current signature that is detected, thereby signifying that the pharmaceutical product has been taken. The system 30 includes a framework 32. The framework 32 is a chassis for the system 30 and multiple components are attached to, deposited upon, or secured to the framework 32. In this aspect of the system 30, a digestible material 34 is physically associated with the framework 32. The material 34 may be chemically deposited on, evaporated onto, secured to, or built-up on the framework all of which may be referred to herein as "deposit" with respect to the framework 32. The material 34 is deposited on one side of the framework 32. The materials of interest that can be used as material 34 include, but are not limited to: Cu or CuI. The material 34 is deposited by physical vapor deposition, electrodeposition, or plasma deposition, among other protocols. The material 34 may be from about 0.05 to about 500 µm thick, such as from about 5 to about 100 µm thick. The shape is controlled by shadow mask deposition, or photolithography and etching. Additionally, even though only one region is shown for depositing the material, each system 30 may contain two or more electrically unique regions where the material 34 may be deposited, as desired.

At a different side, which is the opposite side as shown in FIG. 3, another digestible material 36 is deposited, such that materials 34 and 36 are dissimilar. Although not shown, the different side selected may be the side next to the side selected for the material 34. The scope of the present invention is not limited by the side selected and the term "different side" can mean any of the multiple sides that are different from the first selected side. Furthermore, even though the shape of the system is shown as a square, the shape maybe any geometrically suitable shape. Material 34 and 36 are selected such that they produce a voltage potential difference when the system 30 is in contact with conducting liquid, such as body fluids. The materials of interest for material 36 include, but are not limited to: Mg, Zn, or other electronegative metals. As indicated above with respect to the material 34, the material 36 may be chemically deposited on, evaporated onto, secured to, or built-up on the framework. Also, an adhesion layer may be necessary to help the material 36 (as well as material 34 when needed) to adhere to the framework 32. Typical adhesion layers for the material 36 are Ti, TiW, Cr or similar material. Anode material and the adhesion layer may be deposited by physical vapor deposition, electrodeposition or plasma deposition. The material 36 may be from about 0.05 to about 500 µm thick, such as from about 5 to about 100 µm thick. However, the scope of the present invention is not limited by the thickness of any of the materials nor by the type of process used to deposit or secure the materials to the framework 32.

According to the disclosure set forth, the materials 34 and 36 can be any pair of materials with different electrochemical potentials. Additionally, in the aspects wherein the system 30 is used in-vivo, the materials 34 and 36 may be vitamins that can be absorbed. More specifically, the materials 34 and 36 can be made of any two materials appropriate for the environment in which the system 30 will be operating. For example, when used with an ingestible product, the materials 34 and 36 are any pair of materials with different electrochemical potentials that are ingestible. An illustrative example includes the instance when the system 30 is in contact with an ionic solution, such as stomach acids. Suitable materials are not restricted to metals, and in certain aspects the paired materials are chosen from metals and non-metals, e.g., a pair made up of a metal (such as Mg) and a salt (such as CuCl or CuI). With respect to the active electrode materials, any pairing of substances—metals, salts, or intercalation compounds—with suitably different electrochemical potentials (voltage) and low interfacial resistance are suitable.

Materials and pairings of interest include, but are not limited to, those reported in Table 1 below. In one aspect, one or both of the metals may be doped with a non-metal, e.g., to enhance the voltage potential created between the materials as they come into contact with a conducting liquid. Non-metals that may be used as doping agents in certain aspects include, but are not limited to: sulfur, iodine and the like. In another aspect, the materials are copper iodine (CuI) as the anode and magnesium (Mg) as the cathode. Aspects of the present invention use electrode materials that are not harmful to the human body.

TABLE 1

|  | Anode | Cathode |
|---|---|---|
| Metals | Magnesium, Zinc Sodium, Lithium Iron | |
| Salts | | Copper salts: iodide, chloride, bromide, sulfate, formate, (other anions possible) $Fe^{3+}$ salts: e.g. orthophosphate, pyrophosphate, (other anions possible) Oxygen or Hydrogen ion (H+) on platinum, gold or other catalytic surfaces |
| Intercalation compounds | Graphite with Li, K, Ca, Na, Mg | Vanadium oxide Manganese oxide |

Thus, when the system 30 is in contact with the conducting liquid, a current path, an example is shown in FIG. 5, is formed through the conducting liquid between material 34 and 36. A control device 38 is secured to the framework 32 and electrically coupled to the materials 34 and 36. The control device 38 includes electronic circuitry, for example control logic that is capable of controlling and altering the conductance between the materials 34 and 36.

The voltage potential created between the materials 34 and 36 provides the power for operating the system as well as produces the current flow through the conducting fluid and the system. In one aspect, the system operates in direct current mode. In an alternative aspect, the system controls the direction of the current so that the direction of current is reversed in a cyclic manner, similar to alternating current. As the system reaches the conducting fluid or the electrolyte, where the fluid or electrolyte component is provided by a physiological fluid, e.g., stomach acid, the path for current flow between the materials 34 and 36 is completed external to the system 30; the current path through the system 30 is controlled by the control device 38. Completion of the current path allows for the current to flow and in turn a receiver, not shown, can detect the presence of the current and recognize that the system 30 has been activate and the desired event is occurring or has occurred. Illustrative examples of receivers are shown in FIGS. 7 to 12, as described hereinafter.

In one aspect, the two materials 34 and 36 are similar in function to the two electrodes needed for a direct current power source, such as a battery. The conducting liquid acts as the electrolyte needed to complete the power source. The completed power source described is defined by the electrochemical reaction between the materials 34 and 36 of the system 30 and enabled by the fluids of the body. The completed power source may be viewed as a power source that exploits electrochemical conduction in an ionic or a conducting solution such as gastric fluid, blood, or other bodily fluids and some tissues.

Additionally, the environment may be something other than a body and the liquid may be any conducting liquid. For example, the conducting fluid may be salt water or a metallic based paint.

In certain aspects, these two materials are shielded from the surrounding environment by an additional layer of material. Accordingly, when the shield is dissolved and the two dissimilar materials are exposed to the target site, a voltage potential is generated.

In certain aspects, the complete power source or supply is one that is made up of active electrode materials, electrolytes, and inactive materials, such as current collectors, packaging, etc. The active materials are any pair of materials with different electrochemical potentials. Suitable materials are not restricted to metals, and in certain aspects the paired materials are chosen from metals and non-metals, e.g., a pair made up of a metal (such as Mg) and a salt (such as CuI). With respect to the active electrode materials, any pairing of substances—metals, salts, or intercalation compounds—with suitably different electrochemical potentials (voltage) and low interfacial resistance are suitable.

A variety of different materials may be employed as the materials that form the electrodes. In certain aspects, electrode materials are chosen to provide for a voltage upon contact with the target physiological site, e.g., the stomach, sufficient to drive the system of the identifier. In certain aspects, the voltage provided by the electrode materials upon contact of the metals of the power source with the target physiological site is 0.001 V or higher, including 0.01 V or higher, such as 0.1 V or higher, e.g., 0.3 V or higher, including 0.5 volts or higher, and including 1.0 volts or higher, where in certain aspects, the voltage ranges from about 0.001 to about 10 volts, such as from about 0.01 to about 10 V.

Referring again to FIG. 3, the materials 34 and 36 provide the voltage potential to activate the control device 38. Once the control device 38 is activated or powered up, the control device 38 can alter conductance between the materials 34 and 36 in a unique manner. By altering the conductance between materials 34 and 36, the control device 38 is capable of controlling the magnitude of the current through the conducting liquid that surrounds the system 30. This produces a unique current signature that can be detected and measured by a receiver (not shown), which can be positioned internal or external to the body. Illustrative examples of receivers are shown in FIGS. 7 to 12, as described hereinafter. In addition to controlling the magnitude of the current path between the materials, non-conducting materials, membrane, or "skirt" are used to increase the "length" of the current path and, hence, act to boost the conductance path, as disclosed in the U.S. patent application Ser. No. 12/238,345 entitled, IN-BODY DEVICE WITH VIRTUAL DIPOLE SIGNAL AMPLIFICATION filed Sep. 25, 2008, the entire content of which is incorporated herein by reference. Alternatively, throughout the disclosure herein, the terms "non-conducting material", "membrane", and "skirt" are interchangeably with the term "current path extender" without impacting the scope or the present aspects and the claims herein. The skirt, shown in portion at 35 and 37, respectively, may be associated with, e.g., secured to, the framework 32. Various shapes and configurations for the skirt are contemplated as within the scope of the present invention. For example, the system 30 may be surrounded entirely or partially by the skirt and the skirt maybe positioned along a central axis of the system 30 or off-center relative to a central axis. Thus, the scope of the present invention as claimed herein is not limited by the shape or size of the skirt. Furthermore, in other aspects, the materials 34 and 36 may be separated by one skirt that is positioned in any defined region between the materials 34 and 36.

Referring now to FIG. 4, in another aspect, the systems 12 and 22 of FIGS. 2A and 2B, respectively, are shown in more detail as system 40. The system 40 includes a framework 42. The framework 42 is similar to the framework 32 of FIG. 3. In this aspect of the system 40, a digestible or dissolvable material 44 is deposited on a portion of one side of the framework 42. At a different portion of the same side of the framework 42, another digestible material 46 is deposited, such that materials 44 and 46 are dissimilar. More specifically, material 44 and 46 are selected such that they form a voltage potential difference when in contact with a conducting liquid, such as body fluids. Thus, when the system 40 is in contact with and/or partially in contact with the conducting liquid, then a current path, an example is shown in FIG. 5, is formed through the conducting liquid between material 44 and 46. A control device 48 is secured to the framework 42 and electrically coupled to the materials 44 and 46. The control device 48 includes electronic circuitry that is capable of controlling part of the conductance path between the materials 44 and 46. The materials 44 and 46 are separated by a non-conducting skirt 49. Various examples of the skirt 49 are disclosed in U.S. Provisional Application No. 61/173,511 filed on Apr. 28, 2009 and entitled HIGHLY RELIABLE INGESTIBLE EVENT MARKERS AND METHODS OF USING SAME and U.S. Provisional Application No. 61/173,564 filed on Apr. 28, 2009 and entitled INGESTIBLE EVENT MARKERS HAVING SIGNAL AMPLIFIERS THAT COMPRISE AN ACTIVE AGENT; as well as U.S. application Ser. No. 12/238,345 filed Sep. 25, 2008 and entitled IN-BODY DEVICE WITH VIRTUAL DIPOLE SIGNAL AMPLIFICATION; the entire disclosure of each is incorporated herein by reference.

Once the control device 48 is activated or powered up, the control device 48 can alter conductance between the materials 44 and 46. Thus, the control device 48 is capable of controlling the magnitude of the current through the conducting liquid that surrounds the system 40. As indicated above with respect to system 30, a unique current signature that is associated with the system 40 can be detected by a receiver (not shown) to mark the activation of the system 40. Illustrative examples of receivers are shown in FIGS. 7 to 12, as described hereinafter. In order to increase the "length" of the current path the size of the skirt 49 is altered. The longer the current path, the easier it may be for the receiver to detect the current.

Referring now to FIG. 5, the system 30 of FIG. 3 is shown in an activated state and in contact with conducting liquid. The system 30 is grounded through ground contact 52. For example, when the system 30 is in contact with a conducting fluid, the conducting fluid provides the ground. The system 30 also includes a sensor module 74, which is described in greater detail with respect to FIG. 6. Ion or current paths 50 between material 34 to material 36 and through the conducting fluid in contact with the system 30. The voltage potential created between the material 34 and 36 is created through chemical reactions between materials 34/36 and the conducting fluid.

The system 30 also includes a unit 75. The unit 75 includes communication functions and in accordance with the various aspects of the present invention can act as any of the following: a receiver, a transmitter, or a transceiver. Thus, another device that is external to the system 30, such as a cell phone, an implanted device, a device attached to the user's body, or a device placed under the user's skin can communicate with the system 30 through the unit 75. The unit 75 is also electrically connected to the materials 34 and 36. In accordance with one aspect of the present invention, any device that is external to the system 30 may communicate with either the unit 75 or the control module 38 using current flow through the environment surrounding the system 30. For example, a patch or receiver that is attached to the user's body, a cell phone or device being held by the user, or an implanted device, any of which can generate a current signature through the user's body. The current signature can include information that is encoded therein. The current signature is detected by the system 30, using the unit 75 or the control module 38, and decoded to allow communication to the system 30 from the device external to system 30. Accordingly, the external device can send a signal to the unit 75, either wirelessly or through transconduction, that controls the activation of the system 30.

If the conditions of the environment change to become favorable to communication, as determined by the measurements of the environment, then the unit 75 sends a signal to the control device 38 to alter the conductance between the materials 34 and 36 to allow for communication using the current signature of the system 30. Thus, if the system 30 has been deactivated and the impedance of the environment is suitable for communication, then the system 30 can be activated again.

Referring now to FIG. 5A, this shows an exploded view of the surface of the material 34. In one aspect, the surface of the material 34 is not planar, but rather an irregular surface. The irregular surface increases the surface area of the material and, hence, the area that comes in contact with the conducting fluid. In one aspect, at the surface of the material 34, there is an electrochemical reaction between the material 34 and the surrounding conducting fluid such that mass is exchanged with the conducting fluid. The term "mass" as used here includes any ionic or non-ionic species that may be added or removed from the conductive fluid as part of the electrochemical reactions occurring on material 34. One example includes the instant where the material is CuCl and when in contact with the conducting fluid, CuCl is converted to Cu metal (solid) and Cl— is released into the solution. The flow of positive ions into the conducting fluid is depicted by the current path 50. Negative ions flow in the opposite direction. In a similar manner, there is an electrochemical reaction involving the material 36 that results in ions released or removed from the conducting fluid. In this example, the release of negative ions at the material 34 and release of positive ions by the material 36 are related to each other through the current flow that is controlled by the control device 38. The rate of reaction and hence the ionic emission rate or current, is controlled by the control device 38. The control device 38 can increase or decrease the rate of ion flow by altering its internal conductance, which alters the impedance, and therefore the current flow and reaction rates at the materials 34 and 36. Through controlling the reaction rates, the system 30 can encode information in the ionic flow. Thus, the system 30 encodes information using ionic emission or flow.

The control device 38 can vary the duration of ionic flow or current while keeping the current or ionic flow magnitude near constant, similar to when the frequency is modulated and the amplitude is constant. Also, the control device 38 can vary the level of the ionic flow rate or the magnitude of the current flow while keeping the duration near constant. Thus, using various combinations of changes in duration and altering the rate or magnitude, the control device 38 encodes information in the current or the ionic flow. For example, the control device 38 may use, but is not limited to any of the following techniques, including Binary Phase-Shift Keying (PSK), Frequency modulation, Amplitude modulation, on-off keying, and PSK with on-off keying.

As indicated above, the various aspects disclosed herein, such as systems 30 and 40 of FIGS. 3 and 4, respectively, include electronic components as part of the control device 38 or the control device 48. Components that may be present include but are not limited to: logic and/or memory elements, an integrated circuit, an inductor, a resistor, and sensors for measuring various parameters. Each component may be secured to the framework and/or to another component. The components on the surface of the support may be laid out in any convenient configuration. Where two or more components are present on the surface of the solid support, interconnects may be provided.

As indicated above, the system, such as control devices 30 and 40, control the conductance between the dissimilar materials and, hence, the rate of ionic flow or current. Through altering the conductance in a specific manner the system is capable of encoding information in the ionic flow and the current signature. The ionic flow or the current signature is used to uniquely identify the specific system. Additionally, the systems 30 and 40 are capable of producing various different unique patterns or signatures and, thus, provide additional information. For example, a second current signature based on a second conductance alteration pattern may be used to provide additional information, which information may be related to the physical environment. To further illustrate, a first current signature may be a very low current state that maintains an oscillator on the chip and a second current signature may be a current state at least a factor of ten higher than the current state associated with the first current signature.

Figure 5B:
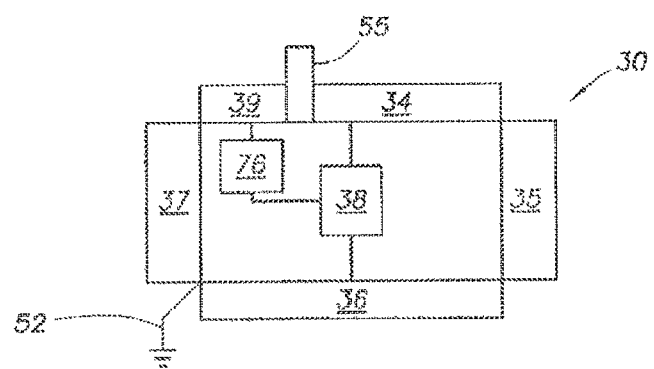
FIG. 5B shows the event indicator system of FIG. 5 with a pH sensor unit.
Figure 6:
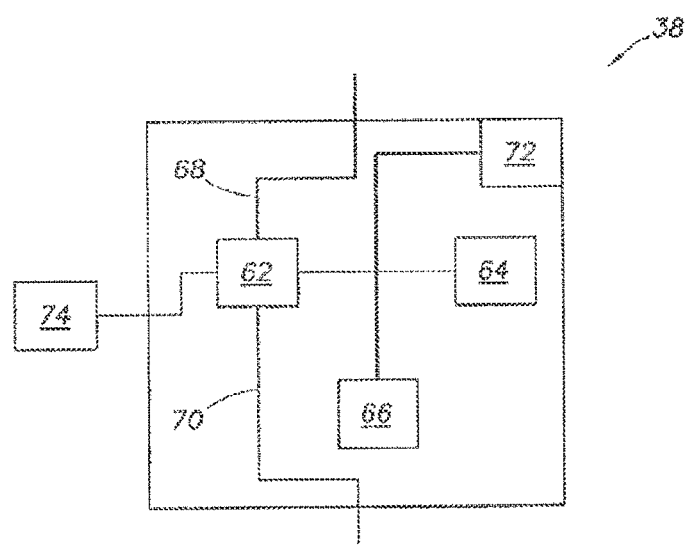
FIG. 6 is a block diagram illustration of one aspect of the control device used in the system of FIGS. 3 and 4.

Referring now to FIG. 6, a block diagram representation of the control device 38 is shown. The control device 30 includes a control module 62, a counter or clock 64, and a memory 66. Additionally, the device 38 is shown to include a sensor module 72 as well as the sensor module 74, which was referenced in FIG. 5. The control module 62 has an input 68 electrically coupled to the material 34 and an output 70 electrically coupled to the material 36. The control module 62, the clock 64, the memory 66, and the sensor modules 72/74 also have power inputs (some not shown). The power for each of these components is supplied by the voltage potential produced by the chemical reaction between materials 34 and 36 and the conducting fluid, when the system 30 is in contact with the conducting fluid. The control module 62 controls the conductance through logic that alters the overall impedance of the system 30. The control module 62 is electrically coupled to the clock 64. The clock 64 provides a clock cycle to the control module 62. Based upon the programmed characteristics of the control module 62, when a set number of clock cycles have passed, the control module 62 alters the conductance characteristics between materials 34 and 36. This cycle is repeated and thereby the control device 38 produces a unique current signature characteristic. The control module 62 is also electrically coupled to the memory 66. Both the clock 64 and the memory 66 are powered by the voltage potential created between the materials 34 and 36.

The control module 62 is also electrically coupled to and in communication with the sensor modules 72 and 74. In the aspect shown, the sensor module 72 is part of the control device 38 and the sensor module 74 is a separate component. In alternative aspects, either one of the sensor modules 72 and 74 can be used without the other and the scope of the present invention is not limited by the structural or functional location of the sensor modules 72 or 74. Additionally, any component of the system 30 may be functionally or structurally moved, combined, or repositioned without limiting the scope of the present invention as claimed. Thus, it is possible to have one single structure, for example a processor, which is designed to perform the functions of all of the following modules: the control module 62, the clock 64, the memory 66, and the sensor module 72 or 74. On the other hand, it is also within the scope of the present invention to have each of these functional components located in independent structures that are linked electrically and able to communicate.

Referring again to FIG. 6, the sensor modules 72 or 74 can include any of the following sensors: temperature, pressure, pH level, and conductivity. In one aspect, the sensor modules 72 or 74 gather information from the environment and communicate the analog information to the control module 62. The control module then converts the analog information to digital information and the digital information is encoded in the current flow or the rate of the transfer of mass that produces the ionic flow. In another aspect, the sensor modules 72 or 74 gather information from the environment and convert the analog information to digital information and then communicate the digital information to control module 62. In the aspect shown in FIG. 5, the sensor modules 74 is shown as being electrically coupled to the material 34 and 36 as well as the control device 38. In another aspect, as shown in FIG. 6, the sensor module 74 is electrically coupled to the control device 38 at connection 78. The connection 78 acts as both a source for power supply to the sensor module 74 and a communication channel between the sensor module 74 and the control device 38.

Referring now to FIG. 5B, the system 30 includes a pH sensor module 76 connected to a material 39, which is selected in accordance with the specific type of sensing function being performed. The pH sensor module 76 is also connected to the control device 38. The material 39 is electrically isolated from the material 34 by a non-conductive barrier 55. In one aspect, the material 39 is platinum. In operation, the pH sensor module 76 uses the voltage potential difference between the materials 34/36. The pH sensor module 76 measures the voltage potential difference between the material 34 and the material 39 and records that value for later comparison. The pH sensor module 76 also measures the voltage potential difference between the material 39 and the material 36 and records that value for later comparison. The pH sensor module 76 calculates the pH level of the surrounding environment using the voltage potential values. The pH sensor module 76 provides that information to the control device 38. The control device 38 varies the rate of the transfer of mass that produces the ionic transfer and the current flow to encode the information relevant to the pH level in the ionic transfer, which can be detected by a receiver (not shown). Illustrative examples of receivers are shown in FIGS. 7 to 12, as described hereinafter. Thus, the system 30 can determine and provide the information related to the pH level to a source external to the environment.

As indicated above, the control device 38 can be programmed in advance to output a pre-defined current signature. In another aspect, the system can include a receiver system that can receive programming information when the system is activated. In another aspect, not shown, the switch 64 and the memory 66 can be combined into one device.

In addition to the above components, the system 30 may also include one or other electronic components. Electrical components of interest include, but are not limited to: additional logic and/or memory elements, e.g., in the form of an integrated circuit; a power regulation device, e.g., battery, fuel cell or capacitor; a sensor, a stimulator, etc.; a signal transmission element, e.g., in the form of an antenna, electrode, coil, etc.; a passive element, e.g., an inductor, resistor, etc.

In certain aspects, the ingestible circuitry includes a coating layer. The purpose of this coating layer can vary, e.g., to protect the circuitry, the chip and/or the battery, or any components during processing, during storage, or even during ingestion. In such instances, a coating on top of the circuitry may be included. Also of interest are coatings that are designed to protect the ingestible circuitry during storage, but dissolve immediately during use. For example, coatings that dissolve upon contact with an aqueous fluid, e.g. stomach fluid, or the conducting fluid as referenced above. Also of interest are protective processing coatings that are employed to allow the use of processing steps that would otherwise damage certain components of the device. For example, in aspects where a chip with dissimilar material deposited on the top and bottom is produced, the product needs to be diced. However, the dicing process can scratch off the dissimilar material, and also there might be liquid involved which would cause the dissimilar materials to discharge or dissolve. In such instances, a protective coating on the materials prevents mechanical or liquid contact with the component during processing can be employed. Another purpose of the dissolvable coatings may be to delay activation of the device. For example, the coating that sits on the dissimilar material and takes a certain period of time, e.g., five minutes, to dissolve upon contact with stomach fluid may be employed. The coating can also be an environmentally sensitive coating, e.g., a temperature or pH sensitive coating, or other chemically sensitive coating that provides for dissolution in a controlled fashion and allows one to activate the device when desired. Coatings that survive the stomach but dissolve in the intestine are also of interest, e.g., where one desires to delay activation until the device leaves the stomach. An example of such a coating is a polymer that is insoluble at low pH, but becomes soluble at a higher pH. Also of interest are pharmaceutical formulation protective coatings, e.g., a gel cap liquid protective coating that prevents the circuit from being activated by liquid of the gel cap.

Identifiers of interest include two dissimilar electrochemical materials, which act similar to the electrodes (e.g., anode and cathode) of a power source. The reference to an electrode or anode or cathode are used here merely as illustrative examples. The scope of the present invention is not limited by the label used and includes the aspect wherein the voltage potential is created between two dissimilar materials. Thus, when reference is made to an electrode, anode, or cathode it is intended as a reference to a voltage potential created between two dissimilar materials.

When the materials are exposed and come into contact with the body fluid, such as stomach acid or other types of fluid (either alone or in combination with a dried conductive medium precursor), a potential difference, that is, a voltage, is generated between the electrodes as a result of the respective oxidation and reduction reactions incurred to the two electrode materials. A voltaic cell, or battery, can thereby be produced. Accordingly, in aspects of the invention, such power supplies are configured such that when the two dissimilar materials are exposed to the target site, e.g., the stomach, the digestive tract, etc., a voltage is generated.

In certain aspects, one or both of the metals may be doped with a non-metal, e.g., to enhance the voltage output of the battery. Non-metals that may be used as doping agents in certain aspects include, but are not limited to: sulfur, iodine and the like.

In accordance with the various aspects of the present invention, the system of the present invention can be inside specific food products (e.g. a granola bar), with one of the data encoded and communicated by the system being the caloric content of the food or other relevant dietary information, e.g. fiber sugar content, fat type and content etc. This may help people on a diet monitor their daily intakes, get incentives for staying on-diet, etc. Also, the system is co-ingested with food, using on-board sensing to measure food release into the stomach, e.g. fat content. Various aspects may include an instrumented cup that detects when the system of the present invention has been dropped into the cup and whether the user or person took a drink (similar, for example, to the inhaler product described in PCT Application Ser. No. PCT/US11/31986, filed Apr. 11, 2011, the entire disclosure of which is incorporated herein by reference), and how much they drank. An advantage of this aspect of the present invention is that it may be useful for people who take regular supplements in the form of a powder or other, which is mixed with water before drinking.

In accordance with other aspects of the present invention, chemical markers can incorporate certain marker species into the food (e.g. salt, low-or-high pH, protein, and lipid). When ingested, a marker species is released into stomach environment. With the sensing capability, the system of the present invention can detect chemical-binding receptors on the surface or by coating on the system that reacts with a chemically-active coating (e.g. a coating such as a specific-ion-conducting glass membrane that allows only the desired marker species to penetrate). In various aspects, the ingestible device is co-ingested with the food, and may be used, among other things, to measure/detect the presence of the "marker species". The system that is ingestible and masti-cable can contain a detector capable of measuring endo-canabinoids, as described for example, in the publication by DiPatrizio et al. entitled, "Endocannabinoid signal in the gut controls dietary fat intake", for example reference, the entire disclose of which is incorporated herein by reference). When the signal is detected—e.g., a sign that high fat food intake has occurred—the user or patient is instructed via phone message or other communication to take a prescription (also RIS-enabled) to disrupt the endocannabinoid signal, thus reducing the craving for more high fat foods.

In accordance with another aspect of the present invention, the system is detectable when the skirt is missing. In accordance with another aspect of the present invention, the system is safe to bite, for example by thinning the silicon. In accordance with another aspect of the present invention, several of the systems of the present invention are placed in the food so that if some of the ingestible devices are damaged during mastication there are still functional devices left. Thus, the systems could be distributed throughout the food, so that the number of systems detected gives an indication of the quantity of food consumed. Additionally, another aspect of the present invention teaches that the system of the present invention can be surrounded with gummy material and laminated between polymer layers that are soluble at low pH, but not in neutral pH (saliva). Furthermore, by reversing the coating, the opposite effect is achieved in accordance with another aspect of the present invention. First coat/laminate the system of the present invention with a pH sensitive polymer and then insert it inside small, gummy particles, e.g., gummy bites, to help survive in the mouth. Thus, the system of the present invention is inside a gummy-bear like protective layer, and may be reduced in size, such as skirt-less or flexible skirt. The protective layer may consist of multilayers or may have a density or solubility gradient such that the material nearest the system is only slowly soluble and likely to be swallowed due to slippery surface, rounded shape and very small size. The system, according to another aspect of the present invention, would have a circuit modification that, in addition to probing the local impedance, has a feedback to postpone activation while the local impedance is high. This allows time for the remaining layer(s) to dissolve. The system is activated or turns on as soon as liquid penetrates through, but cannot send sufficient signal strength for detection, the high current and battery layer depletion is postponed until the impedance drops sufficiently. Thus, the system according to this aspect of the present invention, for example, is put into pre-measured meal and snack types to read out what was consumed.

Figure 7:
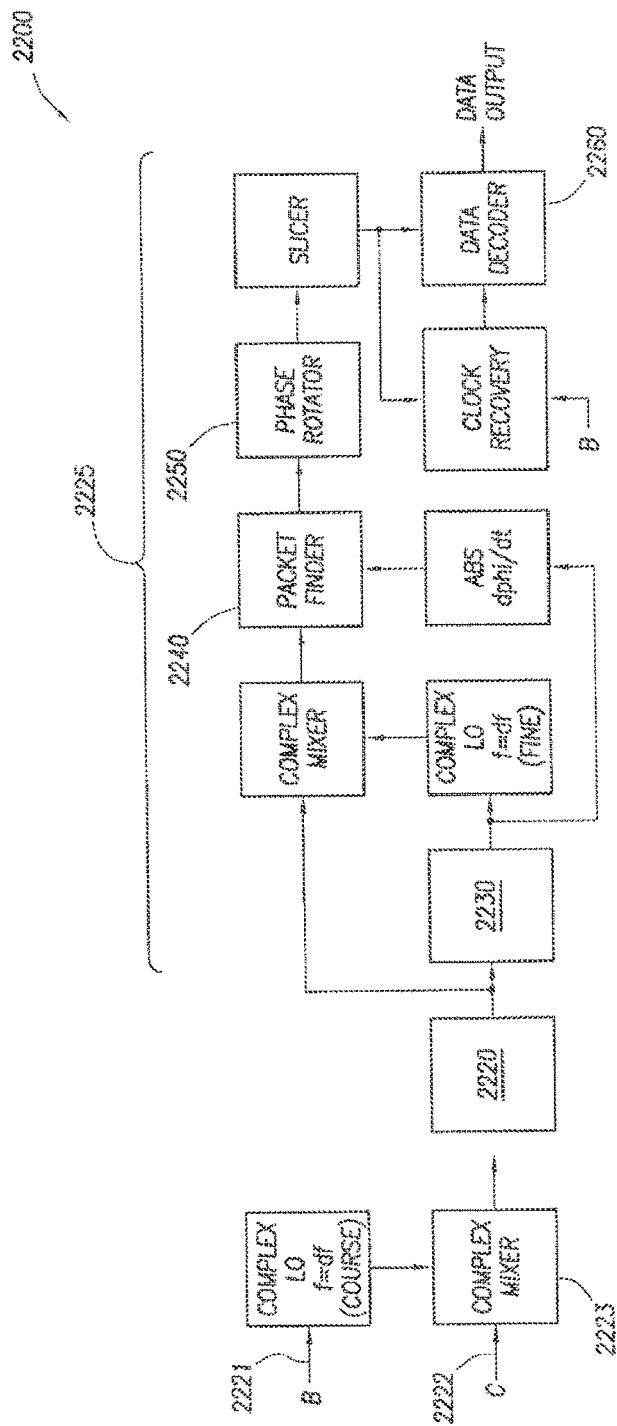
FIG. 7 is a functional block diagram of a demodulation circuit that performs coherent demodulation that may be present in a receiver, according to one aspect.

For purposes of illustration, various receivers may be used with various aspects of the present invention. In one example of a receiver, sometimes referred to herein as a "signal receiver", two or more different demodulation protocols may be employed to decode a given received signal. In some instances, both a coherent demodulation protocol and a differential coherent demodulation protocol may be employed. FIG. 7 provides a functional block diagram of how a receiver may implement a coherent demodulation protocol, according to one aspect of the invention. It should be noted that only a portion of the receiver is shown in FIG. 7. FIG. 7 illustrates the process of mixing the signal down to baseband once the carrier frequency (and carrier signal mixed down to carrier offset) is determined. A carrier signal 2221 is mixed with a second carrier signal 2222 at mixer 2223. A narrow low-pass filter 2220 is applied of appropriate bandwidth to reduce the effect of out-of-bound noise. Demodulation occurs at functional blocks 2225 in accordance with the coherent demodulation scheme of the present invention. The unwrapped phase 2230 of the complex signal is determined. An optional third mixer stage, in which the phase evolution is used to estimate the frequency differential between the calculated and real carrier frequency can be applied. The structure of the packet is then leveraged to determine the beginning of the coding region of the BPSK signal at block 2240. Mainly, the presence of the sync header, which appears as an FM porch in the amplitude signal of the complex demodulated signal is used to determine the starting bounds of the packet. Once the starting point of the packet is determined the signal is rotated at block 2250 on the IQ plane and standard bit identification and eventually decoded at block 2260.

In addition to demodulation, the transbody communication module may include a forward error correction module, which module provides additional gain to combat interference from other unwanted signals and noise. Forward error correction functional modules of interest include those described in PCT Application Serial No. PCT/US2007/024225 and published as WO 2008/063626, the disclosure of which is herein incorporated by reference. In some instances, the forward error correction module may employ any convenient protocol, such as Reed-Solomon, Golay, Hamming, BCH, and Turbo protocols to identify and correct (within bounds) decoding errors.

Figure 8:
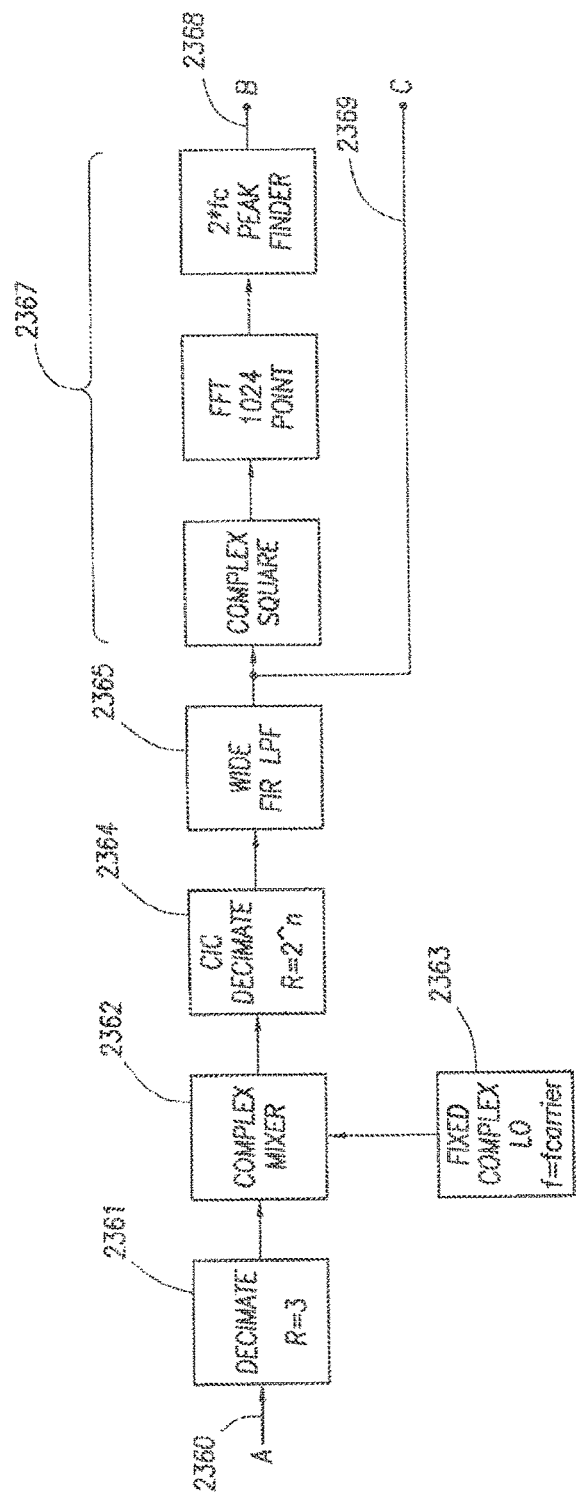
FIG. 8 illustrates a functional block diagram for a beacon module within a receiver, according to one aspect.

In another example, the receiver includes a beacon module as shown in the functional block diagram of FIG. 8. The scheme outlined in FIG. 8 outlines one technique for identifying a valid beacon. The incoming signal 2360 represents the signals received by electrodes, bandpass filtered (such as from 10 KHz to 34 KHz) by a high frequency signaling chain (which encompasses the carrier frequency), and converted from analog to digital. The signal 2360 is then decimated at block 2361 and mixed at the nominal drive frequency (such as, 12.5 KHz, 20 KHz, etc.) at mixer 2362. The resulting signal is decimated at block 2364 and low-pass filtered (such as 5 KHz BW) at block 2365 to produce the carrier signal mixed down to carrier offset—signal 2369. Signal 2369 is further processed by blocks 2367 (fast Fourier transform and then detection of two strongest peaks) to provide the true carrier frequency signal 2368. This protocol allows for accurate determination of the carrier frequency of the transmitted beacon.

Figure 9:
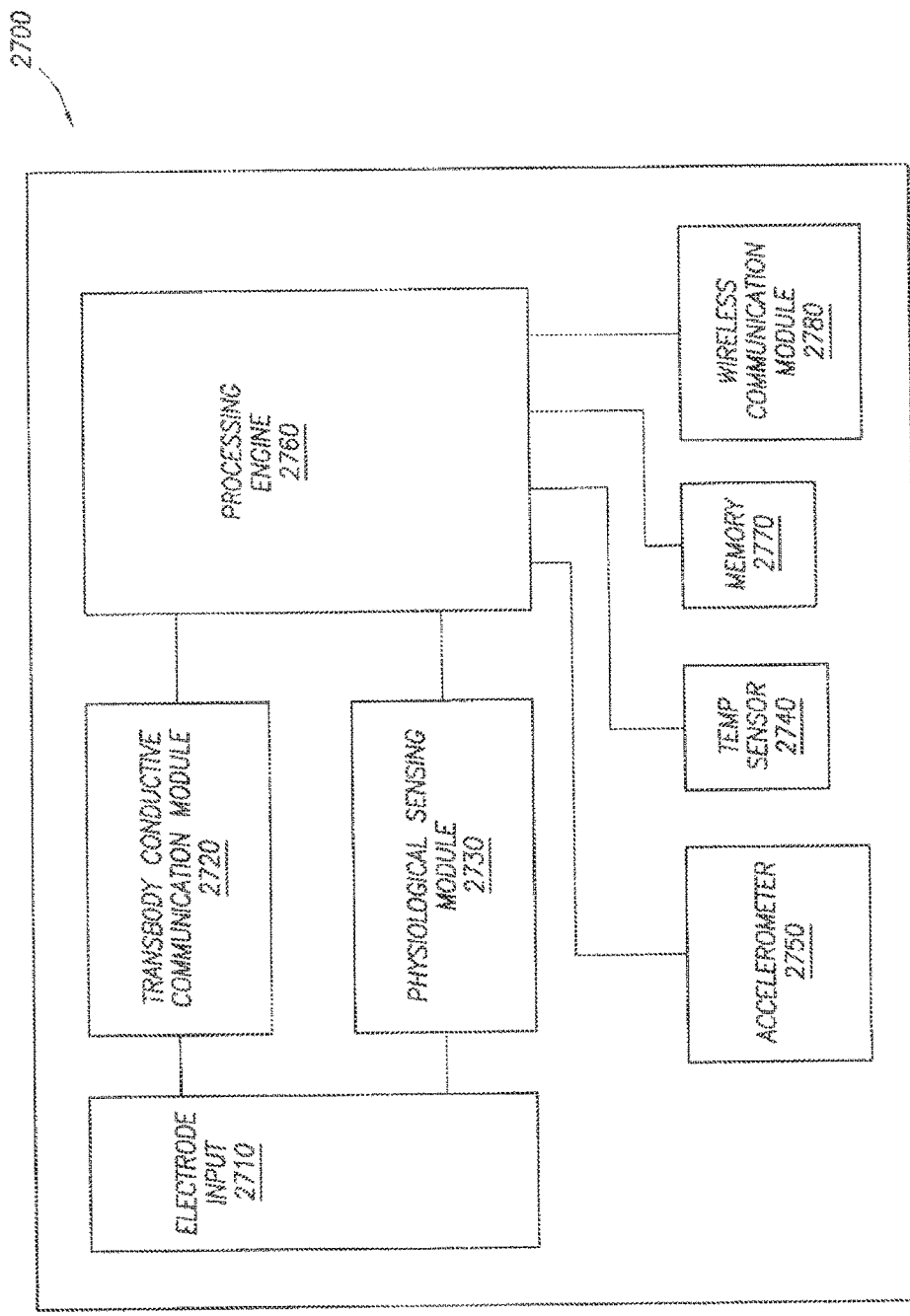
FIG. 9 is a block diagram of the different functional modules that may be present in a receiver, according to one aspect.

FIG. 9 provides a block functional diagram of an integrated circuit component of a signal receiver according to an aspect of the invention. In FIG. 9, receiver 2700 includes electrode input 2710. Electrically coupled to the electrode input 2710 are transbody conductive communication module 2720 and physiological sensing module 2730. In one aspect, transbody conductive communication module 2720 is implemented as a high frequency (HF) signal chain and physiological sensing module 2730 is implemented as a low frequency (LF) signal chain. Also shown are CMOS temperature sensing module 2740 (for detecting ambient temperature) and a 3-axis accelerometer 2750. Receiver 2700 also includes a processing engine 2760 (for example, a microcontroller and digital signal processor), non-volatile memory 2770 (for data storage) and wireless communication module 2780 (for data transmission to another device, for example in a data upload action).

Figure 10:
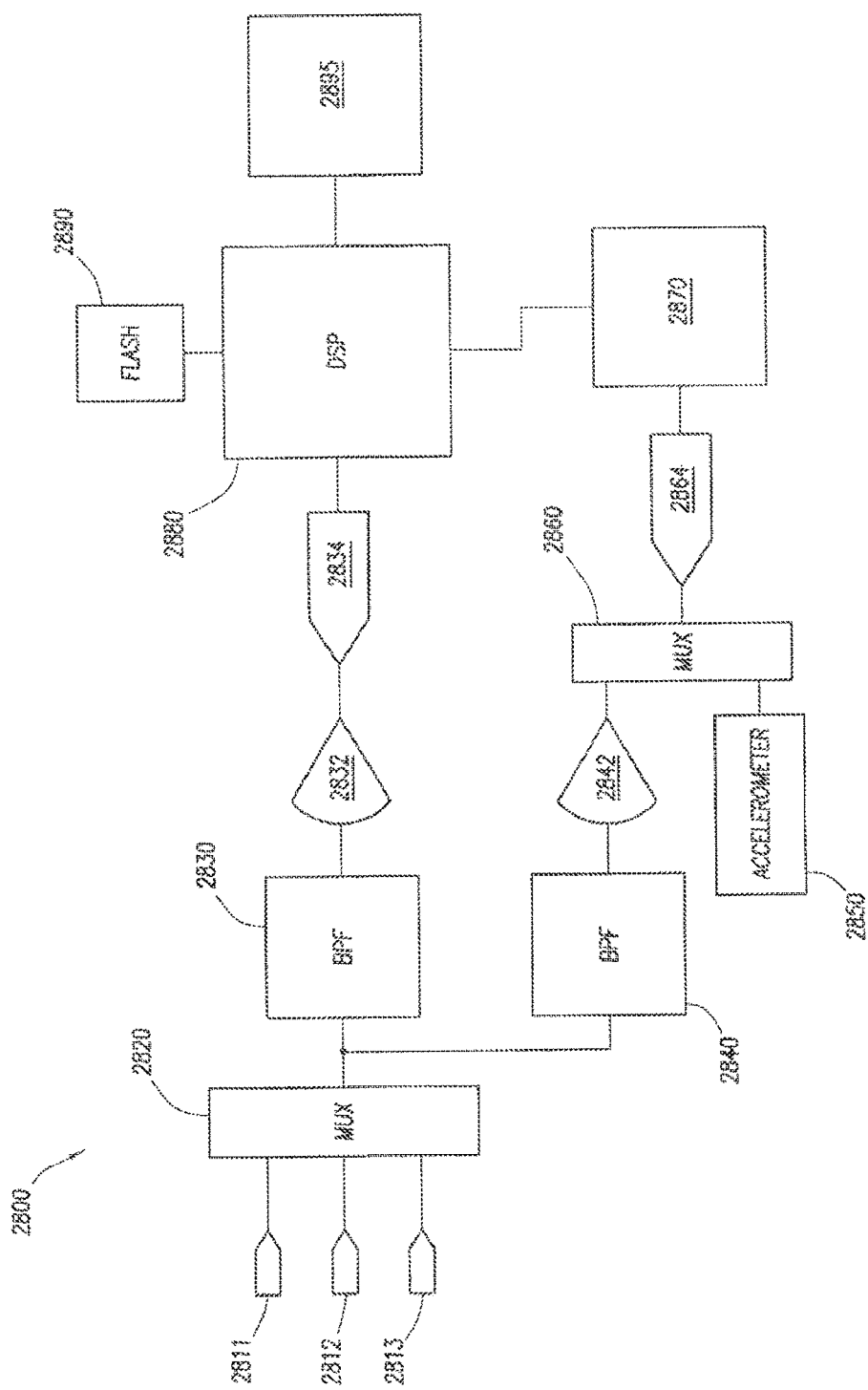
FIG. 10 is a block diagram of a receiver, according to one aspect.

FIG. 10 provides a more detailed block diagram of a circuit configured to implement the block functional diagram of the receiver depicted in FIG. 9, according to one aspect of the invention. In FIG. 10, receiver 2800 includes electrodes e1, e2 and e3 (2811, 2812 and 2813) which, for example, receive the conductively transmitted signals by an IEM and/or sense physiological parameters or biomarkers of interest. The signals received by the electrodes 2811, 2812, and 2813 are multiplexed by multiplexer 2820 which is electrically coupled to the electrodes.

Multiplexer 2820 is electrically coupled to both high band pass filter 2830 and low band pass filter 2840. The high and low frequency signal chains provide for programmable gain to cover the desired level or range. In this specific aspect, high band pass filter 2830 passes frequencies in the 10 KHz to 34 KHz band while filtering out noise from out-of-band frequencies. This high frequency band may vary, and may include, for example, a range of 3 KHz to 300 KHz. The passing frequencies are then amplified by amplifier 2832 before being converted into a digital signal by converter 2834 for input into high power processor 2880 (shown as a DSP) which is electrically coupled to the high frequency signal chain.

Low band pass filter 2840 is shown passing lower frequencies in the range of 0.5 Hz to 150 Hz while filtering out out-of-band frequencies. The frequency band may vary, and may include, for example, frequencies less than 300 Hz, such as less than 200 Hz, including less than 150 Hz. The passing frequency signals are amplified by amplifier 2842. Also shown is accelerometer 2850 electrically coupled to second multiplexer 2860. Multiplexer 2860 multiplexes the signals from the accelerometer with the amplified signals from amplifier 2842. The multiplexed signals are then converted to digital signals by converter 2864 which is also electrically coupled to low power processor 2870.

In one aspect, a digital accelerometer (such as one manufactured by Analog Devices), may be implemented in place of accelerometer 2850. Various advantages may be achieved by using a digital accelerometer. For example, because the signals the digital accelerometer would produce signals already in digital format, the digital accelerometer could bypass converter 2864 and electrically couple to the low power microcontroller 2870—in which case multiplexer 2860 would no longer be required. Also, the digital signal may be configured to turn itself on when detecting motion, further conserving power. In addition, continuous step counting may be implemented. The digital accelerometer may include a FIFO buffer to help control the flow of data sent to the low power processor 2870. For instance, data may be buffered in the FIFO until full, at which time the processor may be triggered to turn awaken from an idle state and receive the data.

Low power processor 2870 may be, for example, an MSP430 microcontroller from Texas Instruments. Low power processor 2870 of receiver 2800 maintains the idle state, which as stated earlier, requires minimal current draw—e.g., 10 µA or less, or 1 µA or less.

High power processor 2880 may be, for example, a VC5509 digital signal process from Texas Instruments. The high power processor 2880 performs the signal processing actions during the active state. These actions, as stated earlier, require larger amounts of current than the idle state—e.g., currents of 30 µA or more, such as 50 µA or more—and may include, for example, actions such as scanning for conductively transmitted signals, processing conductively transmitted signals when received, obtaining and/or processing physiological data, etc.

Also shown in FIG. 10 is flash memory 2890 electrically coupled to high power processor 2880. In one aspect, flash memory 2890 may be electrically coupled to low power processor 2870, which may provide for better power efficiency.

Wireless communication element 2895 is shown electrically coupled to high power processor 2880 and may include, for example, a BLUETOOTH™ wireless communication transceiver. In one aspect, wireless communication element 2895 is electrically coupled to high power processor 2880. In another aspect, wireless communication element 2895 is electrically coupled to high power processor 2880 and low power processor 2870. Furthermore, wireless communication element 2895 may be implemented to have its own power supply so that it may be turned on and off independently from other components of the receiver—e.g., by a microprocessor.

With an idle state in mind, the following paragraphs provide example configurations of receiver components shown in FIG. 10 during various states of the receiver, according to one aspect of the invention. It should be understood that alternative configurations may be implemented depending on the desired application.

In an idle state, for example, the receiver draws minimal current. Receiver 2800 is configured such that low power processor 2870 is in an inactive state (such as idle state) and high power processor 2880 is in an inactive state (such as idle state), and circuit blocks related to peripheral circuitry and their power supplies required during various active states remain off (for example, wireless communication module 2895 and the analog front end). For example, the low power processor may have a 32 KHz oscillator active and may consume a few µA current or less, including 0.5 µA or less. In the idle state, the low power processor 2870 may, for example, wait for a signal to transfer to an active state. The signal might be external such as an interrupt or internally generated by one of the device's peripherals, such as a timer. During the high power processors idle state, the high power processor may, for example, be running off a 32 KHz watch crystal. The high power processor may, for example, wait for a signal to transfer to active state.

When the receiver is in the sniff state, low power processor 2870 is in an idle state and high power processor 2880 is in an idle state. In addition, the circuit blocks relating to the analog front end including A/D converter that is needed for the sniff function are on (in other words, the high frequency signal chain). As stated earlier, the beacon signal module may implement various types of sniff signals to achieve low power efficiency.

Upon detection of a transmitted signal, a higher power demodulate and decode state may be entered. When the receiver is in the demodulate and decode state, low power processor 2870 is in an active state and high power processor 2880 is in an active state. High power processor 2880 may, for example, be running from a 12 MHz or near crystal oscillator with a PLL-based clock multiplier giving the device a 108 MHz clock speed. The low power processor 2870 may, for example, run off an internal R-C oscillator in the range of 1 MHz to 20 MHz and consume power in the range of 250 to 300 µA per MHz clock speed during active states. The active state allows for processing and any transmissions that may follow. Required transmissions may trigger the wireless communication module to cycle from off to on.

When the receiver is in collect ECG and accelerometer state, the circuit blocks relating to the accelerometer and/or ECG signal conditioning chain are on. The high power processor 2880 is in an idle state during collection, and in an active state (for example, running from a 12 MHz or near crystal oscillator with a PLL-based clock multiplier giving the device a 108 MHz clock speed) during processing and transmission. The low power processor 2870 is in an active state during this state and may run off an internal R-C oscillator in the range of 1 MHz to 20 MHz and consume power in the range of 250 to 300 uA per MHz clock speed.

The low power processor (e.g., MSP shown in FIG. 10) and high power processor (e.g., DSP shown in FIG. 10) may communicate with each other using any convenient communication protocol. In some instances, these two elements, when present, communicate with each via a serial peripheral interface bus (hereinafter "SPI bus"). The following description describes the signaling and messaging scheme implemented to allow the high power processor and low power processor to communicate and send messages back and forth along the SPI bus. For the following description of the communication between the processors, "LPP" and "HPP" are used in place of "low power processor" and "high power processor", respectively, to stay consistent with FIG. 10. The discussion, however, may apply to other processors than those shown in FIG. 10.

Figure 11:
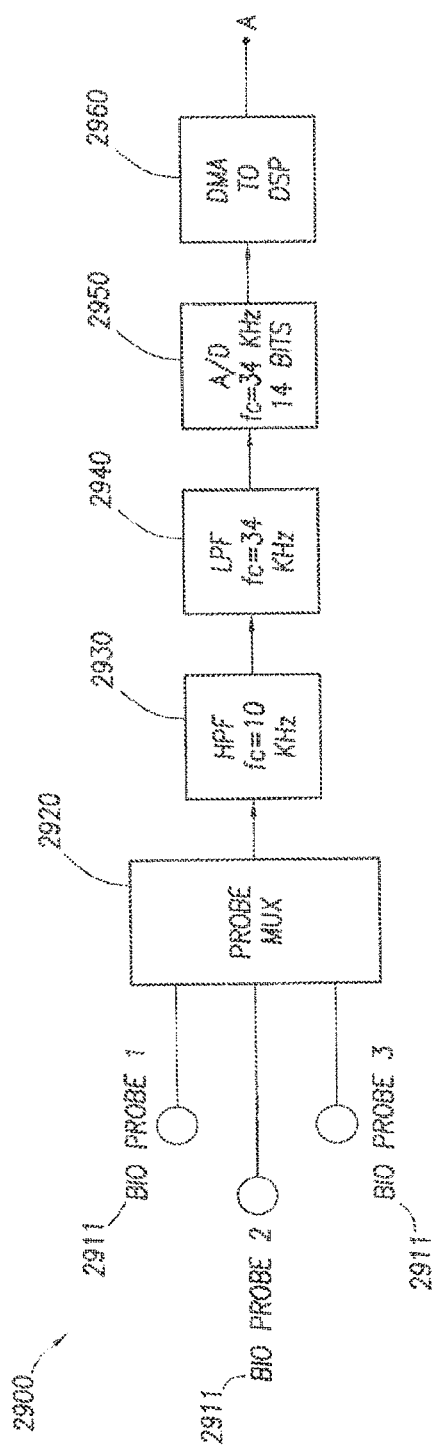
FIG. 11 provides a block diagram of a high frequency signal chain in a receiver, according to one aspect.

FIG. 11 provides a view of a block diagram of hardware in a receiver according to an aspect of the invention related to the high frequency signal chain. In FIG. 11, receiver 2900 includes receiver probes (for example in the form of electrodes 2911, 2912 and 2913) electrically coupled to multiplexer 2920. Also shown are high pass filter 2930 and low pass filter 2940 to provide for a band pass filter which eliminates any out-of-band frequencies. In the aspect shown, a band pass of 10 KHz to 34 KHz is provided to pass carrier signals falling within the frequency band. Example carrier frequencies may include, but are not limited to, 12.5 KHz and 20 KHz. One or more carriers may be present. In addition, receiver 2900 includes analog to digital converter 2950—for example, sampling at 500 KHz. The digital signal can thereafter be processed by the DSP. Shown in this aspect is DMA to DSP unit 2960 which sends the digital signal to dedicated memory for the DSP. The direct memory access provides the benefit of allowing the rest of the DSP to remain in a low power mode.

An example of a system that includes a receiver is shown in FIG. 12. In FIG. 12, system 3500 includes a pharmaceutical composition 3510 that comprises an ingestible device such as an ingestible event marker, "IEM." Also present in system 3500 is signal receiver 3520. Signal receiver 3520 is configured to detect a signal emitted from the identifier of the IEM 3510. Signal receiver 3520 also includes physiologic sensing capability, such as ECG and movement sensing capability. Signal receiver 3520 is configured to transmit data to a patient's an external device or PDA 3530 (such as a smart phone or other wireless communication enabled device), which in turn transmits the data to a server 3540. Server 3540 may be configured as desired, e.g., to provide for patient directed permissions. For example, server 3540 may be configured to allow a family caregiver 3550 to participate in the patient's therapeutic regimen, e.g., via an interface (such as a web interface) that allows the family caregiver 3550 to monitor alerts and trends generated by the server 3540, and provide support back to the patient, as indicated by arrow 3560. The server 3540 may also be configured to provide responses directly to the patient, e.g., in the form of patient alerts, patient incentives, etc., as indicated by arrow 3565 which are relayed to the patient via PDA 3530. Server 3540 may also interact with a health care professional (e.g., RN, physician) 3555, which can use data processing algorithms to obtain measures of patient health and compliance, e.g., wellness index summaries, alerts, cross-patient benchmarks, etc., and provide informed clinical communication and support back to the patient, as indicated by arrow 3580.

In one aspect the ingestible event marker is combined with food and/or food and pharmaceuticals in several different configurations where the ingestible event marker can survive the mastication, i.e., chewing, process. The following description provides several combinations of ingestible event marker with food and/or food and pharmaceuticals in many different forms.

In one aspect, the ingestible event marker and associated electronic components retain their functional integrity from the time it reaches its destination while being masticated and still remains operable. Alternative, other aspects are disclosed where the ingestible event marker does not necessarily survive the mastication process, however, mastication or other bodily sounds are detected by way of acoustic sensing techniques. Applications of any of these aspects include, without limitation, pediatric, elderly, veterinary, nutricitical, acoustic feedback effect, among others. The types of food combinations include without limitation solid, semi-solid, and liquid forms of foods and discussed with more particularity hereinbelow. The combination of ingestible event marker and food or the combination of ingestible event marker, food, and pharmaceutical may be coated with substances or compounds to preserve the integrity of the ingestible event marker until such time as the food product is prepared for consumption, consumed orally by mastication or otherwise, or the food product has been consumed orally and the ingestible event marker is passing through the gastrointestinal system where the coating is configured to dissolve in the esophagus, stomach, small intestine, large intestine, colon, or otherwise. These and various alternatives, aspects, and embodiments of combinations of ingestible event marker and food products and combinations of ingestible event marker, food products, and pharmaceuticals are now described.

It is a familiar occurrence for people who take medicine to crush the medicine and mix it with a food product such as applesauce, pudding, peanut butter, candy, among others, to make ingestion of the medicine more palatable. This is particularly common with infants, children, elderly, and even pets. For example, the medicine may be located in infant formula, mixed with applesauce for their children, pudding for the elderly, and peanut butter for the pet dog. Thus, people are used to mixing food products with pharmaceutical drugs, prescription or otherwise, nutritional supplements, or otherwise, to facilitate the process of adherence to a particular regimen.

Thus in pediatric applications, the medicines or supplements may be mixed or otherwise combined with baby formula and/or smart feeding bottle, since formula is likely the only type of food a lot of babies eat during infancy. For children, the medicine can be mixed or otherwise combined with candy or semisoft foods such as gelatin, applesauce, pudding, powder drinks, sports drinks, chewable vitamins or supplements. For the elderly, the medicine can be mixed or otherwise combined with soft foods or liquids, including, for example, pudding, powdered energy drinks, dietary supplements, among others. For veterinary applications, the medicine may be mixed or otherwise combined with animal feed.

In each of the above listed applications, an ingestible event marker would be combined with a food product and/or combined with the food product and a pharmaceutical product. In addition to the above applications, other applications of interest include systems that could survive in an aqueous formulation and activate upon mastication or exposure to digestive enzymes. Such ingestible event markers would be contained in a protective capsule, coating, or bubble such that along with an oral suspension of fluid or nutritional supplement the user also ingests an ingestible event marker device which provide a signal when ingested. Thus the ingestible event marker and food or supplement may be packaged and stored in a moist environment and protected until it is either chewed or located in the stomach or both. It will be appreciated that most food products or substances that can be used or prepared for use as food and medicine is that a lot of foods are going to have some moisture content in them. The moisture content in the food has to be managed to prevent the ingestible event marker from activating prematurely. Exceptions would include freeze dried food products. The objective is to keep the ingestible event marker dry, free from moisture or liquid, until it is masticated and ready to emit.

Figure 13A:
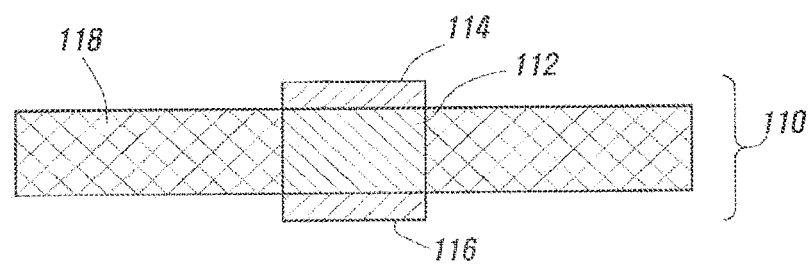
FIG. 13A shows a view of an aspect of an ingestible event marker which has a signal amplification element that extends beyond the outer edges of the upper and lower electrodes (which also serve as signal transmission elements) to provide a virtual dipole having a length that is longer than the actual dipole between the signal transmission elements.
Figure 13B:
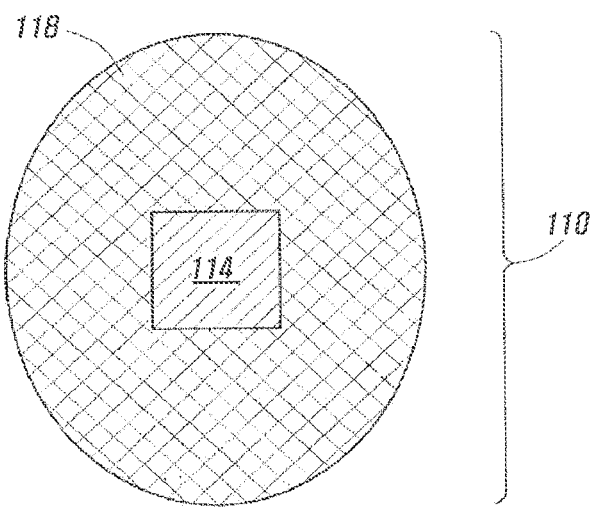
FIG. 13B shows an overhead view of the ingestible event marker of FIG. 13A, showing the disc shape of upper electrode and the positioning of the upper electrode in the center of disc-shaped signal amplification element.

An example of an ingestible event marker of interest is depicted in FIGS. 13A and 13B. The ingestible event marker shown in FIGS. 13A and 13B includes an integrated circuit component as well as upper and lower electrodes, where the upper and lower electrodes are configured such that upon contact with stomach fluid current runs through the integrated circuit to cause one or more functional blocks in the circuit to emit a detectable signal. The marker shown in FIGS. 13A and 13B includes a virtual dipole signal amplification element, as reviewed in greater detail in PCT application serial no. PCT/US2008/077753, the disclosure of which is herein incorporated by reference.

FIG. 13A provides a view of an aspect of an ingestible event marker 110 which has a signal amplification element that extends beyond the outer edges of the upper and lower electrodes (which also serve as signal transmission elements) to provide a virtual dipole having a length that is longer than the actual dipole between the signal transmission elements. As shown in FIG. 13A, ingestible event marker 110 includes integrated circuit component 112, having an upper electrode 114 and a lower electrode 116 (which may comprise two distinct material layers). Also shown is disc-shaped signal amplification element or non-conductive current path extender ("skirt") 118.

FIG. 13B provides an overhead view of the ingestible event marker 110 of FIG. 13A, showing the disc shape of upper electrode 114 and the positioning of the upper electrode in the center of disc-shaped signal amplification element 118. The distance that the edge of the signal amplification element may extend beyond the edge of electrodes may vary, and in certain instances is 0.05 mm or more, e.g., 0.1 mm or more, including 1.0 mm or more, such as 5.0 mm or more and including 10 mm or more, where the distance may not exceed 100 mm in some instances.

As can be seen in the aspect depicted in FIGS. 13A to 13B, the upper and lower electrodes are planar electrodes, where these electrodes may have any convenient shape, such as square, disc, triangular, oval, irregular, etc. The disc-shaped signal amplification element 118 is a planar disc structure, where the edge of the signal amplification element extends beyond the edge of the planar upper and lower electrodes. In the depicted ingestible event marker 110, the radius of the signal amplification element is longer than the radius of the upper and lower electrodes, for example by 1 mm or more, such as by 10 mm or more.

Ingestible event markers produced may be configured in a variety of different formats. Formats of interest include, but are not limited to, tablets and capsules.

The ingestible event marker 110 may include a coating, which coating may cover one or more surfaces of the ingestible event marker 110 or all of the surfaces of the ingestible event marker, such that the ingestible event marker is enveloped by the coating. The protection function of the coating can vary. For example, the coating can be configured to protect the ingestible event marker or components thereof, such as the integrated circuit component, the electrode components, etc., during processing, during storage, or even during various phase of ingestion, e.g., esophagus, stomach, small intestine, large intestine, colon. For instance, one may not desire the circuitry to be exposed to the body fluids or activating electrically conductive fluids after the ingestible event marker is ingested. In such instances, it may be desirable to only have the incomplete battery and transmit antennas be exposed to electrically conductive fluids, with the rest of the circuitry being protected. In such instances, a coating on top of the circuitry component that is ingestible but does not dissolve until the device has finished its signal transmission may be provided.

Also of interest are coatings that are designed to protect the ingestible circuitry component during storage, but that dissolve immediately during use. For example, coatings that dissolve upon contact with an aqueous fluid, such as stomach fluid or fluids commonly found in food products, may be employed. Also of interest are protective coatings that are employed to allow the use of processing the ingestible event marker with a food product or food product/pharmaceutical compound that would otherwise damage certain components of the device. In such instances, a protective coating on the ingestible event marker that prevents mechanical or liquid contact with the ingestible event marker can be employed. Coatings of interest include pliable coatings that protect the ingestible event marker from forces that may be experienced by during ingestible event marker storage prior to ingestion or combining with food products containing moisture content, such as applesauce, pudding, energy drinks and the like. Coatings of interest also include environmentally sensitive coatings, such as pH sensitive coatings that protect the ingestible event marker from a liquid present in a capsule but then dissolve once the ingestible event marker contacts stomach fluid. Examples of such coatings are liquid protective coatings that prevent the circuit component of the ingestible event marker from being activated by liquid of the carrier component of the ingestible event marker. Another purpose of the coatings may be to control the activation of the device. For example, an edible coating that covers the electrodes and takes a certain period of time, e.g., five minutes, to dissolve upon contact with stomach fluid may be employed. The coating can also be an environmentally sensitive coating, e.g., a temperature or pH sensitive coating, or other chemically sensitive coating that provides for dissolution in a controlled fashion and allows one to activate the device when desired. Coatings that survive the stomach but dissolve in the intestine are also of interest, e.g., where one desires to delay activation until the device leaves the stomach. An example of such a coating is a polymer that is insoluble at low pH, but becomes soluble at a higher pH. Coatings of interest further include hot-melt coatings and sugar coatings.

Of interest in certain instances are hydrogel coatings. Hydrogel coatings are polymeric coatings made up of one or more different types of non-water soluble polymers, where the coatings absorb water upon contact with an aqueous medium to produce a hydrated gel-structure that has a high water content, such as 90% or more w/w, including 95% or more w/w, such as 99% or more w/w. Any physiologically acceptable hydrogel composition may be employed as a coating, where hydrogel compositions of interest may include one or more of the following polymers: polyethylene oxides, acetates, etc. In the hydrated gel structure state, the coating may be pliable, and thereby protect the ingestible event marker during processing. In some instances, the hydrogel coating may include one or more agents which provide for a controlled environment (for example in terms of conductivity) when the ingestible event marker reaches the target physiological site. Agents of interest include, but are not limited to: salts of physiologically acceptable electrolytes, such as but not limited to: sodium ion, chloride ion, potassium ion and calcium ion, magnesium ion, etc. Specific physiologically compatible salts of interest include, but are not limited to: KCl, NaCl, MgCl2, and the like.

Figure 13C:
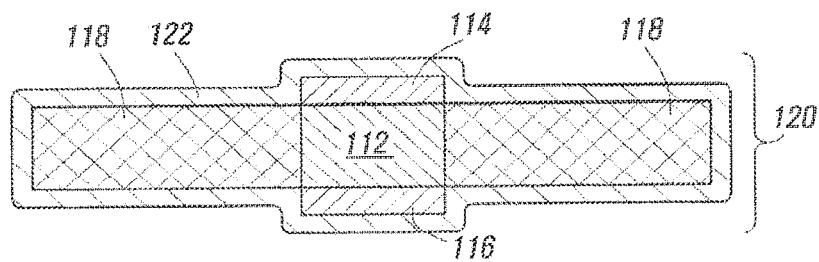
FIG. 13C shows a uniform coating in terms of thickness enveloped around an ingestible event marker.

Coatings may take a variety of different configurations, such as layers, snap-fit pre-made capsule components, etc. When present, coatings may cover only a portion of the ingestible event marker or envelope the entire. The coating may be uniform in terms of thickness. An example of an ingestible event marker that is enveloped in a coating of uniform thickness is shown in FIG. 13C. In FIG. 13C, ingestible event marker 120 includes integrated circuit component 112, having an upper electrode 114 (which may comprise two distinct material layers) and a lower electrode 116, as well disc-shaped signal amplification element 118. Also shown is uniform coating 122.

Figure 13D:
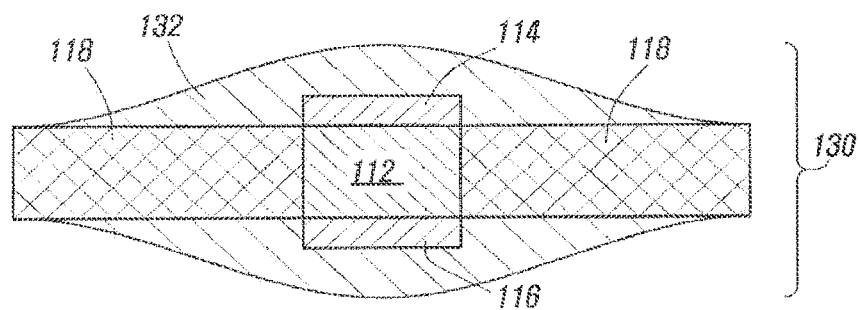
FIG. 13D shows an ingestible event marker that is enveloped in a coating of non-uniform thickness.

Alternatively, the coating may be non-uniform, e.g., where the coating is thicker towards the center of the ingestible event marker as opposed to the edges of the ingestible event marker. An example of an ingestible event marker that is enveloped in a coating of non-uniform thickness is shown in FIG. 13D. In FIG. 13D, ingestible event marker 130 includes integrated circuit component 112, having an upper electrode 114 (which may comprise two distinct material layers) and a lower electrode 116, as well disc-shaped signal amplification element 118. Also shown is non-uniform coating 132, which non-uniform coating 132 is thicker above and below the electrode components 114 and 116 and thinner towards the outer edge of the signal amplification element 118.

Figure 13E:
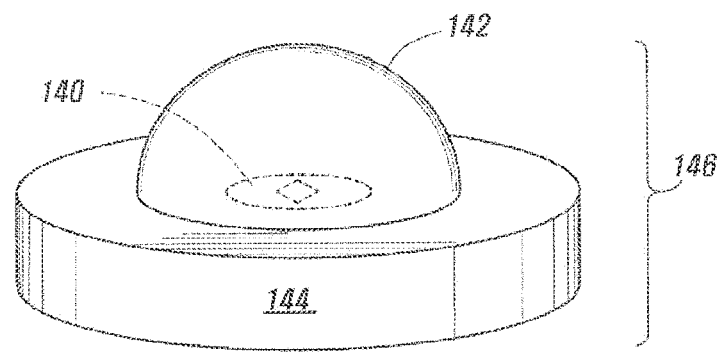
FIG. 13E shows a view of the ingestible event marker identifier covered on one surface by a coating in the form of a protective cap.
Figure 13F:
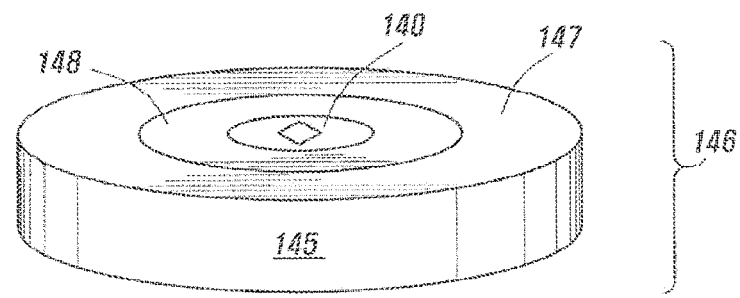
FIG. 13F shows a view where the protective cap from FIG. 13E has been replaced by a protective sheet.
Figure 13G:
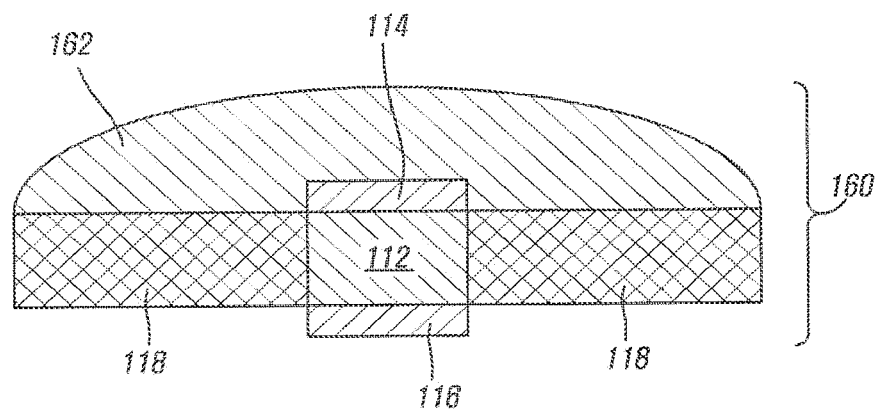
FIG. 13G shows a view where a protective cap is pre-affixed to the upper surface of the ingestible event marker before the ingestible event marker is adhered to a tablet carrier.

In some instances, the coating covers only a portion of the ingestible event marker. FIG. 13E provides a view of the ingestible event marker identifier 140 covered on one surface by a coating in the form of a protective cap 142. Also shown in FIG. 13E is carrier 144 in the form of a tablet, where the carrier 144 together with the ingestible event marker identifier 140 and protective cap 142 make up an ingestible event marker 146. FIG. 13G shows a variation of an ingestible event marker 160 according to the present invention. Ingestible event marker 160 is made up of integrated circuit component 112, upper and lower electrodes 114 and 116 and signal amplification element 118. In the view shown in FIG. 13G, protective cap 162 is pre-affixed to the upper surface of the ingestible event marker before the ingestible event marker is adhered to a tablet carrier. In an alternative configuration shown in FIG. 13F, protective cap 142 from FIG. 13E has been replaced by protective sheet 148. Where desired, the protective sheet 148 may fit with the upper surface 147 of a tablet component 145 to be level with the upper surface 147 of the tablet component 145. The tablet component 145 may define a cavity (not shown) for receiving the ingestible event marker 140 such that when the protective sheet 148 is fitted into the cavity it is approximately level with the upper surface 147.

Any coating associated with an ingestible event marker may be opaque in order to prevent the end-user from seeing the ingestible event marker associated with carrier of the ingestible event marker. Alternatively, the coating may be transparent so as to provide ready visualization of the ingestible event marker that is stably associated with the carrier.

With respect to fabrication of such coatings, the coatings may be associated with the ingestible event marker using any convenient protocol, such as by use of a fluidized bed, deposition as well as instances where the coating is pre-made and then fit over the ingestible event marker, such as a cap that is glued onto a portion of the ingestible event marker or capsule components that are press-fit onto a composite structure of an ingestible event marker and a carrier, such as a tablet. In some instances, an assembly unit may be configured to associate a coating with the ingestible event marker, such as by dispensing a precursor coating fluid onto an ingestible event marker, where the precursor coating fluid cures into the desired coating.

In one aspect, the ingestible event marker may be coated with an agent that burst when it gets wet. In one aspect, the ingestible event marker may be encased by a wax coating. Chewing the food product breaks up the wax coating releasing the ingestible event marker in the mouth. The wax coating may be applied by dipping the ingestible event marker in wax such that it is formed around the ingestible event marker. The wax coating provides moisture protection and would prevent the ingestible event marker from activating prematurely because the wax is impermeable to water. Food grade waxes provide suitable permeability to moisture. In some aspects, a synthetic wax with a melting point below body temperature may be employed. In other aspects, waxes with very sharp melting points that would ride up body temperature may be employed. In another aspect, a swellable hydrogel layer may be provided underneath the wax layer to break it up. This may be accomplished with melting waxes. Sodium bicarbonate may be added to the hydrogel to assist it to break up the wax layer.

In another aspect, the ingestible event marker may be encased in congealed grease. Like wax coatings, congealed grease coatings would provide a certain level of impermeability to moisture to prevent the ingestible event maker from activating prematurely.

In other aspects, refrigerated, environmentally controlled, or maximum exposure types of food products including nutritional products that cannot survive in the back of a hot semi-trailer truck may be coated to prevent the ingestible event marker for activating prematurely.

In various aspects, the ingestible event marker is provided with a coating to enable the ingestible event to better survive crushing by the teeth during mastication. Even with the disclosed coatings, not all ingestible event markers may survive mastication, thus a plurality of ingestible event markers may be distributed within the coating material. In one aspect, the ingestible event marker may be coated with a gelatin-like coating to protect the ingestible event marker from being crushed when chewed. Likewise, the gelatin-like coating protects the teeth from biting down directly onto the ingestible event marker. Other coatings include rubber-elastic candy based on a starch matrix. Examples of some of these coatings are known in industry as gummy bear type coatings. A gummy bear material, e.g., a gelation, may be formulated in many different flavors such as Tapioca, for example.

In one aspect, the medicines may be mixed with or otherwise combined with a semisoft high moisture content food product such as applesauce, for example. The ingestible event marker would comprise a protective coating and then be mixed in with the food product and medicine at the time scheduled for administering the medicinal dose.

Ingredients for films and coatings used in the food and pharmaceutical industries can provide protective and other selectively functional coatings over the ingestible sensor. Hydrocolloids such as cellulose derivatives (HPC, HPMC are examples), carrageenan, sodium alginate, pectin may be used in protective edible coatings of the ingestible sensor. The films may be cast or extruded, sprayed over the sensor, or the sensor immersed in the coating material. Multiple films may be used. Several examples are provided.

In a preferred embodiment a bilayer comprising an HPC based adhesive layer and a sodium alginate based protection layer are cast and laminated together prior to attachment over the sensor. The films may comprise plasticizers and adhesive and film forming additions. Examples include tri-ethyl cellulose, glycerin, polyvinylpyrrolidone.

Figure 14:
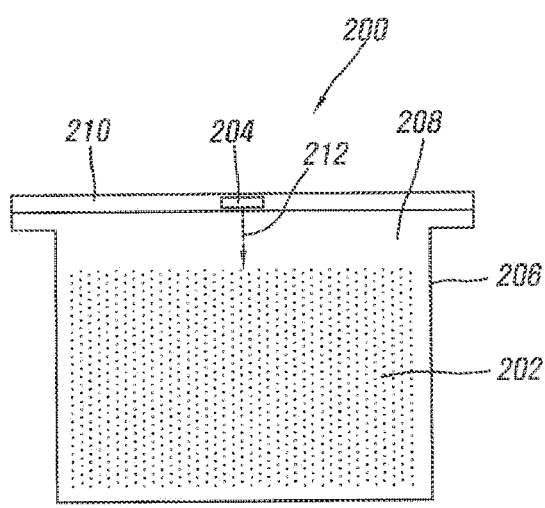
FIG. 14 shows a system comprising a food product and an ingestible event marker packaged separately in a container.

FIG. 14 shows a system 200 comprising a food product 202 and an ingestible event marker 204 packaged separately in a container 206. In aspect, the food product 202, let's assume applesauce, is packed in a vacuum 208 and the ingestible event marker 204 is packed in a lid 210 of the container 206. When the lid 210 of the package 206 is opened, the ingestible event marker 204 and the food product 202 are exposed to full atmospheric pressure and the ingestible event marker 204 is released into the food product 202, where it can be mixed together with the medicine. Although the medicine may be included in the package 206, for flexibility, the medicine may be added after the container 206 is opened.

In one aspect, an opening is formed when the vacuum pack 206 is released the in process of opening it and the ingestible event marker 204 is released 212 into the food product 202. The ingestible event marker 204 would have a longer shelf life because it is combined with the food product 202 when the food is ready to be eaten. Once in the food, the ingestible event marker 204 can last 10-30 minutes. Once mixed into the food product 202, the coating provided around the ingestible event marker 204 protects the ingestible event marker 204 from dissolving in the food product 202 to preserve battery power. Ideally, dissolution of the ingestible event marker 204 should not begin until it reaches the stomach. In case the coating dissolves while the ingestible event marker 204 is still in the food product 202, a soft start routine may be employed to postponed a full power up of the ingestible event marker 204 to prevent expending all the current of the partial power source battery while the ingestible event marker 204 is still in the food product 202. The battery is consumed with the high current as the circuit is closed (activated). Nevertheless, once the ingestible event marker 204 becomes wet, the battery will be eventually be consumed in about 10 minutes to about 30 minutes, thus providing adequate time for the food product 202 to be eaten.

In one aspect the medicine in combination with the food product 202 can be made chewable. Also, to determined how much of the food product is consumed, multiple ingestible event markers 204 can be distributed through out the food product 202, for example, 100 ingestible event markers 204 may be located within a popsicle and the number of ingestible event markers 204 that are activated provides an indication of the quantity of medicine that was ingested. For example, if 100 ingestible event markers 204 are evenly distributed in the food product 202 and if 30 ingestible event markers 204 are activated, then it can be concluded that 30% of the medicine was ingested. A similar distribution can be done with a caramel log such as a Tootsie roll.

Hydrochloride materials may be utilized as coatings around the ingestible event marker 204 to control water absorption by the ingestible event marker 204 to and hence control the activation time of the ingestible event marker 204. Materials comprising alginic acid known as alginates are considered hydrochloride materials. An alginic acid, also called algin or alginate, is an anionic polysaccharide distributed widely in the cell walls of brown algae, where through binding with water it forms a viscous gum. In extracted form it absorbs water quickly; it is capable of absorbing 200-300 times its own weight in water. Accordingly, alginate materials can be utilized as a coating material to control the activation of ingestible event markers 204 by controlling moisture access to the ingestible event marker 204.

In one aspect, materials with pH driven triggers can be used in the coating surrounding the ingestible event marker 204 to determine how much material dissolved and to drive delivery. The coating on the ingestible event marker 204 is pH sensitive to change the permittivity of moisture relative to the pH of the fluid in which the coating, and hence the ingestible event marker 204, is in contact in. In a high pH environment, the coating is impermeable and enables very little moisture to penetrate the ingestible event marker 204. In a low pH environment, the coating is porous and enables more moisture to penetrate to the ingestible event marker 204.

Enteric coatings, which are designed to dissolve in the intestine also may be provided around the ingestible event marker 204 to control activation thereof. An enteric coating is porous in a neutral pH environment and impermeable in a low pH environment. For example, the stomach is acidic with a pH of 3 or below, which is typically very low. An enteric coating provided on the ingestible event marker 204 will prevent it from dissolving, and thus activating, until it reaches an environment with a more neutral pH such as the intestine. It would be desirable to confirm good detection of the ingestible event marker 204 in the intestine. An enteric coating can be applied to the ingestible event marker 204 to delay dissolution and activation until it reaches the intestine. The enteric coating could be utilized in conjunction with a family of pharmaceuticals where all of the absorption occurs in the intestine. The enteric coating would provide a measure of control to get all of the pharmaceutical absorbed in the intestine. Accordingly, the enteric coating prevents the pharmaceutical dose form (tablet, capsule, etc.) from dissolving in the stomach. Rather, it dissolves when it gets into a neutral pH in the intestine. Thus, utilizing enteric coatings may be very useful for incorporating this into like sodas, because you always have a little bit of citric acid in there which will keep the pH relatively low.

In one aspect, one or more ingestible event markers 204 can be added to the package 206 or the food products 202. In one aspect, one or more ingestible event markers 204 can be added to food products 202 prior to cooking. The coating may be configured to dissolve when it reaches a certain temperature, at which point the ingestible event marker 204 becomes soluble and is irreversibly activated. A few ingestible event markers 204 with heat sensitive coatings can be added to food products, such as hamburgers. As long as the hamburger remains frozen it remains inert, however, as but as the hamburger is grilled to a particular temperature the coating dissolves in the heat and the ingestible event marker 204 now is in a soluble state. Accordingly, when the hamburger is eaten, the ingestible event marker 204 begins communicating.

In another aspect, two separate materials may be utilized to coat the ingestible event marker 204. The materials can be located on top of each other either at room temperature or while frozen. The materials can be configured to not react all until they are heated up to grilling temperature and then they react and the ingestible event marker is irreversibly turned on. The materials may have different thermal expansion coefficients. Accordingly, two materials with different expansion coefficients layered on top of each other will curl up when they heat up. The medicine may be set in a powder, like hot chocolate, and then the hot water is added. Adding the medicine in the hot water activates this device, and then it changes state. The different thermal coefficients also may work with polymers that are very temperature sensitive and can provide a double layer of protection. The grilling configuration could be applied in food safety and may be tailored to emit a signal at the temperature when the food has been safely cooked.

The ingestible event marker 204 could be located in the marshmallows or something like that. So as the child is drinking hot chocolate he swallows the ingestible event marker that has been activated in the microwave oven. Marshmallows dissolve away.

Thermal electric marshmallows can be utilized to power up the ingestible event marker 204. Then the marshmallows can be put into the hot chocolate or as they float on the surface, a thermal differential can be obtained.

In one aspect, the medicine may be embedded in a semi soft moist food product 202, such as peanut butter, and the ingestible event 204 marker may be embedded in a hard dry food product, such as a graham cracker. The two components can be combined just before they are eaten. So by adding the two components the user will receive the ingestible event marker 204 by swallowing. The ingestible event marker 204 is already basically activated. This may be considered one aspect of a hybrid delivery system with the food product in one chamber and the ingestible event marker is in another chamber. When you chew on the hybrid package, the chamber is crushed and the divider and the ingestible event marker 204 activates in the mouth.

Figure 15:
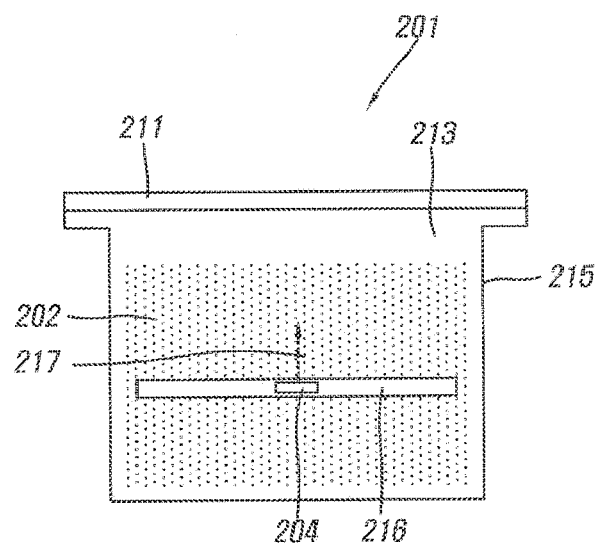
FIG. 15 shows an alternatively system where the food product is packed under pressure with gas bubbles.

FIG. 15 shows an alternatively system 201 where the food product 202 is packed under pressure 213 with gas bubbles. When the pressure 213 is released by opening the lid 211, bubbles activate the ingestible event marker 204 in a chemically inert flow path. When the bubbles are strained through the fluid, the high pressure inert flow path releases the ingestible event marker 204 into the food product 202. The liquid and the gas liquid phases provide suitable pressure to release the ingestible event marker 204. As the lid 211 of the container 215 is opened like a can of soda the ingestible event marker 202 containing package 216 explodes and releases 217 the ingestible event marker 204 into the food product 202. The release 217 of the ingestible event marker 204 would be automatic upon opening the package 215.

In one aspect, the ingestible event marker 204 is packaged in the release package 216 in a cold environment so that it is frozen and then encapsulated into a relaxed bladder, like a balloon, under pressure. The pressure would tend to keep the moisture out of the release package 216 containing the ingestible event marker 204. The packaging of the medicine or the food with the medicine in it also may be done at the freezing point (zero centigrade) to keep everything frozen. The liquid layer, a frozen flow inert layer that may be coated with a wax layer, is located in the food product 202 (e.g., applesauce), and sealed off. Once sealed off, the food product 202 is coated with a wax layer and can be stored at room temperature under very high pressure so it is balanced when the container is opened to release the outer pressure. Once the food product 202 (e.g., applesauce) and the medicine is mixed in, the ingestible event marker 204 is released into the mixture to determine when the combination of food product 202 and medicine is ingested.

In another aspect the medicine may be packaged separately from the food product 202, e.g., just like granola is packaged separately from yogurt to prevent it from getting soggy. This would allow the food product 202 to be packaged separately from the medicine such that different medicine or a different brand of the same medicine can be given with the food product 202.

It may be more practical to enable a pressure package 216 rather than a vacuum package 206. In a pressure package 216, liquid is used to pressurize the container. A flow inert known as $CF_X$, $CHF_X$, or $C_XF_Y$ is employed as the pressure source. The boiling point and the freezing point of the $CF_X$, $CHF_X$, or $C_XF_Y$ is based on the length of the carbon chain. The longer the carbon chain the easier it can be frozen at room temperature. This technique can be used with a variety of food products 202.

Figure 16:
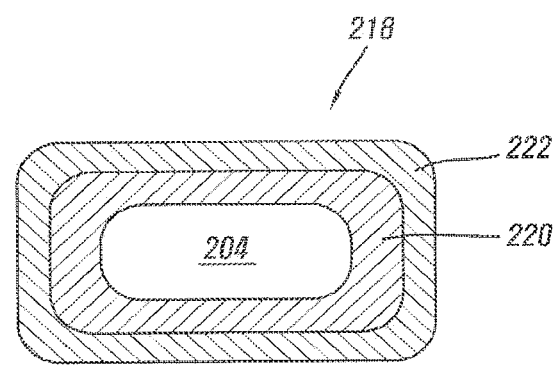
FIG. 16 shows a compound where the ingestible event marker is coated with a first coating and a second coating.

FIG. 16 shows a compound 218 where the ingestible event marker 204 is coated with a first coating 220 and a second coating 222. In one aspect, the first coating 220 may be a chocolate coating and the second coating 222 may be a polymeric coating. The ingestible event marker 204 can be located within the first coating 220 and packaged and prepared with the first coating 220 at a temperature within a narrow range. For example, if the ingestible event marker 204 is part of a chocolate first coating 220 and the chocolate is beyond its melting point, the ingestible event marker 204 cannot be used. Accordingly, the first coating 220 can be used to control the temperature at which the ingestible event marker 204 activates. The first coating 220 and the ingestible event marker 204 compound can then be coated with a polymeric type second coating 222 that has a sharp melting point. The compound 218 can be a two-piece assembly where an outer layer formed by the second coating 222 may be made of sugar to provide moisture resistance and an inner layer formed by the first coating 220 provides resistance and cushioning to tolerate the mastication process. The inner layer 220 material may be coated around the ingestible event marker 204 to provide cushion during mastication and to enable the ingestible event marker 204 to be swallowed without damaging the ingestible event marker 204 or damaging the teeth. The various layers of the masticable could be adjusted. For example, multi-layers may be provided in the masticable such that outer layers provide a slippery and chewy feeling and inners layers that are more protective.

Figure 17:
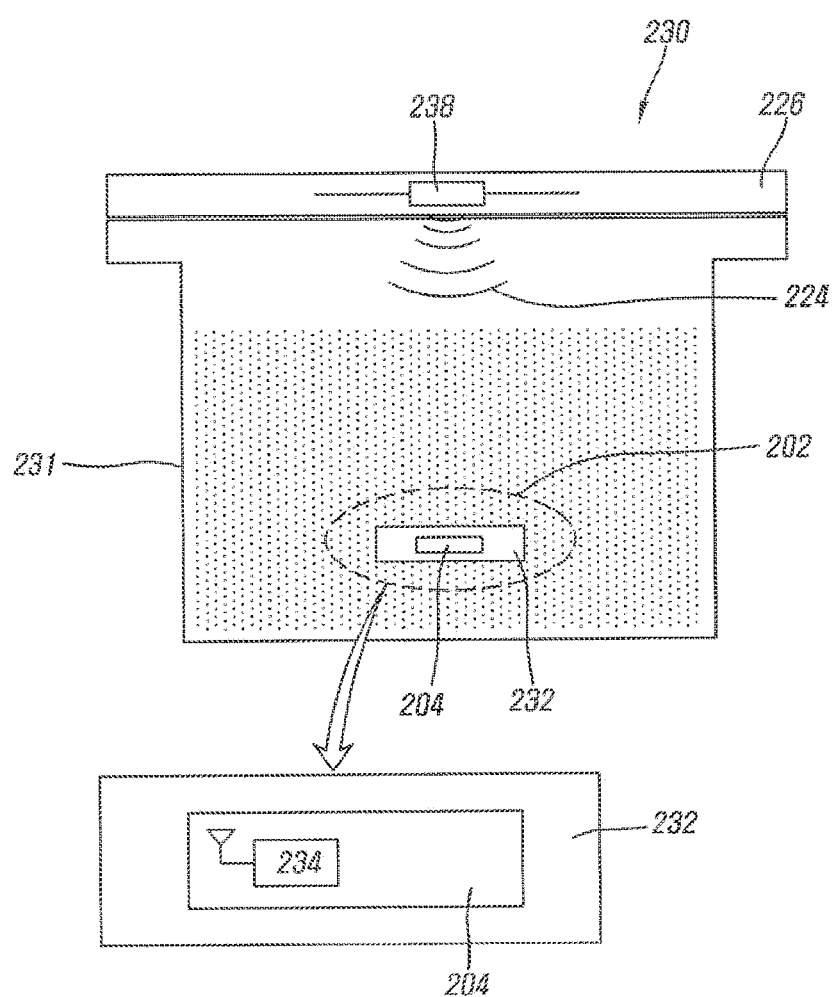
FIG. 17 shows a smart package system that includes a zinc air battery that when opened is activated and sends an electronic signal through the food product and an ingestible event marker is located inside the food product.

FIG. 17 shows a smart package system 230 that includes a zinc air battery and RFID circuit 238 that when opened is activated and sends an electronic signal 224 through the food product 202 (e.g., applesauce) and an ingestible event marker 204 is located inside the food product 202. In one aspect, it may involve peeling something like peeling the lid 226 off the smart package system 230 container 231 and the rest is automatic. The lid 226, or other component of the smart package system 230 container 231, comprises a battery and RFID circuit 238 embedded into it. Battery contacts are activated when the lid 226 is opened such that just opening the lid 226 up activates the battery and RFID circuit 238. The ingestible event marker 204 comprises a coating 232 that is impervious to water to protect the ingestible event marker 204 from the food product 202. The coating 232 can be broken or destroyed to release the ingestible event marker 204 when it receives the electronic signal. The ingestible event marker 204 comprises a detection circuit 234 that receives the electronic signal 224 by RFID coupling and the electronic message to the ingestible event marker 204 causes the coating 232 to break up and release the ingestible event marker 204. The breaking process may be electrically controlled. In one aspect, the detection circuit 234 of the ingestible event marker 204 includes an electronic RFID interface that, upon receiving a certain message, causes the ingestible event marker 204 to break up the surrounding coating 232 material by driving a an electric current trough it. The material 232 may be configured to break open as it heats up when the electric current is driven through it, thus influencing the environment and causing the coating 232 shell to burst. The signal is generated only when the lid 226 of the smart package 231 is opened and thus, the ingestible event marker 204 is activated only upon opening the lid 226 of the smart package 230.

A special receiver may be utilized with pediatric users to communicate with the ingestible event markers 204. In one aspect, the special receiver directly talks to the ingestible event markers 204 with destructible coatings 232, and periodically sends out information. After ingestion, the ingestible event marker 204 stays in its shell until it receives a signal from the special receiver. When the signal is received, the destructible coating is broken and the ingestible event marker 204 is released into the stomach. If the destructible coating is impervious to water, the ingestible event marker 204 can be placed into any liquid. The destructible signal may be an RF signal transmitted by the receiver.

In one aspect, an electrical signal stronger than what can be generated by a receiver is generated by a wall unit plugged into a household AC power outlet. The electrical signal from the home hub plugs into the wall and broadcasts a really strong signal to break open the coating 232 when the ingestible event marker in the stomach. Silicon dioxide to separate capacitive plates may provide two-orders of magnitudes of greater coupling of energy during the wireless interrogation, which is seven microns now.

The detection circuit 234 may capture power with a resonant circuit driving a diode and scrubbing heat off to cause the flow of polymers in the coating 232 to melt and release the ingestible event marker 204. In other words, the smart package 230 communicates with the ingestible event marker 204 with RF signals, resonance, or electrochemical reaction to make the coating 232 material boil and break open the shell that contains the ingestible event marker 204 and release the ingestible event marker 204 into the food product 202. Once the ingestible event marker 204 is released into the food product 202 (e.g., applesauce) the ingestible event marker 204 communicates for about 15 minutes. The purpose ultimately is to provide adherence information and make it easier to take medicine. When the food product 202 smart package 230 contains moisture or something in a water environment, the anode catheter should be protected from getting wet. Ideally like an impervious coating 232 shell that is broken. It is easier to take medication with adherence information on it.

In one aspect, the coating 232 may be a gelatin like coating (gummy bear) that may be soft, hard, or a gradient between soft and hard. A gradient would be is desirable such that the outside comprises a slippery and chewy layer and the inside comprises a more protective layer and small enough for the critical dimension to make it easy to swallow. The inner layer could be electrically conductive once it gets wet or masticated. It could be a gelatin layer in a polymer matrix such that when it is chewed or swallowed, the gelatin leeches out to provide electrically conductive pathways to generate a signal that can be detected by a receiver as well as the ingestible event marker 204 located in the food product 202. It could be either a conductive signal or it could be a Bluetooth signal, or some other short range wireless signal. When the smart package 230 is opened, a signal is sent in the form of an audible sound so that you know that you have five minutes to ingest the food product 202 containing the ingestible event marker 204. This is akin to the five minutes to self-destruct countdown popular in sci-fi movies, like the Aliens.

In various aspects, the food products may be selected among a group of foods that are eaten by children and/or the elderly. The applications for the elderly are similar to those for pediatric applications in that the system is making it easier for them to take their medicine. The food product may be a fruit flavored gelatin known under the trade name Jell-O or caramel logs known under the trade name Tootsie Roll.

Coatings to protect the ingestible circuitry during the mastication process include, for example, hydrocolloids such as cellulose derivatives (HPC, HPMC are examples), carrageenan, sodium alginate, pectin may be used in protective edible coatings of the ingestible sensor.

Other coatings may comprise sugars, starches, gelatin, and pectin may be processed to produce a soft masticable coating that could be bitten down on while protecting the sensor circuitry inside. Multiple layers of such coatings may be used to provide a gradient of stiffness through the coating, such that the inner layers are made stiffer and more protective and the outer layers are softer and more chewable.

The outer layers, with or without additional coatings, may be formulated to produce a smooth and slippery outer surface during mastication to enhance swallowing of the sensor.

Figure 18:
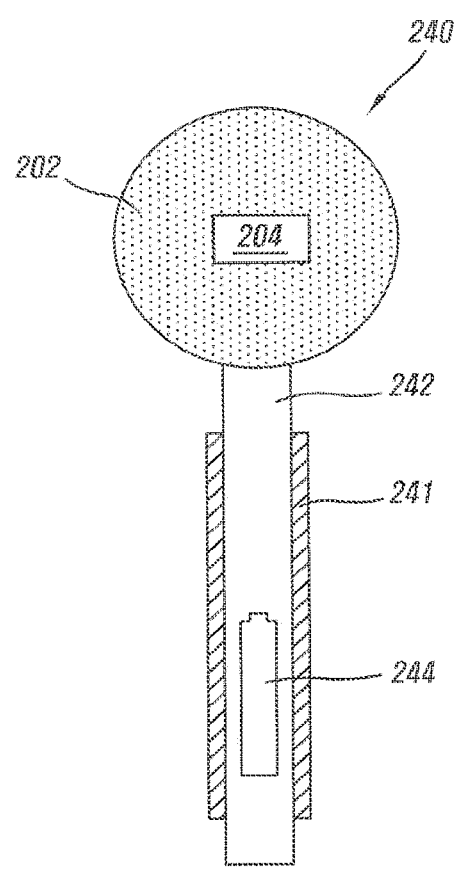
FIG. 18 shows a device comprising a food product provided with a handle comprising an electrically conductive electrode (shown in section) and a battery located within the handle.

FIG. 18 shows a device 240 comprising a food product 202 provided with a handle 242 comprising an electrically conductive electrode 241 (shown in section) and a battery 244 located within the handle 242. The device 240 is turned on by the battery 244 when the packaging is removed from the food product 202 at which time an ingestible event marker 204 emits electrically conductive signal through the handle 242 and to the user's body. Every time the food product 202 (e.g., lollipop) is licked it generates an electrically conductive signal that can be detected by a patch receiver. In one aspect, the conductive metal handle comprises an electrical conductor such as a metal electrode to electrically couple to the hand and as the lollipop is licked. In another aspect a quantified liquid that is different from body fluid goes through the mouth through the quantified liquid delivery. The signal encodes how much of the medication is in the lollipop.

Other techniques that can be used with children include aerosols, inhalation or nasal aerosol to spray them in nasal cavity, sodas, juices, smart popsicles. A smart popsicle is frozen and activates as it begins to melt. The popsicle can stay frozen which keeps the shell cold and it will stay frozen. It might give us a little more range for the lax. The drug is can be in the popsicle or it's being done while the drug is taken.

Coatings which break and expose the sensor when masticated may comprise, for example, film coatings based on sugars and starches including amylopectin, potato starch, maltodextrin, or cellulose, may be manufactured as thin coatings or films which will fracture when masticated. These may be used in combination with pH dependent coatings.

Coatings with solubility controlled in the mouth, esophagus, stomach may comprise, for example, coatings containing materials with pH dependent solubility may be used as functional coatings over the ingestion sensor. Reverse enteric coatings may be used for dissolution of the coating in the stomach to expose the sensor after mastication or after swallowing. Examples are aminoalkyl methacrylate copolymers and other acrylic based coatings.

Figure 19:
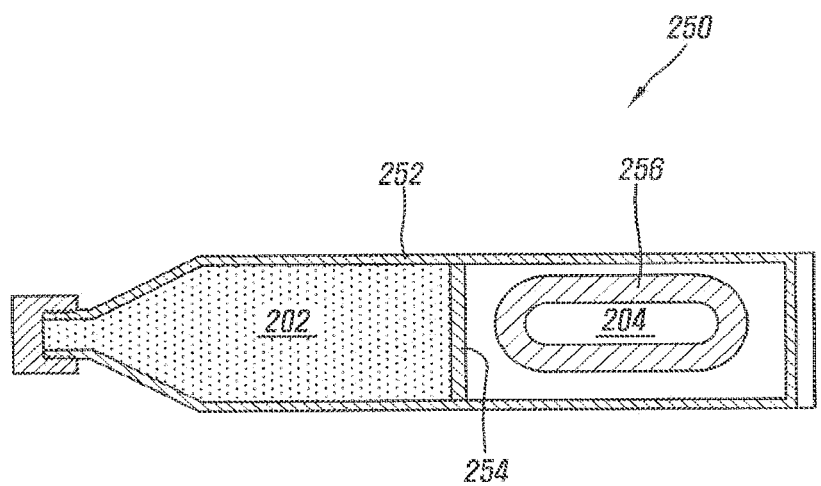
FIG. 19 shows a squeeze tube delivery system may be employed to deliver semi-solid food products and an ingestible event marker packaged in a squeezable tube.

FIG. 19 shows a squeeze tube delivery system 250 may be employed to deliver semi-solid food products 202 and an ingestible event marker 204 packaged in a flexible container such as a squeezable tube 252. The tube 252 is squeezed by compressing and breaking or rupturing a wall 254 separating the ingestible event marker 204 from the food product 202. Much like hand warmers that are activated by breaking and releasing two or more compounds that generate heat when mixed. The tube 252 could be activated by twisting and breaking open the wall 254. Otherwise, the ingestible event marker 204 may comprise a coating 256 that can be broken by twisting the tube 252 to release the ingestible event marker 204 and then by pressurizing the tube 252 to break the wall 254 and combining the ingestible event marker 204 with food product 202 as it is squeezed from the tube 252. The food product 202 may be liquid, such that the combination food product 202 and ingestible event marker 204 can be drunk after the tube is twisted to break the wall 254. The process of getting the food 202 out also activates the ingestible event markers 204 contained in the tube 252. In one aspect, this technique may be applied to a juice box and/or applesauce container, to dispense gel like foods where the container is squeezed to get the gel out, among others.

In another aspect, small beads may be located in a drink and when they are bitten, they break open and activate. This may be an alternative to chomping the ingestible event marker 204 directly to protect the teeth.

In another aspect, the semi-solid food product packaged in the squeezable plastic tube 252 may include a restriction and the semi-solid food product and ingestible event markers 204 are squeezed out past the restriction. Several semi-solid food products can be contained in the squeezable plastic tube to mix the different foods when the tube is squeezed. For example, one compartment may contain peanut butter and another compartment may contain chocolate such that they are mixed upon squeezing the tube so both food products can be dispensed from the tube.

The same technology described above for children and the elderly can be utilized with animal food and animal feed. The animal would have a receiver or a collar for detecting the ingestible event marker 204 signal. A receiver could be added to a GPS tracking collar or a tagging collar that may already be worn by the animal. A bucket transmits a signal when the food is gone by detecting the absence of food. When the animals are feeding from the bucket, the system communicates with their patch. Antibiotics can be located in the bucket and the feed bucket does the communicating. In cases where we only want to know what the consumption is. You've got a number of animals, for example, to identify the animals that actually showed up at the trough.

Figure 20:
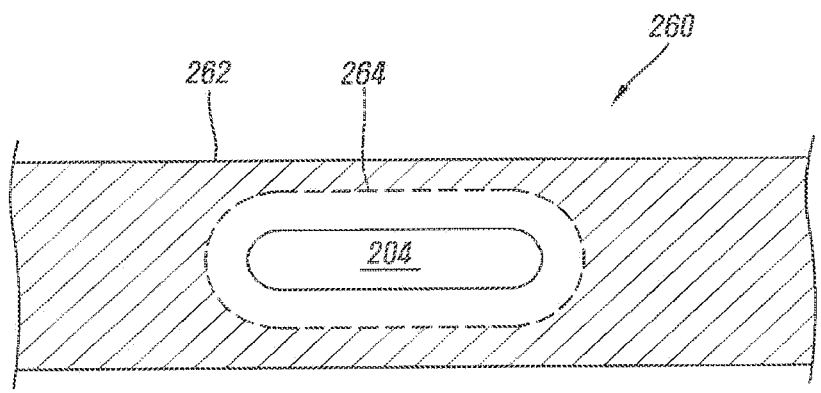
FIG. 20 shows a thin-film drug delivery mechanism that includes a strip that dissolves when placed in the mouth, e.g., on the tongue.

FIG. 20 shows a thin-film drug delivery mechanism 260 that includes a strip 262 that dissolves when placed in the mouth, e.g., on the tongue. The thin-film drug delivery system 260 employs a dissolving film 262 or oral drug strip to administer drugs via absorption in the mouth (buccally or sublingually) and/or via the small intestines (enterically). Orally disintegrating tablet or orodispersible tablet (ODT) is a drug dosage form available for a limited range of over-the-counter (OTC) and prescription medications. ODTs differ from traditional tablets in that they are designed to be dissolved on or under the tongue rather than swallowed whole. The film 262 can be prepared using hydrophilic polymers that rapidly dissolve on the tongue or buccal cavity, delivering the drug to the systemic circulation via dissolution when contact with liquid is made. Ingestible event markers 204 could be incorporated into the dissolvable thin-film 262 delivery system to delivery an ingestible event marker 204 in conjunction with the pharmaceutical. Once the thin-film 262 dissolves, the ingestible event marker 204 enters the mouth and is simply swallowed. The ingestible event marker 204 also could be coated with a chewable gelatin coating 264 to prevent chomping on the ingestible event marker. The ingestible event marker 204 could be coated to survive being embedded in the dissolvable strip and to get wet and activate when it is placed in the mouth.

The ingestible event markers can be located in food products consumed by elite athletes in training. Accordingly, the ingestible event markers can be located into an energy bar, sports drink, and the like. The ingestible event marker can be used for tracking consumption of such food products. Digital nutriceutical may be provided for the convenience of using food as a delivery method for a pharmaceutical.

Other suitable food products for combining with ingestible event markers is the jelly bean, baby food, lip balm to go over the lips slowly to apply the balm on the lips and then eventually eat it along with ingestible event marker and does not require chewing. Along with lip balms, ingestible event markers 204 can be combined with medicated salves and things that are rubbed on the skin.

Figure 21:
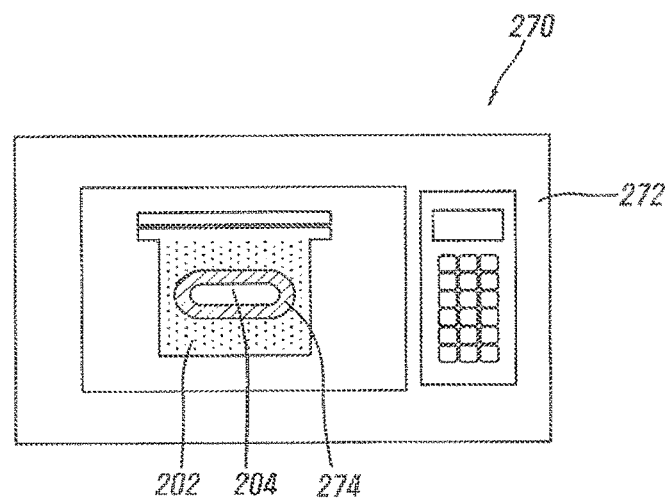
FIG. 21 shows a system where heat may be applied to the food product before it is ingested or detected.

FIG. 21 shows a system 270 where heat may be applied to the food product 202 before it is ingested or detected. The heat source 272 may be a microwave oven, for example. Although the food product 202 is not necessarily heated by the microwave oven, a coating component 274 that includes the ingestible event marker 204 heats up and bursts open to release the ingestible event marker. For example, the food product 202 can be placed in the microwave for ~3 seconds and the ingestible event marker 204 bursts from its coating shell 274 so that it can be eaten or drunk. A microwave oven 272 heats food by bombarding it with electromagnetic radiation in the microwave spectrum causing polarized molecules in the food to rotate and build up thermal energy in a process known as dielectric heating. Microwave ovens heat foods quickly and efficiently because excitation is fairly uniform in the outer 25-38 mm of a dense (high water content) food item; food is more evenly heated throughout (except in thick, dense objects) than generally occurs in other cooking techniques. The electromagnetic radiation of microwave ovens is substantially tuned to excite water molecules. Once the material forming the coating shell 274 absorbs a predetermined amount of radiation, it bursts to release the ingestible event marker 204.

Thus, an ingestible event marker 204 can be encapsulated by a shell 274 of a material that absorbs microwave radiation tuned for water molecules. The ingestible event marker 204 may include the shell 274 around it to prevent it from dissolving and activating in the food product. The shell 274 may include a material that is tuned to microwave radiation so that it gets hot and explodes to cause the shell 274 to burst in a nominal amount of time and release the ingestible event marker into the food product. Once the ingestible event marker 204 is exposed to the food product 202 (e.g., applesauce, peanut butter, baby food, and the like) the ingestible event marker 204 begins the activation process. Further, the drug or pharmaceutical can be disbursed into the food product in a similar manner at the same time the ingestible event marker 204 is released.

Alternatively, the pharmaceutical may be contained in the food product 202 as a new formulation or combination of food and drug which may be generic otherwise but now it is in the food product (e.g., applesauce, peanut butter, baby food, and the like).

In yet another alternative, of the drug delivery technique, the ingestible event marker 204 and the medication are both located in a burstable capsule 274 that absorbs microwave energy. The burstable capsule 274 is dropped in the food product ands then placed in the microwave oven 272 for a few seconds until the capsule bursts and the medication and ingestible event marker are stirred and eaten.

Alternatively, the ingestible event marker 204 encapsulating material 274 can be developed to absorb microwave radiation tuned for molecules other than water. Still in another alternative, a circuit can be tuned to absorb the microwave radiation and the circuit can be used as an energy pickup to generate enough heat to disrupt the ingestible event marker 204 encapsulating or coating material 274 to release the ingestible event marker 204. Thus, properly tuned, the ingestible event marker 204 could be released from the encapsulating material in a short amount of time, such as, for example, about one second.

Figure 22:
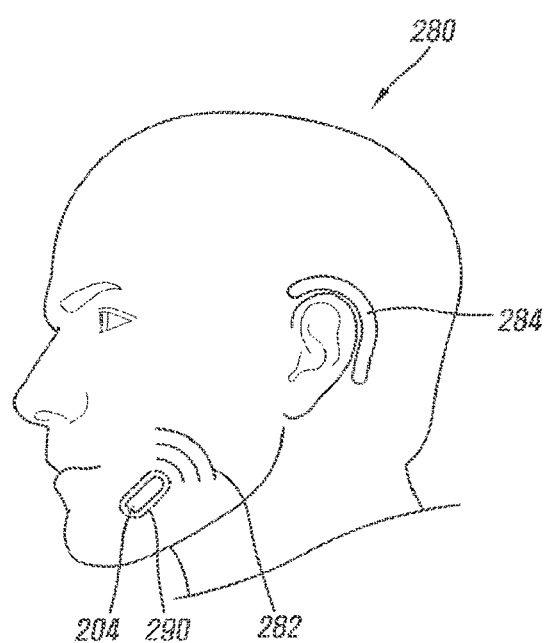
FIG. 22 shows a system 80 for detecting acoustic sounds emitted during the mastication process.

FIG. 22 shows a system 280 for detecting acoustic sounds 282 emitted during the mastication process. The current challenge is having enough power to dissolve the ingestible event marker 204 to communicate a particular problem. Thus, mastication itself can be an act which generates energy. Because anything being masticated naturally goes inside the mouth, instead of locating a receiver patch 284 on the patient's waist, a receiver patch 284 can be located between the ear 286 and the jaw 288 to sense mastication utilizing the movements of the jaw 288. The receiver patch 284 can be placed on the ear 286 or behind the ear to render invisible from the front, or may be located on glasses. This technique may be suitable for utilizing on obese people when mastication is detected.

In one aspect, a piezoelectric element 290 can be activated during mastication without the need for a chemical reaction to power up the ingestible event marker 204. Thus, during the mastication process, the piezoelectric element 290 emits an electric signal at a specific frequency that doesn't mix with all the other or acoustic mechanical sound to hear the acoustic sound. When the piezoelectric element 290 is deformed during the mastication process it develops an electric voltage potential, which can be coupled to a capacitor and charge the capacitor. The capacitor could remain charged with the voltage until the ingestible event marker reaches the stomach and then broadcast the encoded signal for a short duration. The receiver patch 284 may be a simple relatively small form factor acoustic microphone, which can be an off the shelf integrated circuit placed against the skin. Alternatively, the acoustic receiver can be located in a headphone. Thus a completely passive microphone based acoustic detection system can detect the unique sound made while masticating.

In yet another aspect, a system is configured to detect acoustic sounds emitted when the ingestible event marker 204 is destroyed or partially destroyed during the mastication process. In one aspect, an audible noise created by the destruction of the ingestible event marker 204 or the destruction of an envelope that covers the ingestible event marker 204 can be monitored by a device. The device may be worn inside, behind, or outside the ear or as an attachment to glasses or hearing aid (so that it is not obviously visible) so that it is proximate to the mouth where the crushing happens and the audible signal evolves which may preferably be communicated conductively and by other means as well.

The audible signal may be captured from the mouth, vocal cord, and other noises such as hissing noises made by the elderly, breathing difficulties, wheezing noise, frequent hiccups, moans and other body-generated noises, as well.

Alternatively, in one aspect a mobile device could be employed as a sensor platform where passive sensing functionality can be implemented with a mobile device and link into the health system platform. The passive sensing functionality include motion, location, and interaction analysis with mobile device features.

In Alzheimer's, dementia, and broader neurodegenerative diseases it is desirable to determine how medication adherence can slow disease progression. In addition, in areas like Parkinson's metrics may be desirable to support the lowest possible dose and dosing frequency relative to effect in order to preserve efficacy in a particular individual.

In one aspect, the microphone in the mobile device may be utilized to passively capture and record calls by a neurodegenerative patient. Vocal strength and tone changes are keys in neurodegenerative disease progression. The phone-recorded vocal patterns and changes in voice strength and tone would be analyzed to grade changes and associate these with disease progression and stage. This information could be then be combined with adherence sensing as well as physical markers of activity, gate, and sleep patterns to create treatment scores and indexes.

It is to be understood that this invention is not limited to particular aspects or aspects described, as such may vary. It is also to be understood that the terminology used herein is for the purpose of describing particular aspects only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It will be appreciated that as used herein, the term "dissolve" may be used to indicate melt, soften, liquefy, thaw, disrupt, break up, break open, break apart, or otherwise destroy a layer or coating of material encapsulating an ingestible event marker either wholly or partially to release the ingestible event marker.

As will be apparent to those of skill in the art upon reading this disclosure, each of the individual aspects described and illustrated herein has discrete components and features which may be readily separated from or combined with the features of any of the other several aspects without departing from the scope or spirit of the present invention. Any recited method can be carried out in the order of events recited or in any other order which is logically possible.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and aspects of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary aspects shown and described herein. Rather, the scope and spirit of present invention is embodied by the appended claims.

What is claimed is:

1. An apparatus, comprising:
   at least one ingestible device to communicate information, the at least one ingestible device associated with an ingestible medication to be ingested;
   at least one environmentally sensitive coating material at least partially surrounding the at least one ingestible device, wherein the environmentally sensitive coating material is a first coating; and
   a second coating that is provided over the first coating; and
   wherein the at least one environmentally sensitive coating material protects the ingestible device from dissolving in a liquid carrier component.

2. The apparatus of claim 1, wherein the at least one ingestible device is stored within a pill.

3. The apparatus of claim 1, wherein the at least one ingestible device is stored within a capsule.

4. The apparatus of claim 1, wherein the at least one environmentally sensitive coating material includes a hydrochloride material to control water absorption.

5. The apparatus of claim 4, wherein the hydrochloride material controls an activation time for the at least one ingestible device.

6. The apparatus of claim 4, wherein the hydrochloride material is an alginic acid.

7. The apparatus of claim 1, wherein the at least one environmentally sensitive coating material is configured to release the at least one ingestible device upon contact with stomach fluid.

8. The apparatus of claim 1, wherein the apparatus is within the ingestible medication.

9. The apparatus of claim 1, wherein the second coating is the liquid carrier component.

10. The apparatus of claim 1, wherein the at least one environmentally sensitive coating material is configured to dissolve at a predetermined pH level.

11. The apparatus of claim 10, wherein the at least one environmentally sensitive coating material is configured to dissolve at a low pH.

12. The apparatus of claim 11, wherein the at least one environmentally sensitive coating material is porous at the low pH, and enables moisture to penetrate the at least one ingestible device.

13. The apparatus of claim 10, wherein the at least one environmentally sensitive coating material is impermeable at a high pH.

14. The apparatus of claim 10, wherein the at least one environmentally sensitive coating material is an enteric coating.

15. The apparatus of claim 14, wherein the enteric coating dissolves at a neutral pH.

16. The apparatus of claim 15, wherein the enteric coating dissolves in an intestine, as the intestine is an environment with the neutral pH.

17. The apparatus of claim 14, wherein the enteric coating is impermeable at a low pH.

18. The apparatus of claim 1, wherein the ingestible device comprises:
   a support structure;
   a first material physically associated with the support structure; and a second material physically associated with the support structure at a location different from the location of the first material, such that the first material and second material are electrically isolated from each other and capable of generating a voltage potential when in contact with a conducting fluid, wherein the support structure includes a control module for controlling the conductance between the first material and the second material; and
wherein the ingestible device is activated when in contact with the conducting fluid and the contact results in a current signature that includes information encoded therein using the control module, wherein the conducting fluid is stomach fluid.

19. A system, comprising:
at least one ingestible device to communicate information, the ingestible device associated with an ingestible medication to be ingested;
at least one environmentally sensitive coating material at least partially surrounding the at least one ingestible device, wherein the environmentally sensitive coating material is a first coating; and
a second coating that is provided over the first coating; and
wherein the environmentally sensitive coating material protects the ingestible device from dissolving in a liquid carrier component; and
an acoustic receiver configured to couple to a user, the acoustic receiver configured to detect acoustic sounds emanating from a body of a user.

20. An apparatus, comprising:
at least one ingestible device to communicate information, the at least one ingestible device associated with an ingestible medication to be ingested;
at least one environmentally sensitive coating material at least partially surrounding the at least one ingestible device; and
a liquid carrier component that is provided over the at least one environmentally sensitive coating; and
wherein the at least one environmentally sensitive coating material protects the ingestible device from dissolving in the liquid carrier component.

* * * * *